United States Patent
Pryor et al.

(10) Patent No.: US 12,552,052 B2
(45) Date of Patent: Feb. 17, 2026

(54) ROBOTIC SYSTEMS AND METHODS FOR TANK SEAL INSPECTION

(71) Applicant: Board of Regents, The University of Texas System, Austin, TX (US)

(72) Inventors: Mitchell Pryor, Austin, TX (US); Connor D. Crawford, Austin, TX (US); Robert Blake Anderson, Austin, TX (US); Keith Fritz, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 18/493,258

(22) Filed: Oct. 24, 2023

(65) Prior Publication Data

US 2024/0139975 A1 May 2, 2024

Related U.S. Application Data

(63) Continuation of application No. 18/179,016, filed on Mar. 6, 2023, now abandoned, which is a
(Continued)

(51) Int. Cl.
*B25J 19/02* (2006.01)
*B25J 5/00* (2006.01)
(Continued)

(52) U.S. Cl.
CPC ............. *B25J 19/023* (2013.01); *B25J 5/007* (2013.01); *B25J 9/1664* (2013.01); *B25J 9/1679* (2013.01); *B25J 9/1697* (2013.01); *B25J 19/0025* (2013.01)

(58) Field of Classification Search
CPC ........ B25J 19/023; B25J 5/007; B25J 9/1664; B25J 9/1679; B25J 9/1697; B25J 19/0025;
(Continued)

(56) References Cited

U.S. PATENT DOCUMENTS 5,205,174 A 4/1993 Silverman et al.
5,774,568 A 6/1998 Freneix
(Continued)

FOREIGN PATENT DOCUMENTS

CN 108214319 A 6/2018
NL 2023144 B1 12/2020
(Continued)

OTHER PUBLICATIONS

L. P. Kalra, J. Gu and M. Meng, "A Wall Climbing Robot for Oil Tank Inspection" 2006 IEEE International Conference on Robotics and Biomimetics, Kunming, China, 2006, pp. 1523-1528 (Year: 2006).*
(Continued)

*Primary Examiner* — Russell Frejd
*Assistant Examiner* — Ana D Thomas

(57) ABSTRACT

Robotic systems and methods for tank seal inspection. A tank inspection robot includes a housing containing a drive assembly, and wheels disposed outside of the housing and operably coupled to the drive assembly. The tank inspection robot also includes at least one sensor coupled to, or disposed in or on a portion of the robot, for collecting data sufficient to evaluate a health, mechanical integrity or effectiveness of one or more circumferential seals between a floating roof, and an interior wall, of a storage tank. The disclosed robot and associated method enable safer and more efficient seal inspection routines as compared to conventional techniques.

20 Claims, 38 Drawing Sheets

Related U.S. Application Data continuation-in-part of application No. 17/431,988, filed as application No. PCT/US2020/020420 on Feb. 28, 2020.

(60) Provisional application No. 62/811,795, filed on Feb. 28, 2019.

(51) Int. Cl.
*B25J 9/16* (2006.01)
*B25J 19/00* (2006.01)

(58) Field of Classification Search
CPC ...... G01F 23/804; G01F 22/00; G01F 23/292; G01F 23/64; G01M 3/223; G01M 3/226; G01M 3/24; G01M 3/2869; G01M 3/3254; G01M 3/38; G01N 2291/0235; G01N 2291/0258; G01N 2291/102; G01N 29/043; G01N 29/07; G01N 29/221; G01N 29/225; G01N 29/265; B62D 57/024
See application file for complete search history.

(56) References Cited

U.S. PATENT DOCUMENTS

| | | | |
|---|---|---|---|
| 6,882,412 B2 * | 4/2005 | Silverman | G01N 21/954 356/237.1 |
| 8,171,786 B2 | 5/2012 | Burris | |
| 8,369,990 B2 | 2/2013 | Zesch et al. | |
| 8,666,553 B2 | 3/2014 | Phillips et al. | |
| 8,982,207 B2 | 3/2015 | Jang | |
| 9,250,213 B1 | 2/2016 | Bossi et al. | |
| 9,371,133 B2 | 6/2016 | Mays | |
| 9,586,636 B1 | 3/2017 | Burmeister et al. | |
| 10,012,561 B2 | 7/2018 | Walker et al. | |
| 2002/0116089 A1 | 8/2002 | Kirkpatrick, Jr. | |
| 2005/0252296 A1 | 11/2005 | Hock et al. | |
| 2009/0133515 A1 | 5/2009 | Gershtein et al. | |
| 2010/0107765 A1 | 5/2010 | Murakami et al. | |
| 2010/0180672 A1 | 7/2010 | Zollinger | |
| 2012/0281096 A1 | 11/2012 | Gellaboina et al. | |
| 2013/0231779 A1 | 9/2013 | Purkayastha et al. | |
| 2015/0285721 A1 | 10/2015 | Watanabe et al. | |
| 2015/0321605 A1 | 11/2015 | Mirza et al. | |
| 2015/0369751 A1 | 12/2015 | Cheim et al. | |
| 2016/0244988 A1 | 8/2016 | Barcelos et al. | |
| 2016/0268823 A1 | 9/2016 | Gonzalez et al. | |
| 2018/0224369 A1 * | 8/2018 | Maresca | G01N 17/00 |
| 2019/0049962 A1 | 2/2019 | Ouellette et al. | |
| 2021/0380187 A1 | 12/2021 | Pryor et al. | |
| 2023/0003687 A1 | 1/2023 | Vaganay et al. | |

FOREIGN PATENT DOCUMENTS

| | | | | |
|---|---|---|---|---|
| WO | WO-2020154303 A1 * | 1/2020 | | B63G 8/00 |
| WO | WO-2021102079 A1 * | 5/2021 | | G01N 27/9073 |

OTHER PUBLICATIONS

Sogi, Tadayuki, et al. "Inspection robot for spherical storage tanks." 2000 26th Annual Conference of the IEEE Industrial Electronics Society. IECON 2000. 2000 IEEE International Conference on Industrial Electronics, Control and Instrumentation. 21st Century Technologies. vol. 1. IEEE, 2000. (Year: 2000).*

Song, Young Kouk, et al. "Development of wall climbing robotic system for inspection purpose." 2008 IEEE/RSJ International Conference on Intelligent Robots and Systems. IEEE, 2008. (Year: 2008).*

Wang, Hua, et al. "A new inspection robot system for storage tank." 2008 7th World Congress on Intelligent Control and Automation. IEEE, 2008. (Year: 2008).*

L. P. Kalra, J. Gu and M. Meng, "A Wall Climbing Robot for Oil Tank Inspection" 2006 IEEE International Conference on Robotics and Biomimetics, Kunming, China, 2006, pp. 1523-1528 (Year: 2006) (Year: 2006).*

A. Hak Industrial Services B.V., "Storage Tank Services," https://web.archive.org/web/20180916140922/http://www.a-hak-is.com/en/home/what_we_do/services/storage_tank_services/inspection/online_robotic_tank_bottom_inspection, 2 pages, Sep. 16, 2018.

International Application No. PCT/US2020/020420, International Search Report, Written Opinion, 10 pages, May 14, 2020.

International Application No. PCT/US2023/063778, International Search Report, Written Opinion, 19 pages, Aug. 28, 2023.

Office of Industrial Technologies, U.S. Department of Energy, "Petroleum Project Fact Sheet," https://www.nrel.gov/docs/fy99osti/26044.pdf, 2 pages, Jan. 1999.

Sonomatic Ltd., "Robotic Tank Inspection," https://web.archive.org/web/20200219033419/http://www.sonomatic.com/advanced-inspection/applications/robotic-tank-inspection/, 1 page, Feb. 19, 2020.

Werner Solken, "Introduction To Storage Tanks," https://web.archive.org/web/20200227163205/http://www.wermac.org/equipment/storage_tanks_vessels_general.html, 16 pages, Feb. 27, 2020.

Wikipedia, "External Floating Roof Tank," https://en.wikipedia.org/wiki/External_floating_roof_tank, 2 pages, Aug. 23, 2019.

Wikipedia, "Fixed Roof Tank," https://en.wikipedia.org/wiki/Fixed_roof_tank, 1 page, Apr. 26, 2017.

Wikipedia, "Storage Tank," https://web.archive.org/web/20191114115825/https://en.wikipedia.org/wiki/Storage_tank, 4 pages, Oct. 22, 2019.

Sogi, Tadayuki et al., "Inspection Robot For Spherical Storage Tanks," 2000 IEEE International Conference on Industrial Electronics, Control and Instrumentation, pp. 393-398, Oct. 22-28, 2000.

Song, Young Kouk et al., "Development Of Wall Climbing Robotic System For Inspection Purpose," 2008 IEEE/RSJ International Conference on Intelligent Robots and Systems, pp. 1990-1995, Sep. 22-26, 2008.

Wang, Hua et al., "A New Inspection Robot System For Storage Tank," Proceedings of the 7th World Congress on Intelligent Control and Automation, pp. 7427-7431, Jun. 25-27, 2008.

* cited by examiner

Inspection Report

| Tank Location | Primary, Liquid Seal | | | Secondary, Vapor Seal Gap | | |
|---|---|---|---|---|---|---|
| | Length (in) | Width (in) | Fabric Tears | Length (in) | Width (in) | Rubber Tears |
| 12 to 1 | 30 | 0.52 | | | | |
| 1 to 2 | | | | | | |
| 2 to 3 | 15 | 1.05 | | | | |
| 3 to 4 | | | | | | |
| 4 to 5 | | | | | | |
| 5 to 6 | | | | | | |
| 6 to 7 | | | | | | |
| 7 to 8 | | | | | | |
| 8 to 9 | | | | | | |
| 9 to 10 | | | | | | |
| 10 to 11 | | | | | | |
| 11 to 12 | | | | | | |

ROBOTIC SYSTEMS AND METHODS FOR TANK SEAL INSPECTION

CROSS-REFERENCE TO RELATED APPLICATIONS

This application is a continuation of U.S. patent application Ser. No. 18/179,016 filed on Mar. 6, 2023; which is a continuation-in-part of U.S. patent application Ser. No. 17/431,988 filed on Aug. 18, 2021; which is a national stage entry of International Application No. PCT/US2020/020420 filed on Feb. 28, 2020; which claims priority to U.S. Provisional Application Ser. No. 62/811,795 filed Feb. 28, 2019; each of which is incorporated herein by reference in its entirety for all purposes.

TECHNICAL FIELD

Various embodiments of the present technology generally relate to robotics. More specifically, some embodiments of the present technology relate to a tank inspection robot and associated methods for performing tank inspections.

BACKGROUND

Storage tanks can be used to store large quantities of substances. For example, refineries often have large storage tanks of petroleum products on site. The petroleum products can include crude oil, processed gasoline, kerosene, diesel, and the like. Depending on the flashpoint of the product and other factors, the large storage tanks can be fixed roof tanks or floating roof tanks. Fixed roof tanks (e.g., with cone roofs, dome roofs, etc.) are typically used to store liquids with very high flash points. Floating roof tanks are used for liquids with low flash points (e.g., gasoline, ethanol, etc.) and they are usually cheaper to build than fixed roof tanks. The floating roof may be internal or external.

External floating roof tanks, for example, typically include a cylindrical shell (e.g., made of steel) with an open top. A lid or roof sits within the cylindrical shell and floats directly on the surface of the stored liquid. This design keeps the air out of these storage tanks and prevents vapors from escaping. The lids float on the stored substance. As a result, the lid rises and falls with the liquid level, and there is no vapor space (ullage) in the floating roof tank except possibly in very low liquid level situations.

There is a seal between the lid and the wall of the tank which can degrade over time allowing for evaporation and product loss. As a result, these tanks must be inspected at regular intervals (e.g., annually, every five years, when tanks are empty, in accordance with internal policy, etc.) to ensure the seal is intact. Unfortunately, the inspection process is time consuming. For example, the inspection personnel are required to manually inspect the seals with full oxygen equipment. Moreover, the process usually requires various safety permits and multiple people onsite during the inspection which can last for several hours depending on the size of the tank.

Floating roofs used on Above-Ground Storage Tanks sit atop liquid fuel to prevent the formation of flammable vapors. A lower liquid seal and an upper weather seal are in place to contain the vapors. As the level of the product fluctuates, the floating roof moves up and down with it, maintaining a sliding contact with the tank wall. The seal assembly can fail over time due to this motion, which allows vapors to escape, producing an unsafe environment in and around the tank. To know when this has occurred, a manual inspection is required. The weather seal is pulled back and a judgement is made on the condition of the liquid seal. This inspection may be visual or physical using a dowel rod or other item to determine the spacing between the seal and tank wall. Current manual inspection is dangerous, costly to perform, and imprecise. The inspection typically requires a team of up to 5 humans with oxygen supplies and personal protective equipment (PPE), as well as a rescue team on standby. The safety paperwork to approve a technician on the floating roof is also very onerous.

Energy producers need a place to store their product once they get it out of the ground. Most of the time they will use an above-ground floating roof storage tank to do the job. These are used in large part due to their ability to reduce evaporative emissions by 98% relative to a fixed-roof style tank. While they do their job exceedingly well, the seals will fail over time and lose their competitive advantage over fixed roof tanks. Vapors will begin to collect in the space between the vapor seal, producing a combustible mixture. The presence of these Volatile Organic Compounds (VOCs) above a certain level dictates that a tank must be taken out of service and repaired. In order to prevent an untimely and costly repair, facility managers will inspect their assets at regular intervals (usually on an annual and quintennial basis) in order to catch a mechanical defect while it is still simple to repair. The current methodology consists of a visual and physical inspection of the seal assembly around the entirety of the tank circumference. The asset is shut down for influx of product, and a team of 5 persons is sent in to pull back the vapor seal and measure or otherwise evaluate gapping at the liquid seal. If the cumulative gap area around the tank exceeds the allowable threshold, a repair team is sent in.

The current method of inspecting these seals needs improvement. On the safety and environmental side, there is a risk of injury to the human team by sending them into a confined space. Tank entry is widely recognized as being one of the most hazardous operations in the tank cleaning business and every year results in injuries and deaths. Additionally, poor inspection practices can miss a problem spot on a floating roof seal, allowing an excess emission of volatile organic compounds. This results in contamination of the surrounding facility, as well as the surrounding soil, water, and atmosphere.

On the cost side, the main issue is the tank down-time associated with inspections. While it may only be a day of down-time with external floating roof inspections, it can be as much as a few weeks to a month for internal floating roofs. This can cost the asset owner $150,000 a day or $4,500,000 a month in lost tank productivity. Unnecessary labor and equipment expenses are also concerns for these energy companies, though not to the extent that down-time is. Related to the complexity of the Inspection task, the biggest pain point for tank owners is the lost efficiency and headache associated with obtaining hot-work permits (oftentimes required to send personnel into confined space areas). The actual evaluation or measurement of the seal gap is also prone to human error and requires a large amount of time to complete around the entire circumference of the tank.

As such, a need exists for improved techniques for inspecting the storage tank seals.

SUMMARY

Various embodiments of the present technology generally relate to robotics. More specifically, some embodiments of the present technology relate to an integrated system design for tank seal inspections. Some embodiments provide for a robotic inspection device comprising a power supply, a body, a drive system, one or more cameras, a navigational system, and/or one or more sensors. In some embodiments, the housing may be a rectangle or box-shaped design. In some embodiments, the device is composed of multiple sections with different shapes and sizes. For example, the body of the robotic inspection device can have an upper portion and a lower portion. The lower portion may be smaller than the upper portion allowing for insertion into smaller spaces within the tank (e.g., between a floating lid and side of the wall of the tank). The drive system may include one or more surface engaging drivers (e.g., magnetic wheels, endless tracks, etc.) to propel the robotic inspection device along a surface of a tank. The one or more surface engaging drivers may be positioned, in accordance with one or more embodiments, on a back side and/or on a front side of the robotic inspection device.

The camera can be housed within the body to capture images and/or video of a seal within the tank. The navigational system can compute a route and send commands to the drive system to navigate the robotic inspection device along the surface of the tank allowing the camera to capture the images or video of the seal. Navigation commands may or may not include a human operator in the control loop. Some embodiments may use an artificial intelligence, machine learning, or other analysis software engine(s) to review the images or video of the seal within the tank and identify problems with the seal. The software engine may be located within the robotic inspection device and/or on a remote computing platform. In some embodiments, the software engine can review the images or video of the seal and schedule additional passes over areas of the seal with identified issues. The issues may include poor image or video quality, fading, cracks, breaks, gaps, discolorations, or the like.

In some embodiments, the body may include an interchangeable nose section allowing an operator to select the interchangeable nose section with a size and a shape to fit between a weather shield affixed to the tank. The body or interchangeable nose section may include an opening allowing the lens of the camera to view the seal. In addition to the camera, these components of the robotic inspection device may also include one or more light sources (e.g., light emitting diodes) to illuminate an area of the tank (e.g., seal) for inspection. The light source, in some embodiments, may include two rows of multiple light emitting diodes (LED) positioned on opposite sides of the camera.

Some embodiments may include a manipulator arm having a proximal end coupled to the body of the robotic inspection device and a distal end connected to gripper to engage. The manipulator arm can be used to retract a weather shield on the tank to allow at least a portion of the robotic inspection device be inserted between the weather shield and a wall of the tank. Some embodiments of the robotic inspection device may also include a failsafe system with an independent power source and one or more direct current electromagnets. Upon failure of a primary power source the one or more direct current electromagnets can be automatically engaged to anchor the robotic inspection device to the surface of the tank.

In some embodiments, a method of operating a robotic inspection device is provided. The robotic inspection device can be lowered into an initial position (e.g., using a hydraulic lift with cables attached to hooks located on the body of the robotic inspection device). An inspection signal directing the robotic inspection device to inspect a seal of a tank can be received (e.g., from an external computing device or control platform). Then, a magnetic coupling between the robotic inspection device and a wall of the tank can be activated. The robotic inspection device can be navigated so that a camera within the robotic inspection device can view a seal between a floating lid and the wall of the tank. Using the camera, images or video of the seal can be recorded as the robotic inspection device traverses the wall of the tank. In some embodiments, the images or video can be presented to a human operator for analysis. In other embodiments, an artificial intelligence, machine learning, or other analysis engine analyzes the images or video of the seal recorded by the camera. The images or video of the seal can be transmitted to an external computing device that creates a two or three-dimensional model of the seal.

In accordance with various embodiments, the robotic inspection device operates in a set of states including a setup state, an inspection state, and a failsafe state. The setup state can be used to receive commands from an operator or external computing platform. The inspection state can cause the robotic inspection device to capture sensor data and/or images/video of the seal. The robotic inspection device can monitor for a failure in a primary power supply providing power to the robotic inspection device and transition, upon detection of the failure in the primary power supply, from a current state of operation of the robotic inspection devices to a failsafe state that activates a magnetic coupling between the robotic inspection device and the wall of the tank. Some embodiments may use magnets for the magnetic coupling as the primary holding force in an inspection state which may also then transition to a second set of magnets and/or a secondary power supply if a fault is detected.

In some embodiments, the robotic inspection device features a system for determining, tracking, and reporting the position and orientation of the vehicle on the tank wall. Such a system may include odometers, gyroscopes, accelerometers, magnetic compasses, and/or GPS components. In embodiments that include a magnetic compass, the system is equipped with a method of calibrating and/or isolating the compass to account for the magnetic fields of the magnets on the vehicle.

To address the issues with the conventional manual methods of floating roof tank seal inspection, automated robotic systems and methods are provided by the present technology. In some examples of the present technology, the inspection robot may have a bifurcated design, which keeps the bulk of the tethered robot above the weather seal in a configuration akin to an inverted periscope.

In accordance with various embodiments, a tank inspection robot is provided. The tank inspection robot includes a housing containing a drive assembly. The tank inspection robot also includes wheels disposed inside or outside of the housing and operably coupled to the drive assembly. The tank inspection robot further includes at least one sensor coupled to and/or or disposed in or on a portion of the housing. The at least one sensor functions to collect data sufficient to evaluate a gap between one or more circumferential seals, and a wall, of a storage tank. In some embodiments, the evaluation of the gap according to the present technology may include automated measurement of one or more dimensions of the gap using, e.g., the sensor(s).

In some embodiments of the present technology, a tank inspection method is provided. The tank inspection method includes the step of actuating, by a drive assembly of a tank inspection robot, wheels of the robot to navigate the robot to one or more circumferential seals positioned proximal an interior wall of a storage tank. The tank inspection method also includes the step of collecting, by at least one sensor on the robot, data sufficient to evaluate a gap between the one or more seals and the wall of the storage tank. In some embodiments, the evaluation of the gap according to the present technology may include automatically measuring of one or more dimensions of the gap using, e.g., the sensor(s).

Embodiments of the present invention also include computer-readable storage media containing sets of instructions to cause one or more processors to perform the methods, variations of the methods, and other operations described herein.

In some embodiments of the present technology, one or more non-transitory computer readable media are provided. The one or more non-transitory computer readable media have program instructions stored thereon. When executed by at least one processor of or associated with a tank inspection robot, the program instructions cause the tank inspection robot to direct a drive assembly of the tank inspection robot to actuate wheels of the robot to navigate the robot to one or more circumferential seals positioned proximal an interior wall of a storage tank. When executed by at least one processor, the program instructions also cause the tank inspection robot to direct at least one sensor of the robot to data sufficient to evaluate a gap between the one or more seals and the wall of the storage tank.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings.

Figure 1:
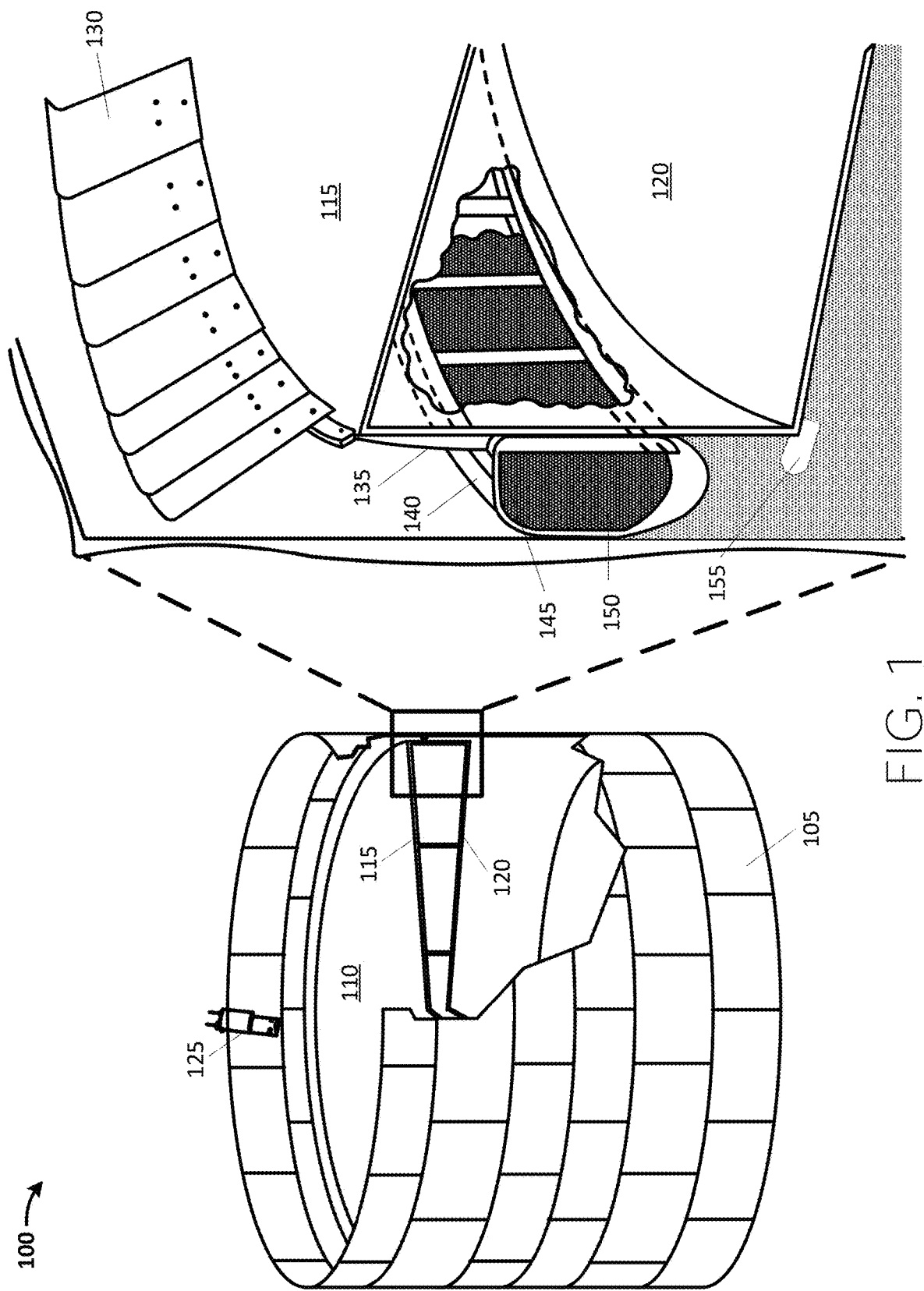
FIG. 1 illustrates an example of a tank with a seal that can be inspected by a robotic inspection device in accordance with one or more embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to robotics. More specifically, some embodiments of the present technology relate to an integrated system design for tank seal inspections. Oil and gas producers (among other types of companies) own many large tanks which have a "floating" roof. This roof moves up and down as the volume of material in the tank ebbs and flows. The seal between the roof and the wall of the tank must be inspected periodically, and inspection typically requires a human technician with an oxygen supply and a medical team on standby. The seals are often referred to as a "foam log" or a "wiper." The seal is often protected by a weather shield which must be lifted by the inspection technician. Historically, the technician manually inspects the seal and judges whether the condition of the tank seal is acceptable. The safety paperwork to approve a technician on the floating roof is onerous.

To avoid the expense associated with an oxygen supply and a medical team on standby, various embodiment of the present technology provide for a robotic inspection device which includes a camera and/or other sensors. The camera could be any combination of a traditional color camera, a stereo camera, a depth camera, or several other types of data collection systems. The robot can be lowered from the rim of the tank and inserted under the weather shield (if it exists). Then, the robotic inspection device would propel itself around the circumference of the tank, collecting data on the condition of the seal. An electromagnet (or magnet, or suction) might be used to hold the robot against the tank wall in some embodiments. As the robot traverses the tank, camera data can be saved. In some embodiments, a digital model of the tank seal can be recreated.

Various embodiments of the present technology provide for a wide range of technical effects, advantages, and/or improvements to tank inspections. For example, various embodiments include one or more of the following technical effects, advantages, and/or improvements: 1) use of an automated (or semi-automated) robotic inspection device to reduce or eliminate the lengthy approval process, oxygen supply, and a backup medical team that have historically made it very expensive to perform tank seal inspections with human technicians; 2) unconventional operations for the recreation of a high-fidelity 3D model of the tank seal; 3) integrated use of machine learning and/or artificial intelligence to automatically identify potential issues with the seal; 4) use of non-routine operations for reduction or removal of human judgment in seal inspections; 5) creation of detailed documentation; 6) the use of real-time feedback of video and sensor data to focus inspection on potential problem areas; and/or 7) use of interchangeable segments to allow for proper fitting of multiple different tank designs and configurations.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The robot can include various special-purpose hardware, programmable circuitry appropriately programmed with software and/or firmware, and the like.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

There are an estimated 150,000 above-ground floating roof storage tanks in the U.S., which have a perimeter seal that reduces harmful evaporative emissions. These roof seals float up and down with the level of product and will fail over time. As such, regular inspection is required to ensure they are functioning properly. Known methods consist of a 5 person human crew sent down into the tank to physically inspect the liquid-vapor seal. There are significant safety concerns associated with this process, a financial operating loss due to down-time of the tank, and issues with the accuracy and speed of the inspection. Robotic inspection techniques present opportunities to improve upon conventional methods on a variety of levels.

FIG. 1 illustrates an example of a tank 100 with a seal that can be inspected by a robotic inspection device in accordance with one or more embodiments of the present technology. More specifically, FIG. 1 illustrates a typical external floating roof tank that can be used by various refineries or storage facilities. While FIG. 1 shows an external floating roof tank 100, the robotic inspection device may be used within other tank designs such as but not limited to internal floating roof tanks.

External floating roof tanks typically include a cylindrical shell 105 which can be made of steel or other metal depending on the stored liquid. The cylindrical shell 105 is open at the top and includes a floating lid 110. In the embodiments illustrated in FIG. 1, the floating lid 110 is a double decker lid that includes a top deck 115 and a bottom deck 120. The floating lid 110 is slightly smaller in diameter than the diameter of the cylindrical shell 105. The floating lid 110 sits atop the liquid within the tank and will rise or fall with the liquid level. In some designs, floating lid 110 may sit on pontoons floating on the liquid. As a result, there is little or no space between the bottom of lid 110 and the top of the liquid internal to the tank 100.

While not illustrated in FIG. 1, the floating lid 110 may include vents and or access ports to allow inspection personnel to view or gain access to the inside of the tank 100. Around the floating lid 110 sits a seal to provide an airtight connection between the floating lid 110 and the cylindrical housing 105. Robotic inspection device 125 can be lowered down the inner wall of the cylindrical housing 105. The right side of FIG. 1 provides a cross section of an enlarged portion of the seal between the floating lid 110 and the cylindrical housing 105.

Attached to the upper deck 115 is a weather shield 130. A seal assembly can be positioned underneath the weather shield 130 and between the cylindrical wall 105 and floating lid 110. In the embodiments shown in FIG. 1, the seal assembly can include a hanging bar 135 attached to the floating lid 110 to secure seal envelope 140 with seal support ring 145 and resilient urethane foam 150.

Figure 2:
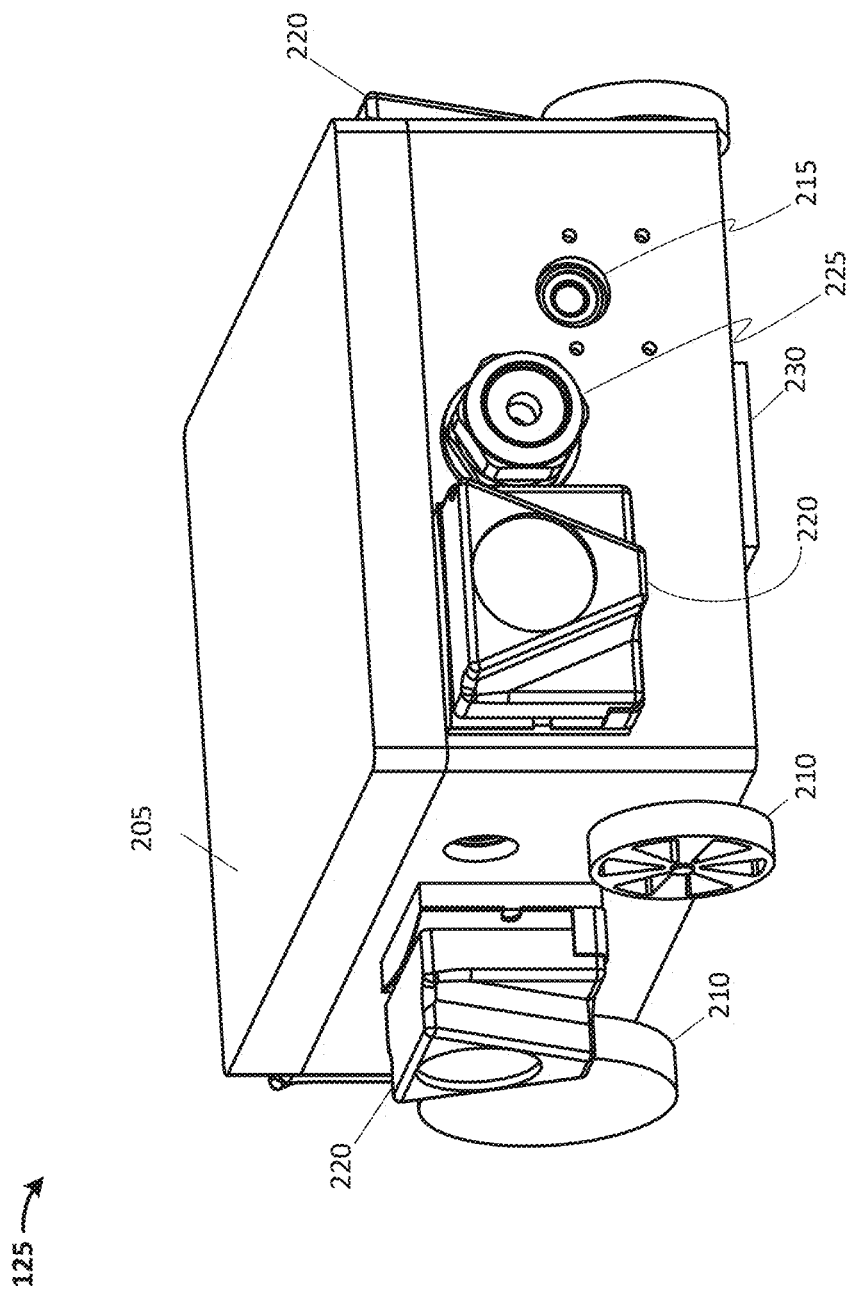
FIG. 2 illustrates an example of a robotic inspection device according to various embodiments of the present technology.

FIG. 2 illustrates an example of a robotic inspection device 125 according to various embodiments of the present technology. As shown in FIG. 2, robot inspection device 125 is a smaller robot that passes entirely underneath the weather shield (see, e.g., weather shield 130 in FIG. 1). A typical weather shield will restrict the robot height to less than six inches and the robot width to less than eighteen inches. Some embodiments may have a height equal to or greater than six inches and/or a width equal to or greater than eighteen inches. Length is a less critical dimension and can be minimized to maximize the robot mobility.

As Illustrated in FIG. 2, the robot inspection device may include a housing 205 (e.g., having a rectangular shape). The housing can be made from a variety of materials including, but not limited to, plastics, metals, composite materials, or the like. In accordance with various embodiments, the material may be suitable for deployment in explosive vapor environments and be compliant with regulations pertaining to those environments. For example, the material must not produce sparks due to contact with other objects and be rugged enough to survive outdoor environments. Housing 205 can enclose a variety of components such as, but not limited to power sources (e.g., a battery), processors, controller, drive assemblies, magnetic coupling assemblies, sensors, lights, drive motors, and/or other components.

In the embodiments shown in FIG. 2, the drive motors are connected to wheels 210 (e.g., larger drive wheels and smaller idler wheels) allowing the robotic inspection device to drive around the tank in the space between the weather shield and seal. Camera 215 can be mounted on or within housing 205 (e.g., on each side) to capture images of the seal. The embodiments of robotic inspection device 125 shown in FIG. 2 are designed to passes underneath the weather shield. As such, a worker can pull the weather shield back during initial deployment. Since robotic inspection device 125 cannot be seen by the operator (since the robotic inspection device is concealed by the weather shield) a navigation system can be used to track the robot position under the weather shield. Flashlights 220 can illuminate an area underneath the weather shield.

In some embodiments, robotic inspection device 125 can be teleoperated and/or equipped with object manipulation and detection capabilities provide a safe option for executing dangerous tasks in hazardous environments without putting humans at direct risk. In the embodiments shown in FIG. 2, tether attachment point 225 can be used to attach a tether allowing commands from an operator to be processed. In some embodiments, robotic inspection device 125 may also include wireless components to receive commands without attachment of the tether. In addition, various embodiments may include a variety of components (e.g. housed within housing 205 or on an ground-station computer) to provide environmental awareness. Examples include, but are limited to displays for video feed navigation and use of assisted or automated video analysis tools to determine size of fixture gaps. Static magnet 230 can be activated to secure robotic inspection device to a magnetic wall of the tank or portion of the weather shield.

Figure 3:
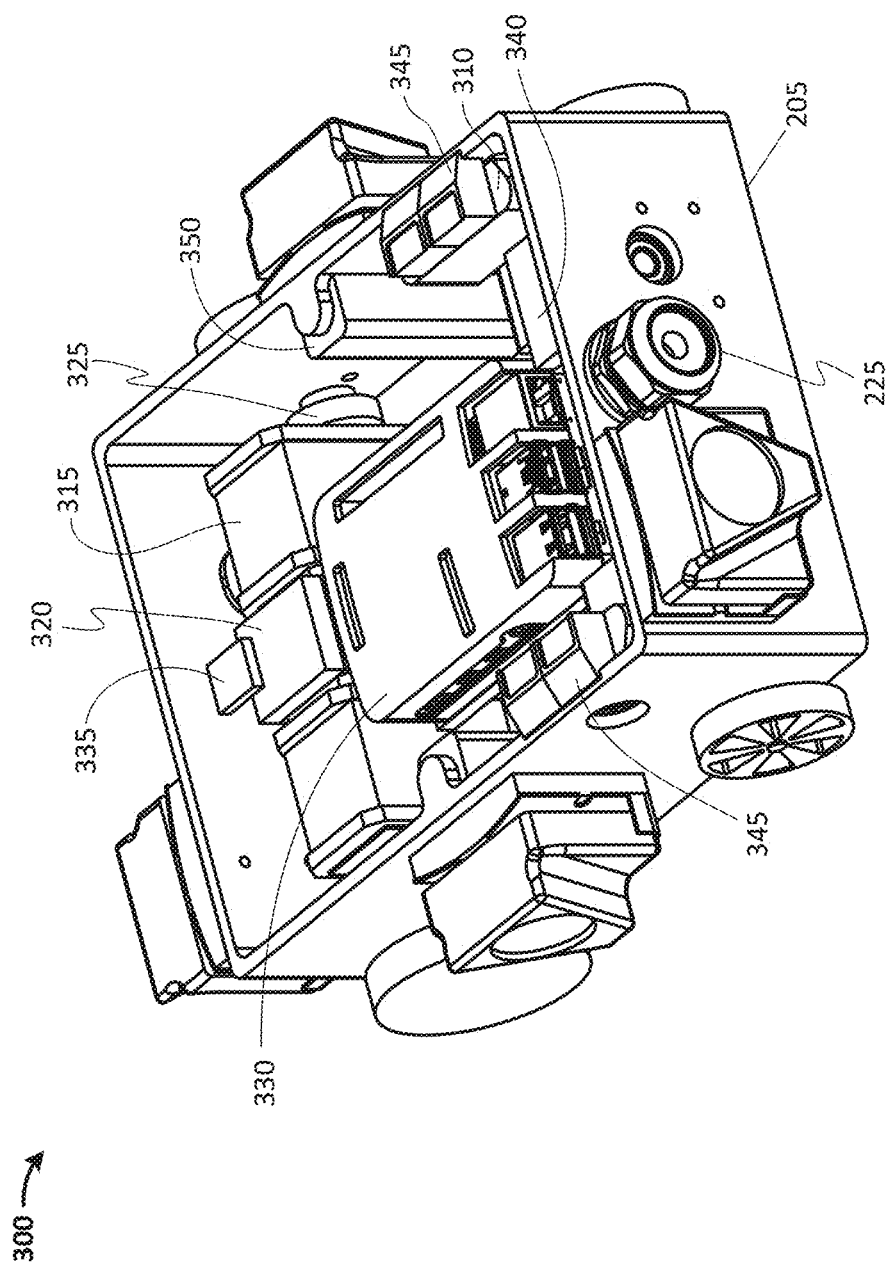
FIG. 3 is an illustration that allows various internal components to be seen of a portion of the robotic inspection device illustrated in FIG. 2.

FIG. 3 is an illustration 300 that allows various internal components to be seen of a portion of the robotic inspection device 125 illustrated in FIG. 2. In the embodiments illustrated in FIG. 3, robotic inspection device 125 can include one or more apertures allowing for camera assemblies 310 within housing 205 to capture video, images, or data. Apertures may also allow light (e.g., from an LED within the housing) to illuminate the area under the weather shield.

Drive motors (e.g., servos) 315 may be mounted on chassis mount 320 and be part of a differential drive system allowing the drive wheels 210 to independently move. Servo-axle couplings As such, by changing the relative rate of rotation of drive wheels, robotic inspection device 125 can navigate obstacles or reach desired destinations without additional steering components. While various embodiments may include load-bearing wheels and/or drive wheels, alternative surface-engaging drivers such as endless tread (e.g., tracks) may be used in some embodiments. Note that the drive system will have to be sufficient to overcome the friction between the vehicle and the weather shield. Otherwise, the robotic inspection device 125 could get stuck.

Computational device 330 can be configured to take instructions from a remote operator and translate those commands into a tasks to be completed by the robotic inspection device. In accordance with various embodiments, computational device 330 can provide control and integration of various sub-systems (e.g., vehicle motion, environmental awareness and detection, navigation, etc.). In some embodiments, the vehicle motion can be computed and set to change vehicle motion, servo speed/torque, estimate or determine vehicle velocity and drift. The computational device may decide to maintain vehicle position, engage or disengage magnetic couplings (e.g., block and/or wheel magnets, determine orientation of the vehicle, or the like. In some embodiments, computational device 330 can determine the size of a gap using depth camera, initialize and calibrate various cameras to improve 3D images, or the like. In the embodiments illustrated in FIG. 3, computational device 330 can be communicably coupled to inertial measurement unit (IMU) board 335.

The robotic inspection device may also include voltage converters 340 to change the voltage levels received through tether attachment point 225 (or from one or more internal power supplies) from one voltage to another (e.g., from 12 volts to 5 volts or 3.3 volts). Power distribution units 345 can then provide appropriate power to the various components (e.g., computational device 330, drive motors 315, IMU board 335, flashlights 350, etc.).

Figure 4:
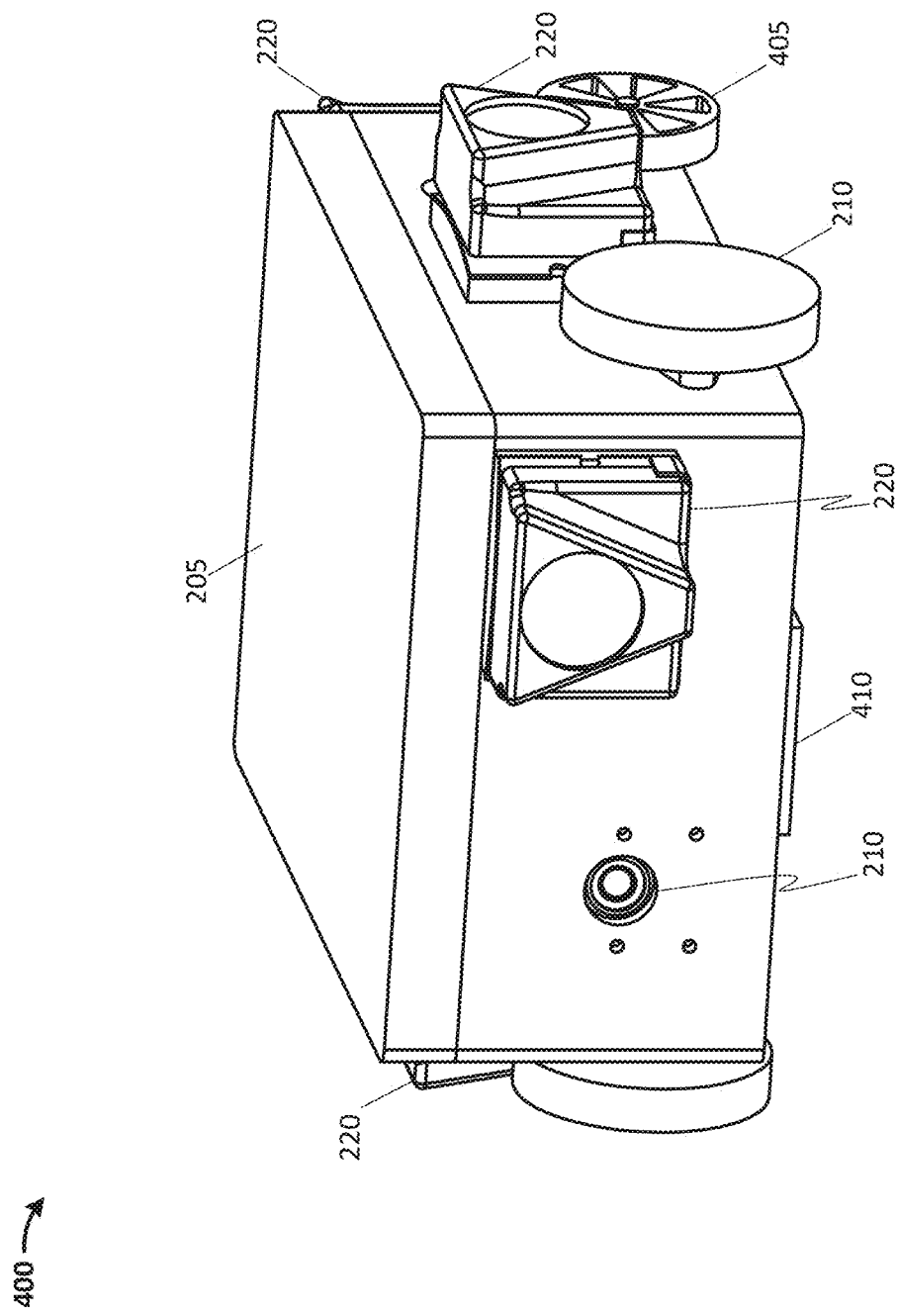
FIG. 4 is a front view of the robotic inspection device of FIGS. 2-3.

FIG. 4 is a front perspective view 400 of the robotic inspection device of FIGS. 2-3. As illustrated in the embodiments shown in FIG. 4, component 405 is an example of a location of a support wheel or caster on the bottom of the vehicle towards the rear. One, two, or more such support wheels or casters may be used. Component 410 illustrates possible locations for the adhesion magnets. The number, shape, strength, and locations of the magnets may vary. Magnets may be located closer to the edges of the vehicle bottom. Magnets may be installed on the wheels instead of, or in addition to, the vehicle bottom.

Figure 5:
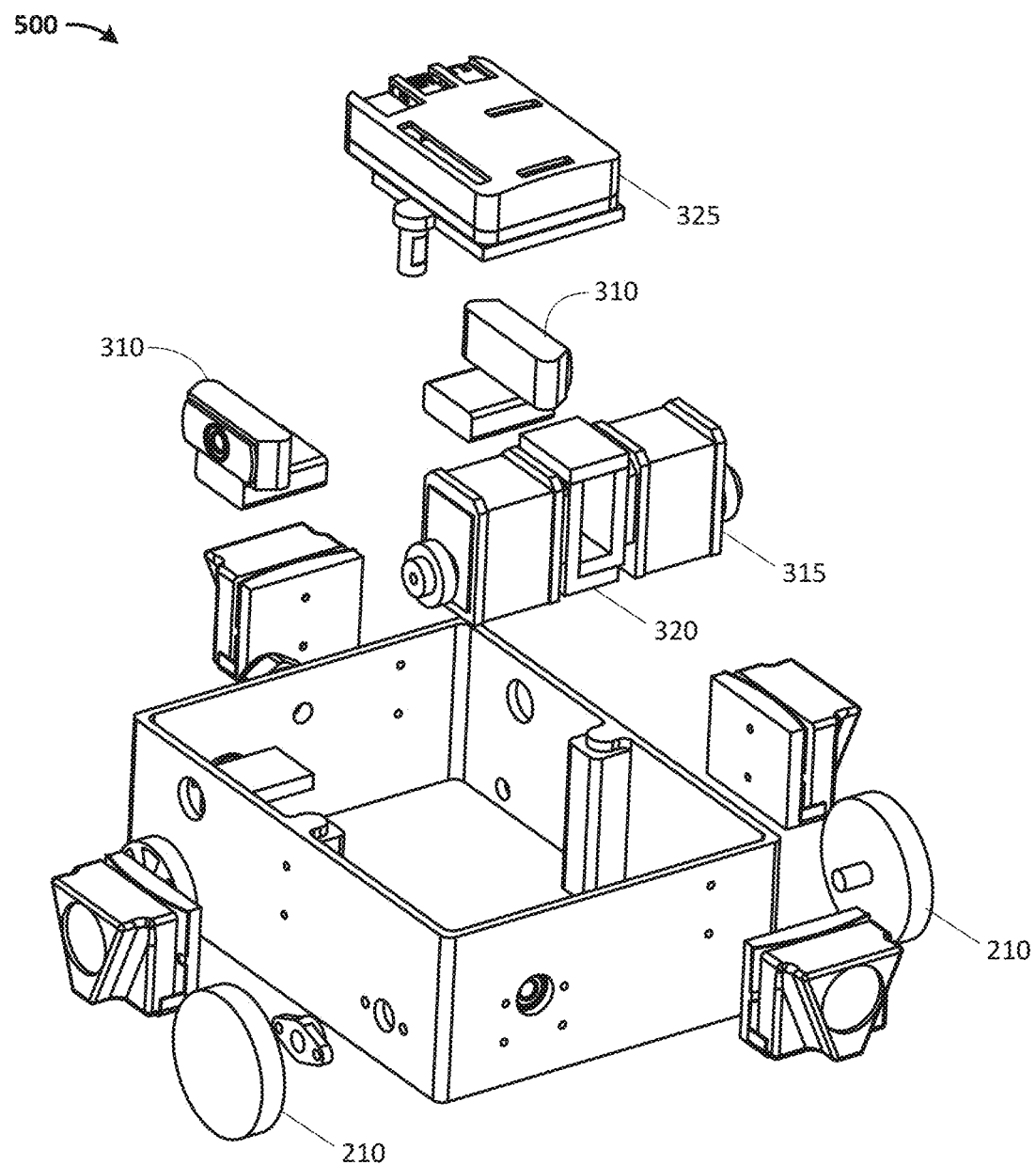
FIG. 5 is an exploded view showing various components of the robotic inspection device of FIGS. 2-4.
Figure 6:
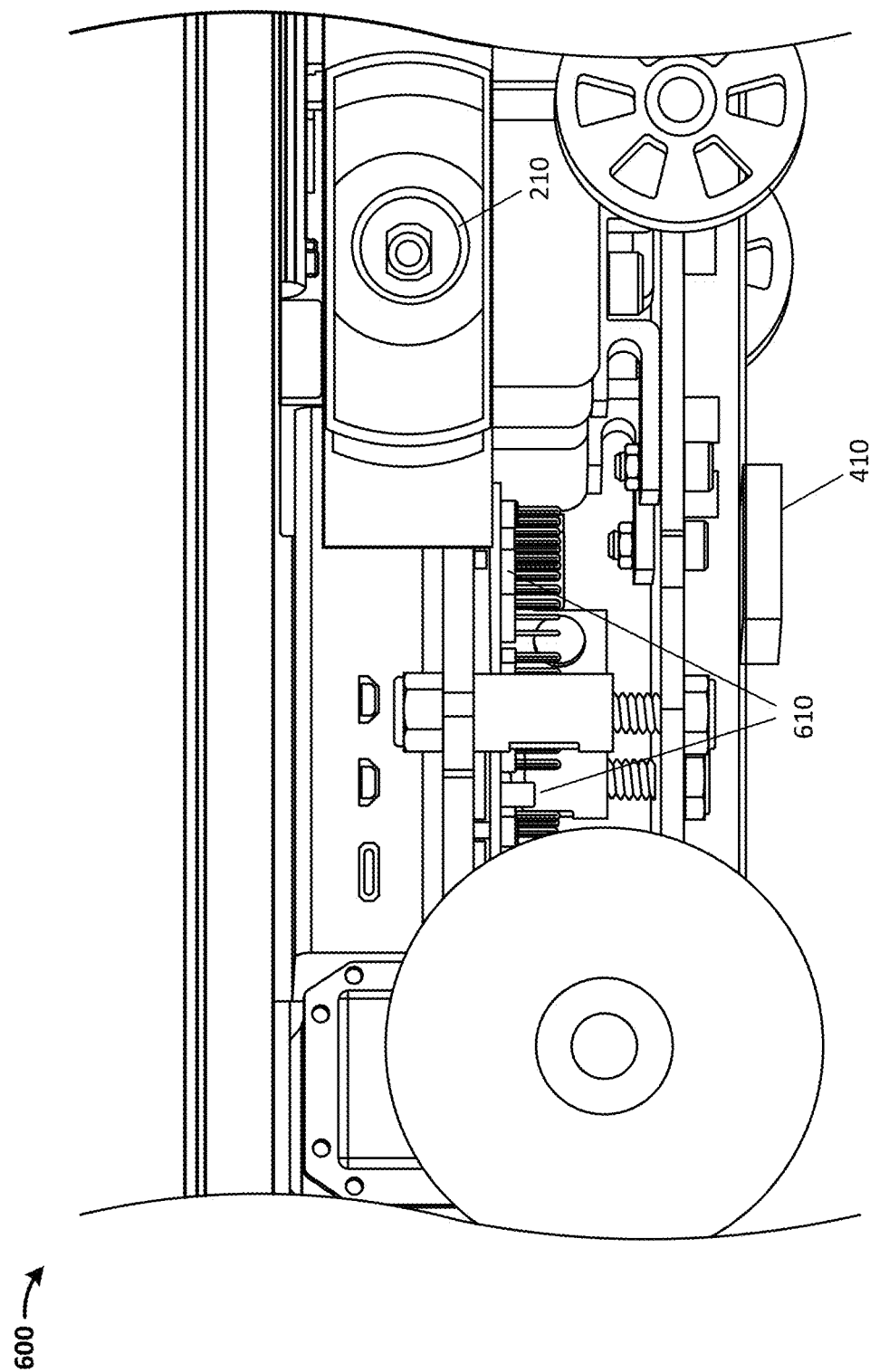
FIG. 6 is a side view showing various components of the robotic inspection device of FIGS. 2-5.
Figure 7:
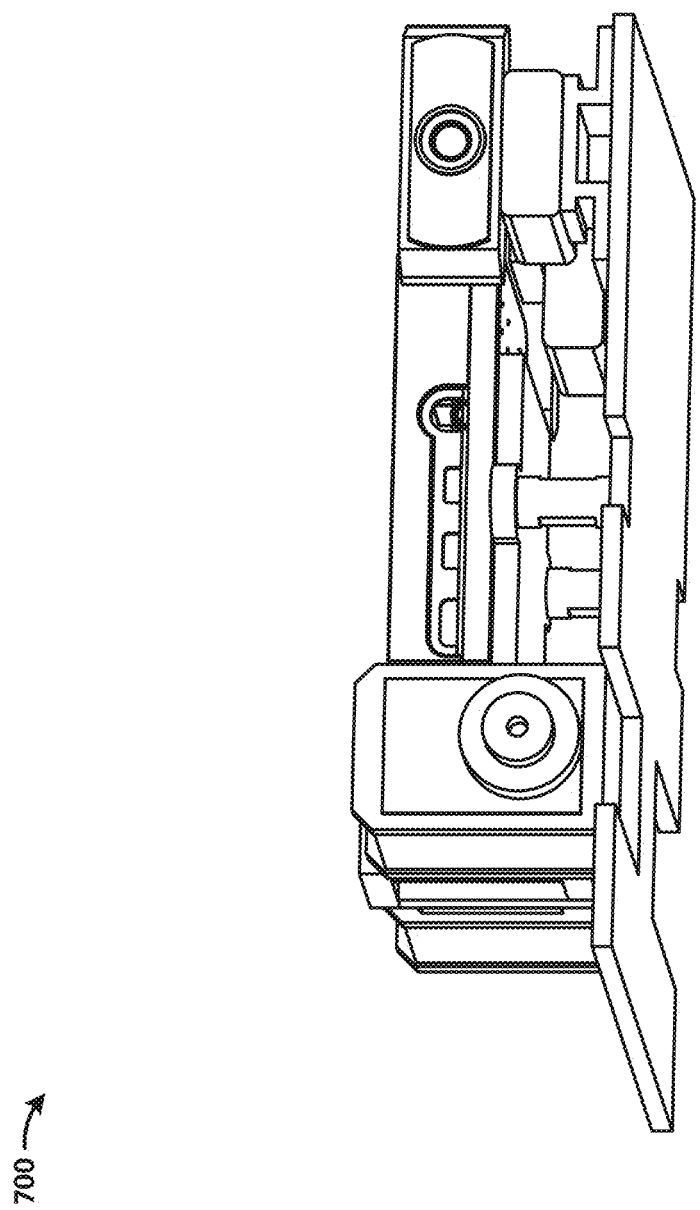
FIG. 7 is a perspective view of an electronic assembly that may be used within various embodiments of the present technology.

FIG. 5 is an exploded view 500 showing various components of the robotic inspection device of FIGS. 2-4. Component 315 is the motors for the drive wheels 210. Component 310 is the side-vision cameras. The specific make and model of the cameras may vary. Component 320 is the mounting subassembly for the drive motors. Component 325 is the onboard computer. FIG. 6 is a side view 600 showing various components of the robotic inspection device of FIGS. 2-5. In addition to side camera 215 and static magnet 410, the embodiments shown in FIG. 6 also include serial controller and sensor board 610 which provides an interface to the various components and sensors within the robotic inspection device. FIG. 7 is a perspective view 700 of an electronic assembly that may be used within various embodiments of the present technology.

Figure 8:
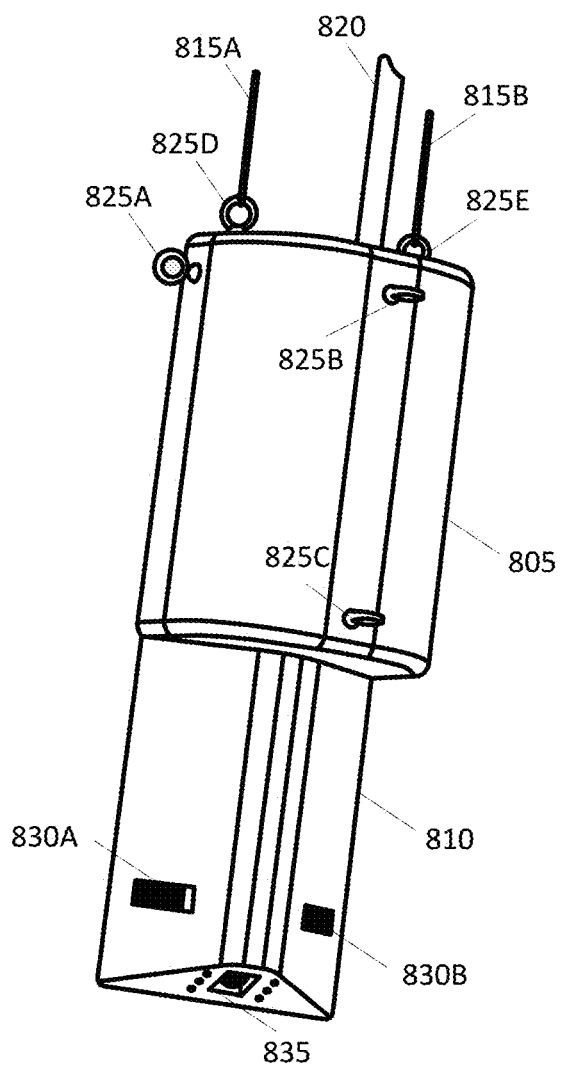
FIG. 8 is a view of an example robotic inspection device, illustrating various embodiments of the present technology.

While robotic inspection device 125 illustrated in FIG. 2 is designed to fit entirely underneath the weather shield. Other embodiments may include housing designs that only partially fit underneath the weather shield. One advantage of these embodiments is that it allows the operator to visually see the location of the robotic inspection device. FIG. 8 is a view of a robotic inspection device 125 in accordance with various embodiments of the present technology. As shown in FIG. 8, robotic inspection device 125 inspection device can have a body with an upper portion 805 and a lower portion 810. Within the upper portion 805 and/or the lower portion 810, the robotic inspection device 125 can include various power sources (e.g., a battery), processors, controller, drive assemblies, magnetic coupling assemblies, sensors, lights, drive motors, and/or other components. The lower portion 810 may be smaller than upper portion 805 to allow the lower portion 810 to pass the weather shield and visually access the seal between the floating lid and the cylindrical shell of the tank. The upper portion 805 may be attached to cables 815A and 815B for lowering and raising the robotic inspection device into place. In addition, some embodiments may use tether 820 for providing additional power and/or communication between external computing devices and the robotic inspection device. Tether 820 may include a Kevlar covering to protect the internal cables providing the power and communications.

The cables 815A and 815B may be connected to any of eyebolts 825A-825E. Once the device is set into place, a magnetic or suction based engagement system may be used to secure the robotic inspection device 125 to the wall. The cables 815A and 815B can be unclipped and removed from the robotic inspection device 125. A pair of load-bearing wheels 830A-830B may be located outside of lower portion 810. Additional wheels may be located on the opposite side of the robotic inspection device (see, e.g., FIG. 11). Each of these wheels may be powered by a drive assembly (not shown) or rotate freely.

In addition, to load-bearing wheels 830A-830B, various embodiments may also include drive wheels (see, e.g., FIG. 11, wheels 1110A-1110B and 1110D-1110E) which may be part of a differential drive system allowing the drive wheels to independently move. As such, by changing the relative rate of rotation of drive wheels 1110A-1110B and 1110D-1110E, robotic inspection device 125 can navigate obstacles or reach desired destinations without additional steering components. While various embodiments may include load-bearing wheels 830A-830B and/or drive wheels 1110A-1110B and 1110D-1110E (in FIG. 11), alternative surface-engaging drivers such as endless tread (e.g., tracks) may be used in some embodiments.

While not illustrated in FIG. 8, some embodiments of the robotic inspection device 125 may include a manipulator arm. The manipulator arm can be connected to a portion of the body (e.g., upper portion 805 or lower portion 810) of the robotic inspection device 125. For example, a proximal end of the manipulator arm can be coupled to the body and a distal end connected to one or more tools (e.g., a gripper for lifting the weather shield or grabbing the seal, a rod for prodding the seal, additional cameras, and the like) for inspecting and/or gaining access to the seal. The manipulator arm can include multiple segments connected by actuated joints to allow the manipulator arm flexibility in performing desired tasks.

The design of tank seals varies and there is no guarantee that one robot design will work for all tank types. As such, various embodiments allow for interchangeable segments and/or portions with different sizes, shapes, curvatures, and the like. For example, in some embodiments, the robotic inspection device may include an interchangeable nose piece, an interchangeable lower portion, or a back with different curvatures. Moreover, some tanks have irregular structural additions on the rim of the tank, such as antennas or irregular flanges. As such, it will be difficult for the power/communications tether 820 to pass over these obstructions. Various embodiments may use an onboard battery and Wi-Fi module to operate the robotic inspection device wirelessly. In other embodiments, the cable may be fed over these obstructions with a long pole or a hydraulic lift.

While not illustrated in FIG. 8, some embodiments may include a second assembly that follows the robotic inspection device along the top of the tank. The follower assembly allows the tether to be threaded to the vehicle and supports recovery of the vehicle from the tank.

Figure 9:
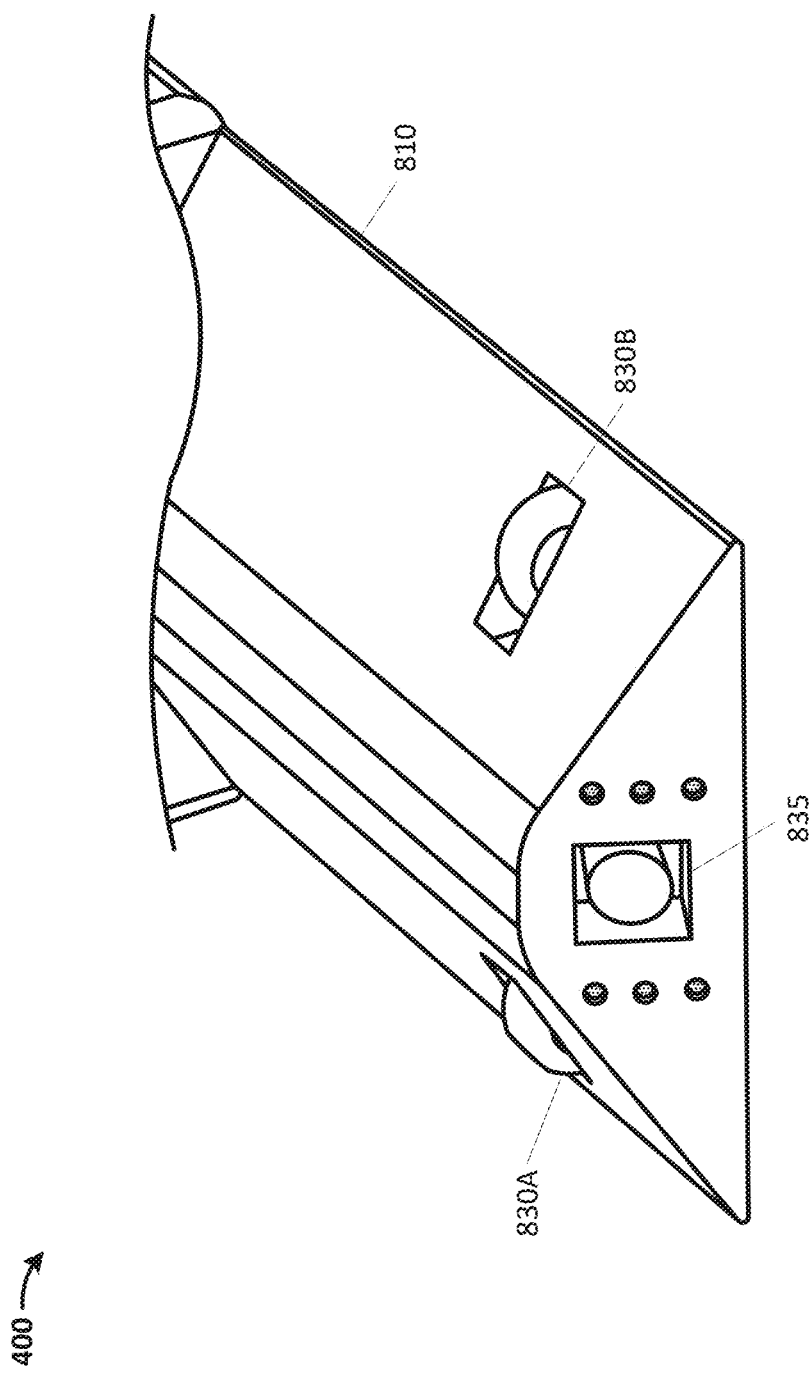
FIG. 9 illustrates a design of a lower portion of the robotic inspection device shown in FIG. 8.

FIG. 9 illustrates a design of a lower portion 810 of the robotic inspection device shown in FIG. 8. At the bottom of the lower portion 810 can be one or more integrated sensors 835 and/or lights for inspecting the seal. In accordance with various embodiments, the integrated sensors may include video cameras, thermal sensors, chemical sensors, and the like. The recordings and measurements from the integrated sensors 835 may be stored locally within the robotic storage device and retrieved once the inspection is complete. In other embodiments, the recording and measurements may be streamed back to a remote computing device where the results can be analyzed in real-time. This real-time analysis can allow for additional data to be collected in suspect areas or areas of interest.

Figure 10:
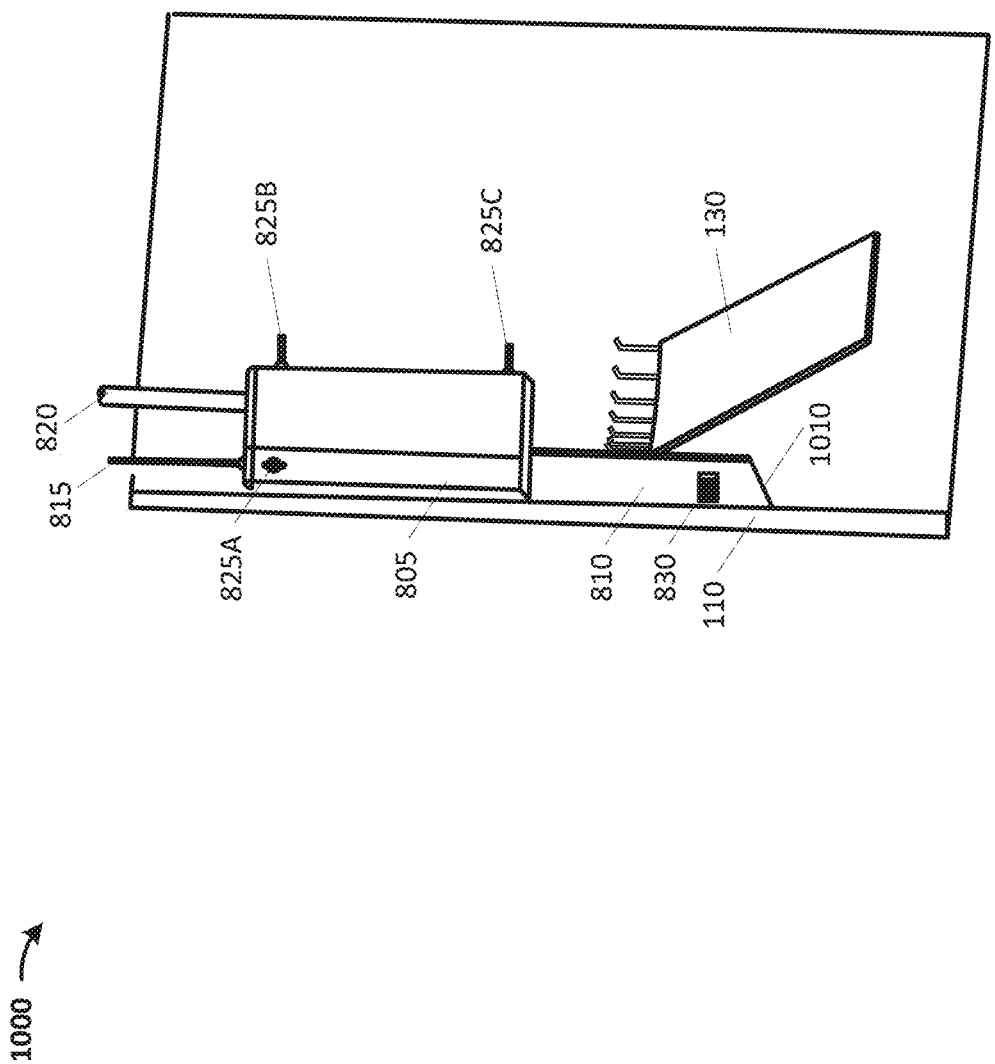
FIG. 10 illustrates a view of the robotic inspection device with a lower portion inserted beyond a weather shield on a tank for inspection of a seal in accordance with some embodiments of the present technology.

FIG. 10 illustrates a view 1000 of the robotic inspection device 125 with the lower portion 810 inserted beyond the weather shield 130 on the tank 100 for inspection of a seal in accordance with some embodiments of the present technology. The weather shield 130 may be manually retracted by an operator using a pole-mounted tool. In other embodiments, the lower portion 810 of robotic inspection device 125 may include a manipulator arm (not shown) with an access tool to create space between the top edge of the weather shield 130. In other embodiments, the wedge-shaped leading edge 1010 of the lower portion 810 may allow the robotic inspection device to drive beneath the weather shield. This can allow the robotic inspection device 125 access to the seal. The wheels 830A-830B on the front of the inspection device may engage the weather shield as the device navigates around the internal perimeter of the shell.

Figure 11:
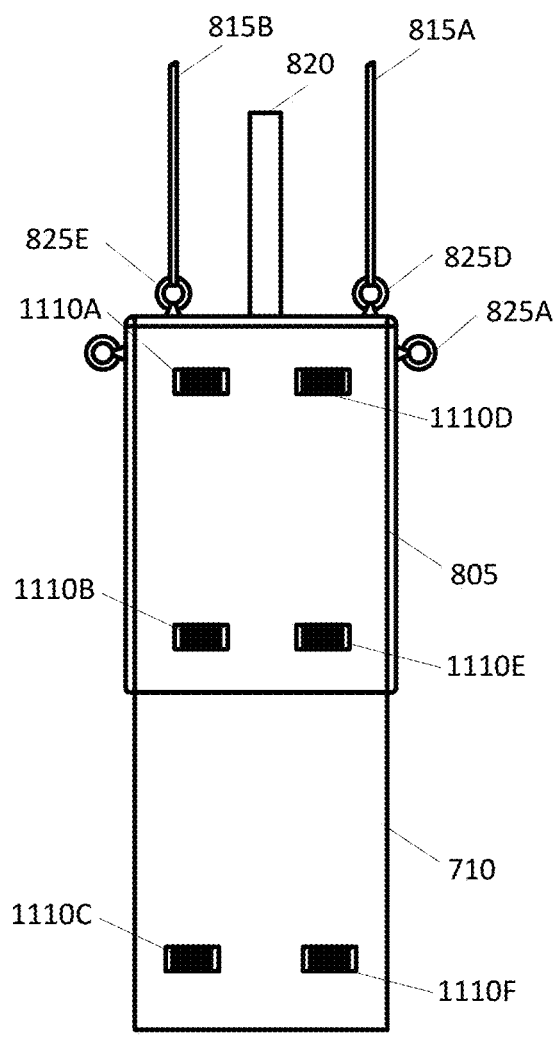
FIG. 11 is a view of the back the robotic inspection device that may be used in various embodiments of the present technology.

FIG. 11 is a view 1100 of the back of the robotic inspection device 125 that may be used in various embodiments of the present technology. In the embodiments shown in FIG. 11, upper portion 805 and lower portion 810 may each include sets of wheels 1110A-1110F. Some of the wheels may be load-bearing wheels similar to wheels 830A-830B, while other wheels may be drive wheels which are part of a differential drive system allowing drive wheels to independently move. As such, by changing the relative rate of rotation of drive wheels 1110A-1110F, robotic inspection device 125 can navigate obstacles or reach desired destinations without additional steering components. Other embodiments may use alternative surface-engaging drivers such as endless tread (e.g., tracks). The back side of upper portion 805 and lower portion 810 may be flat. In some embodiments, the back side of upper portion 805 and/or lower portion 810 may be slightly rounded to fit with common curvatures of the cylindrical shells.

Figure 12:
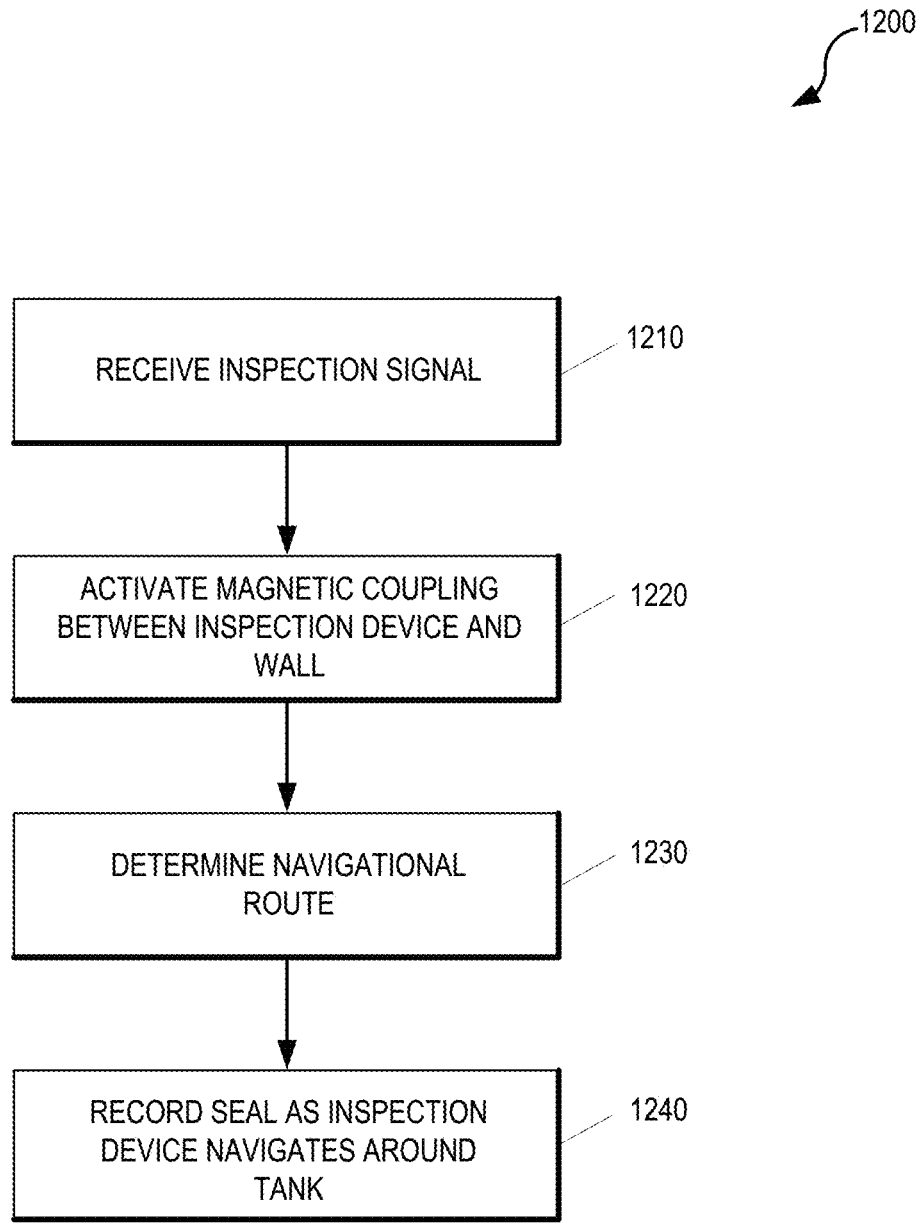
FIG. 12 is a flowchart illustrating an example of a set of operations for using the robotic inspection device in one or more embodiments of the present technology.

FIG. 12 is a flowchart illustrating an example of a set of operations 1200 for using the robotic inspection device in one or more embodiments of the present technology. As illustrated in FIG. 12, receiving operation 1210 receives an inspection signal from a controller. The inspection signal may be sent wirelessly or via a wire routed to the robotic inspection device via a tether. The inspection command may include a variety of parameters such as, but not limited to, tank dimensions (e.g., diameter), inspection routines, identified areas of interest, areas to avoid, and the like. Other examples of parameters may include time limits, communication channel information, location/tank information (e.g., for tagging recorded data), external weather conditions (e.g., temperature), maximum inspection times, waypoints, and the like.

Activation operation 1220 can activate a magnetic coupling between the robotic inspection device and the wall of the tank once the robotic inspection device is in place. The magnetic coupling can support the weight of the robotic inspection device and allow the drive wheels to be used to navigate the robotic inspection device around the inner perimeter of the tank. Determination operation 1230 then determines (e.g., using the parameters from the inspection command, from selection of a pre-planned path, etc.) a navigational route for the robotic inspection device. The navigational route may avoid known obstacles and may be dynamically updated (e.g., based on sensor measurements) as the robotic inspection device navigates the tank's inner perimeter. Recording operation 1240 can use the sensors to inspect the seal located below the weather shield. If a seal fault is detected, additional measurements (e.g., from different angles or using different sensors) may be taken in some embodiments. As such, the inspection process may dynamically depend on the measurements being recorded, external commands, and the like.

Figure 13:
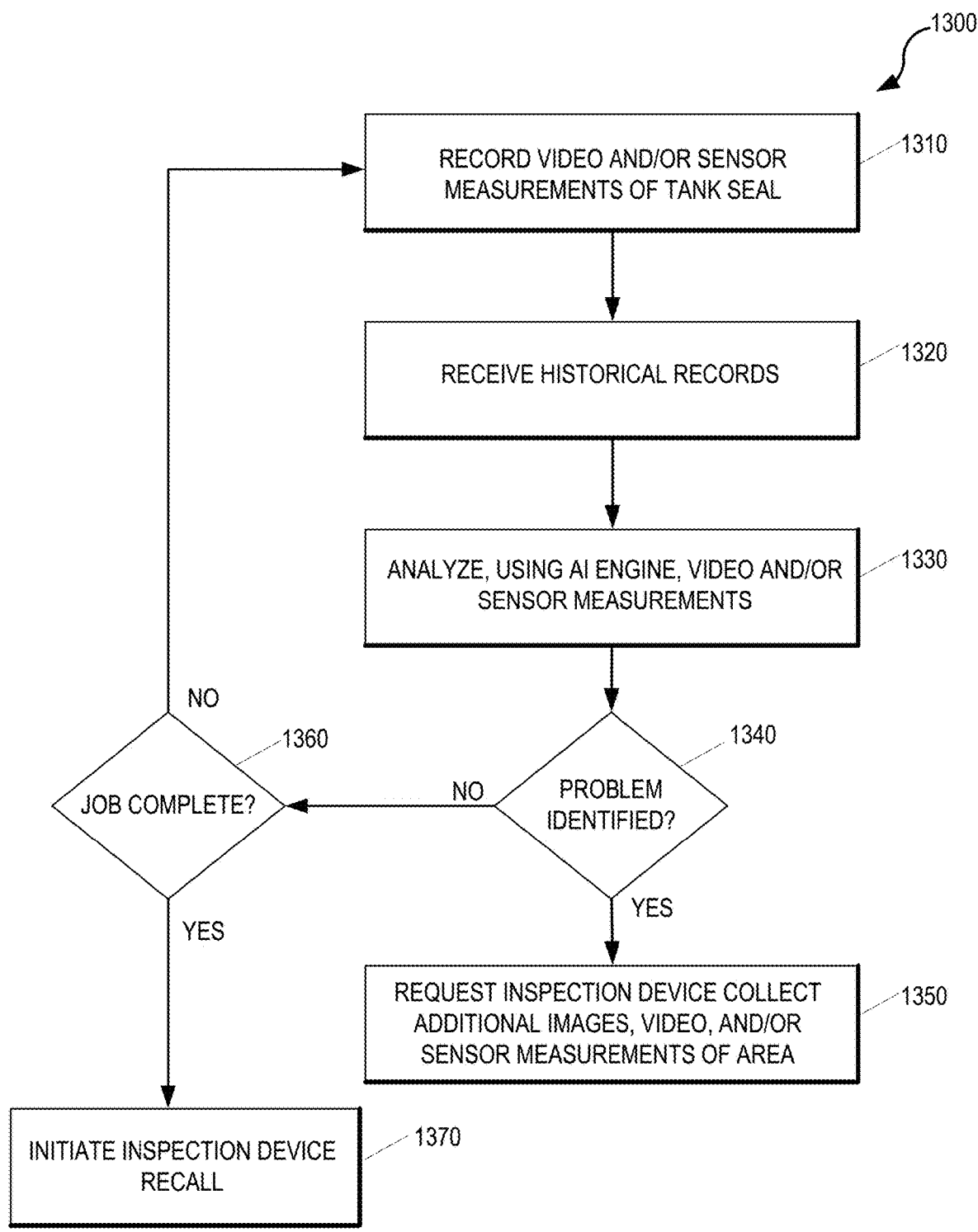
FIG. 13 is a flowchart illustrating an example of a set of operations for generating inspection data via the robotic inspection device in some embodiments of the present technology.

FIG. 13 is a flowchart illustrating an example of a set of operations 1300 for generating inspection data via the robotic inspection device in some embodiments of the present technology. Recording operation 1310 can record video and/or sensor measurements of the tank seal. In some embodiments, the recording operation may take still images with high resolution, use thermal imaging sensors, measurements using chemical sensors, and the like. In some embodiments, the recordings and measurements from the integrated sensors (e.g., cameras, LIDAR, depth sensors, stereovision, etc.) on the robotic inspection device may be stored locally and retrieved once the inspection is complete. In other embodiments, the recordings and measurements may be streamed back to a remote computing device where the results can be analyzed in real-time. This real-time analysis can allow for additional data to be collected in suspect areas or areas of interest. Recording operation 1310 may also format the data (e.g., video or sensor data) into compliant formats before storing or streaming the data.

During retrieval operation 1320, various historical records of the seal can be retrieved. The historical records can include installation dates, part numbers, manufacturing lots, previous inspection reports, video, and/or sensor data, chemicals stored within the tank, geographic location, and the like. Using, for example, a machine learning or artificial intelligence engine, analysis operation 1330 can analyze the current inspection data. The machine learning or artificial intelligence engine can ingest the historical records and the current measurements and identify possible failures within the seal. In some embodiments, the results may include a flag which can trigger additional real-time inspections (e.g., additional imaging or collection of sensor data). In accordance with various embodiments, the machine learning, artificial intelligence, or other decision-making engine can use one or more supervised, semi-supervised, or unsupervised learning techniques.

Determination operation 1330 takes the output from analysis operation 1330 and determines whether a problem has been identified. When determination operation 1340 determines a problem exists, then determination operation 1340 can branch to request operation 1350 where additional inspection data (e.g., additional images, video, and/or sensor measurements) of a particular area is requested. The robotic inspection device can process the request and collect additional inspection data for review by a human technician or by a machine learning or artificial intelligence engine. When determination operation 1340 determines that the analysis did not identify a problem, then determination operation 1340 can branch to completion decision 1360 where a determination can be made as to whether the job is complete. When completion decision operation 1360 determines that the job is not complete, then completion decision operation 1360 can branch to recording operation 1310 where another area of the seal is inspected. When completion decision operation 1360 determines that the job is complete, then completion decision operation 1360 can branch to recall operation 1370 where an inspection device recall is initiated. The recall may cause the robotic inspection device to return to the starting location to be retrieved by the operators. In some embodiments, the recall may cause the robotic inspection device to search for a beacon and navigate to that location.

Figure 14:
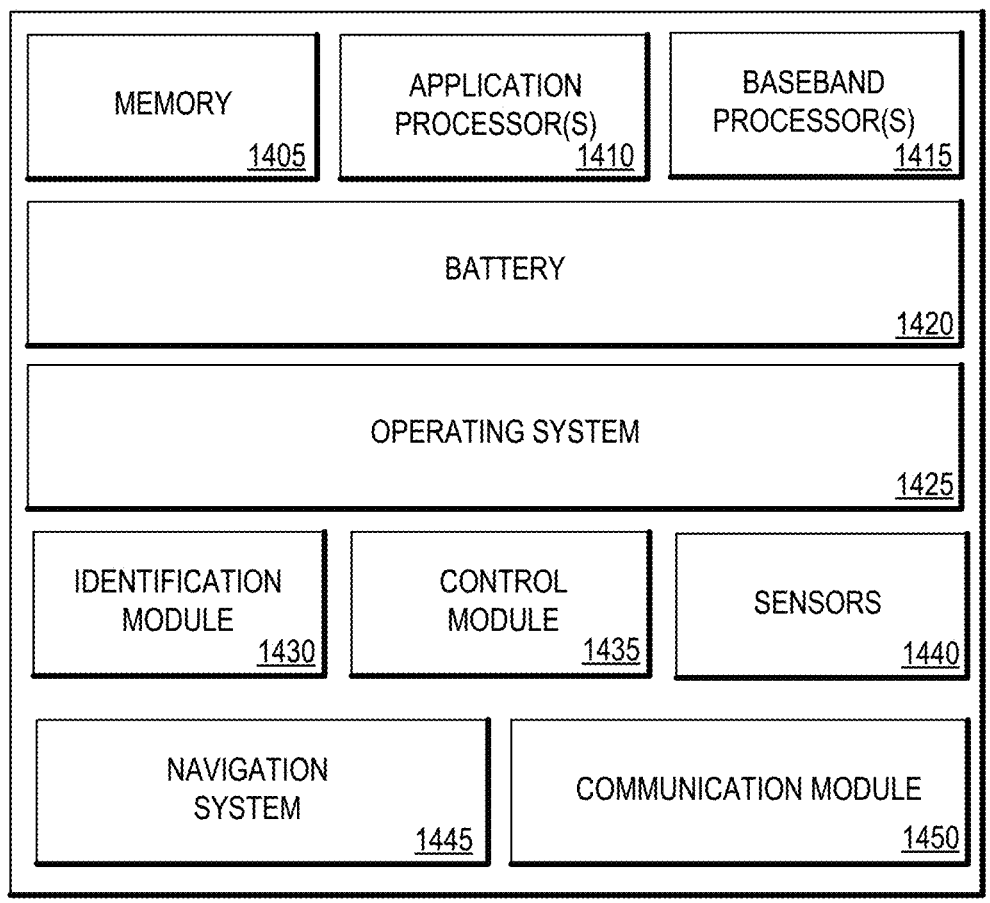
FIG. 14 illustrates a set of components of the robotic inspection device that may be used in various embodiments of the present technology.

FIG. 14 illustrates a set of components of the robotic inspection device that may be used in various embodiments of the present technology. According to the embodiments shown in FIG. 14, the robotic inspection device can include memory 1405, one or more processors (e.g., application processors 1410 and/or baseband processors 1415), power source 1420 (e.g., battery), operating system 1425, identification module 1430, control module 1435, sensors 1440, navigation system 1445, and communication module 1450. Each of these modules can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module.

Memory 1405 can be any device, mechanism, or populated data structure used for storing information. In accordance with some embodiments of the present technology, memory 1405 can encompass any type of, but is not limited to, volatile memory, nonvolatile memory and dynamic memory. For example, memory 1405 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 1405 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 1405.

Memory 1405 may be used to store instructions for running one or more applications or modules on processor(s) 1410. For example, memory 1405 could be used in one or more embodiments to house all or some of the instructions needed to execute the functionality of operating system 1425, identification module 1430, control module 1435, sensors 1440, navigation system 1445, and/or communication module 1450. Operating system 1425 can provide a software package that is capable of managing the hardware resources of the robotic inspection device. Operating system 1425 can also provide common services for software applications running on application processor(s) 1410.

Identification module 1430 may analyze the sensor data in real-time to identify any faults with the seal. Control module 1435 can control the operations of the robotic inspection device. For example, control module may control magnets for coupling the device to the wall of the tank, sensors 1440, and/or navigation system 1445 which can control the drive wheels. Communication module 1450 can transmit and receive signals between the robotic inspection device and an external computing platform (e.g., laptop, cloud-based inspection platform, etc.).

Figure 15:
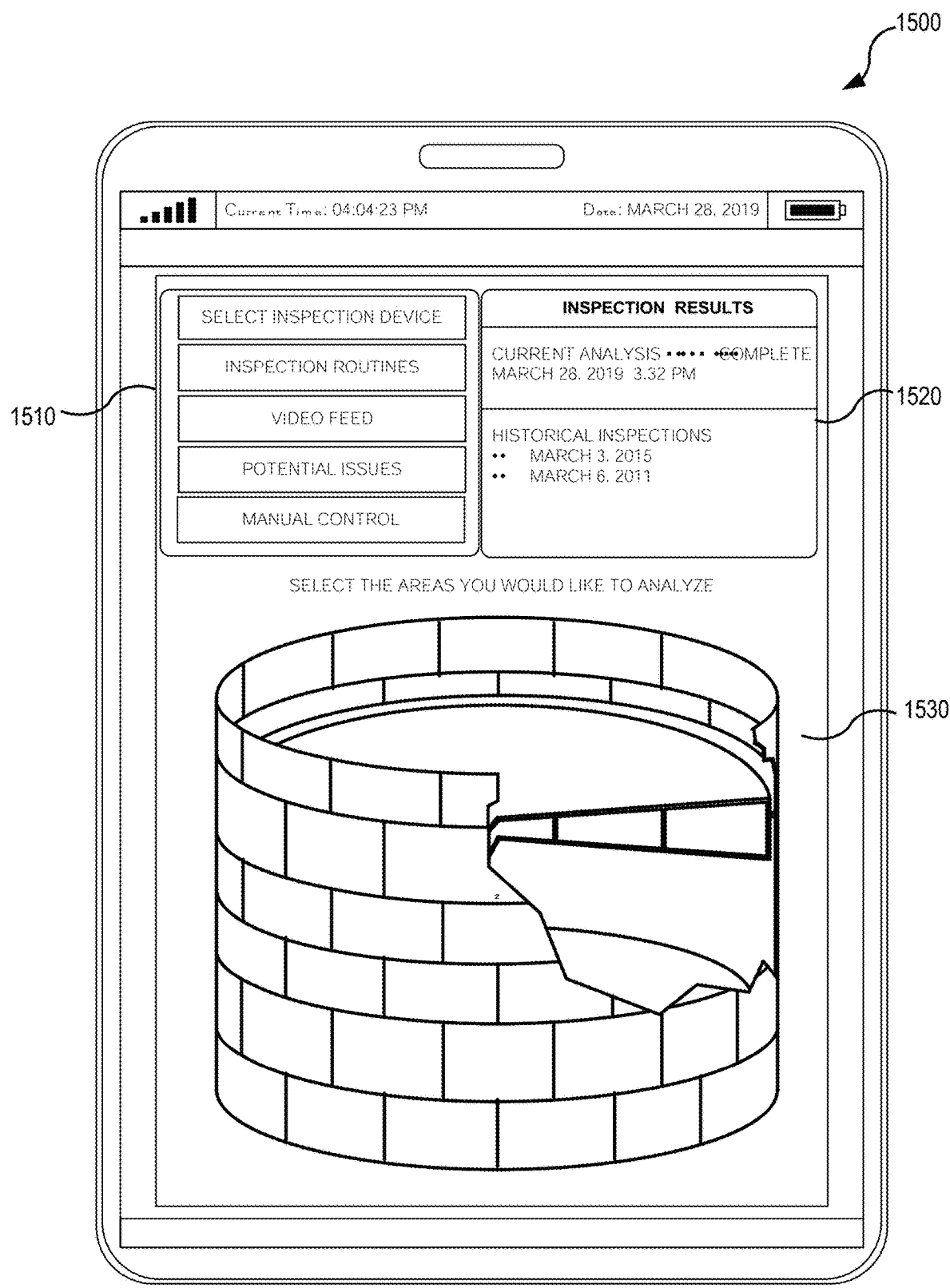
FIG. 15 illustrates an example of a graphical user interface that may be used in one or more embodiments of the present technology.

FIG. 15 illustrates an example of a graphical user interface 1500 that may be used in one or more embodiments of the present technology. Graphical user interface 1500 may include a control panel 1510 that allows the user to select the inspection device, inspection routines, view of video feed, see identified issues, and/or control the robotic inspection device manually. Inspection panel 1520 can all the user to see the status of the current inspection results and/or view historical records. Data panel 1530 can display the selections of the user. For example, data panel 1530 can display the historical inspection results, live video feed, sensor data, and the like as selected by the user.

Figure 16A:
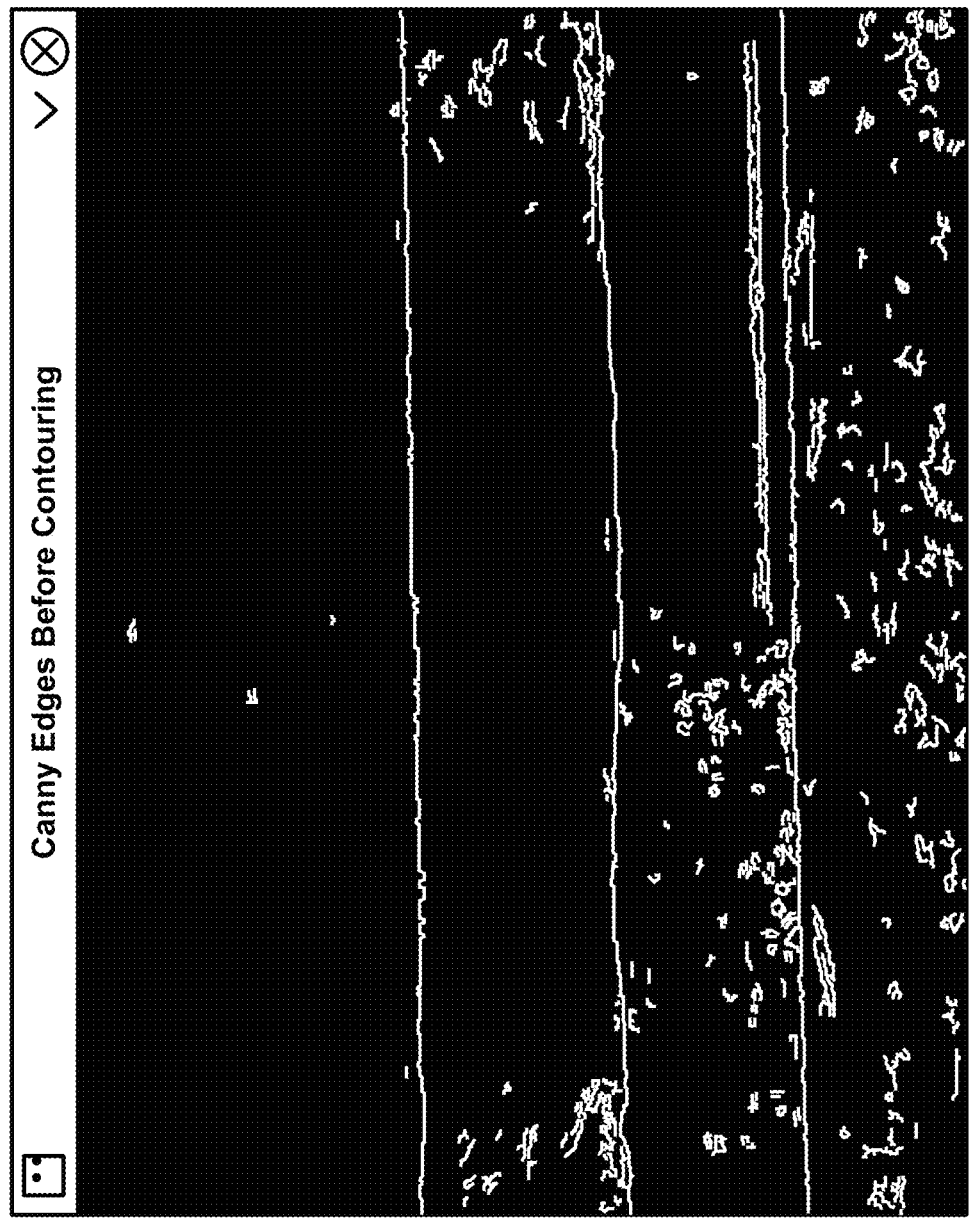
FIGS. 16A-16C illustrate examples of images collected and processed to identify degradation of a seal according to some embodiments of the present technology.
Figure 16B:
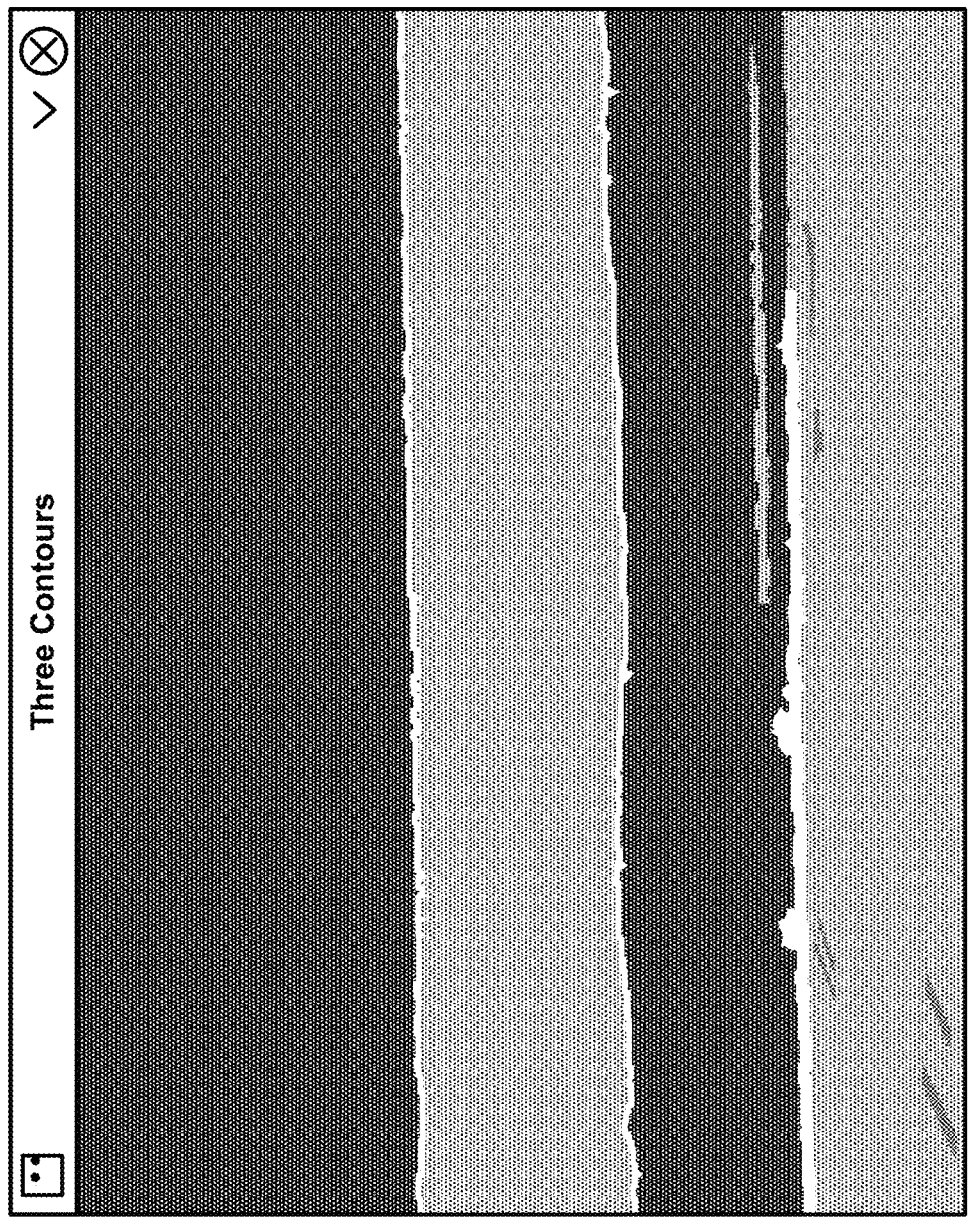
Figure 16C:
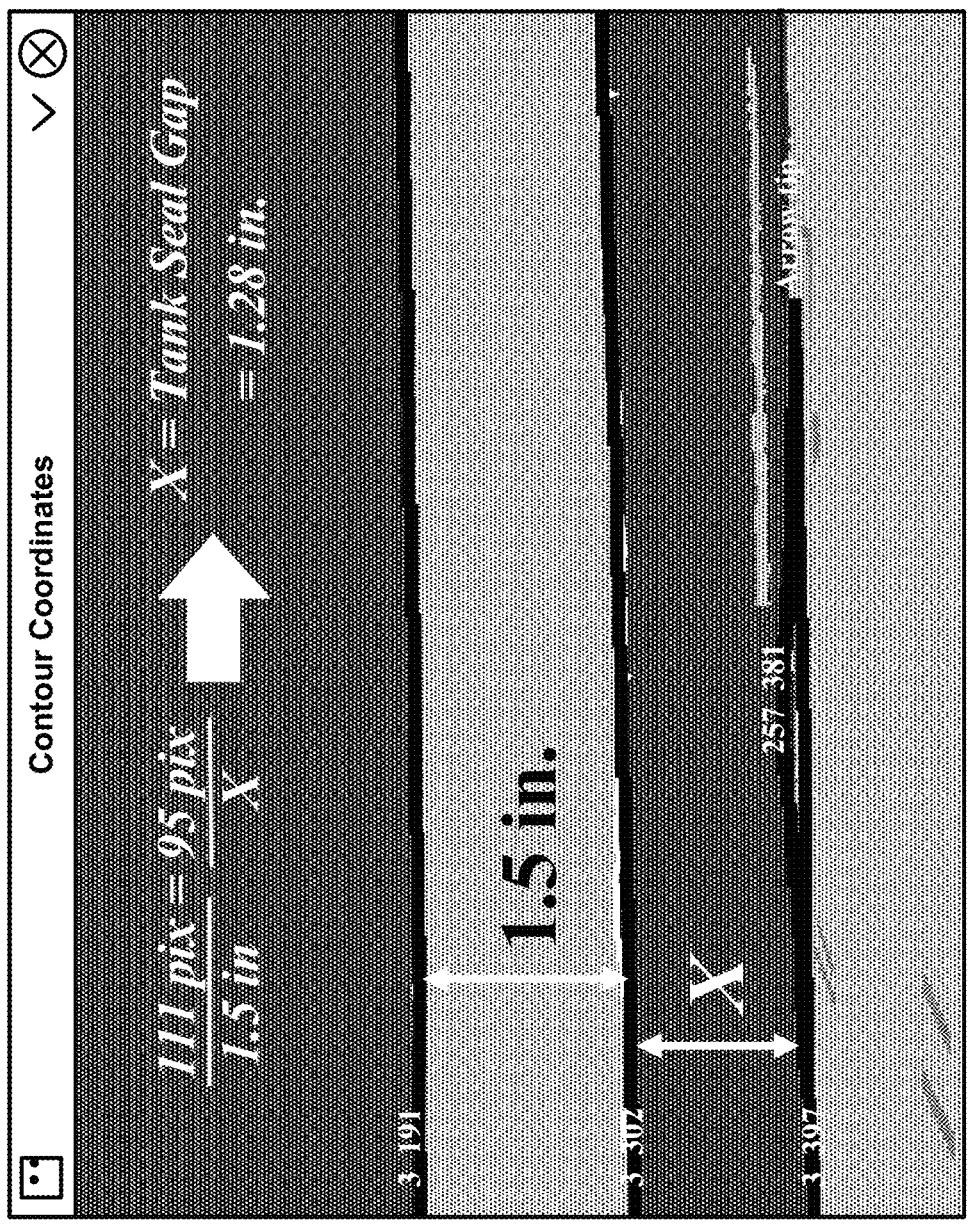

FIG. 16A-16C illustrates example of images collected and processed to identify degradation of a seal according to some embodiments of the present technology. These are example output of the edge detection method which allows the vehicle to determine the gap width between the seal and the tank wall.

Figure 17A:
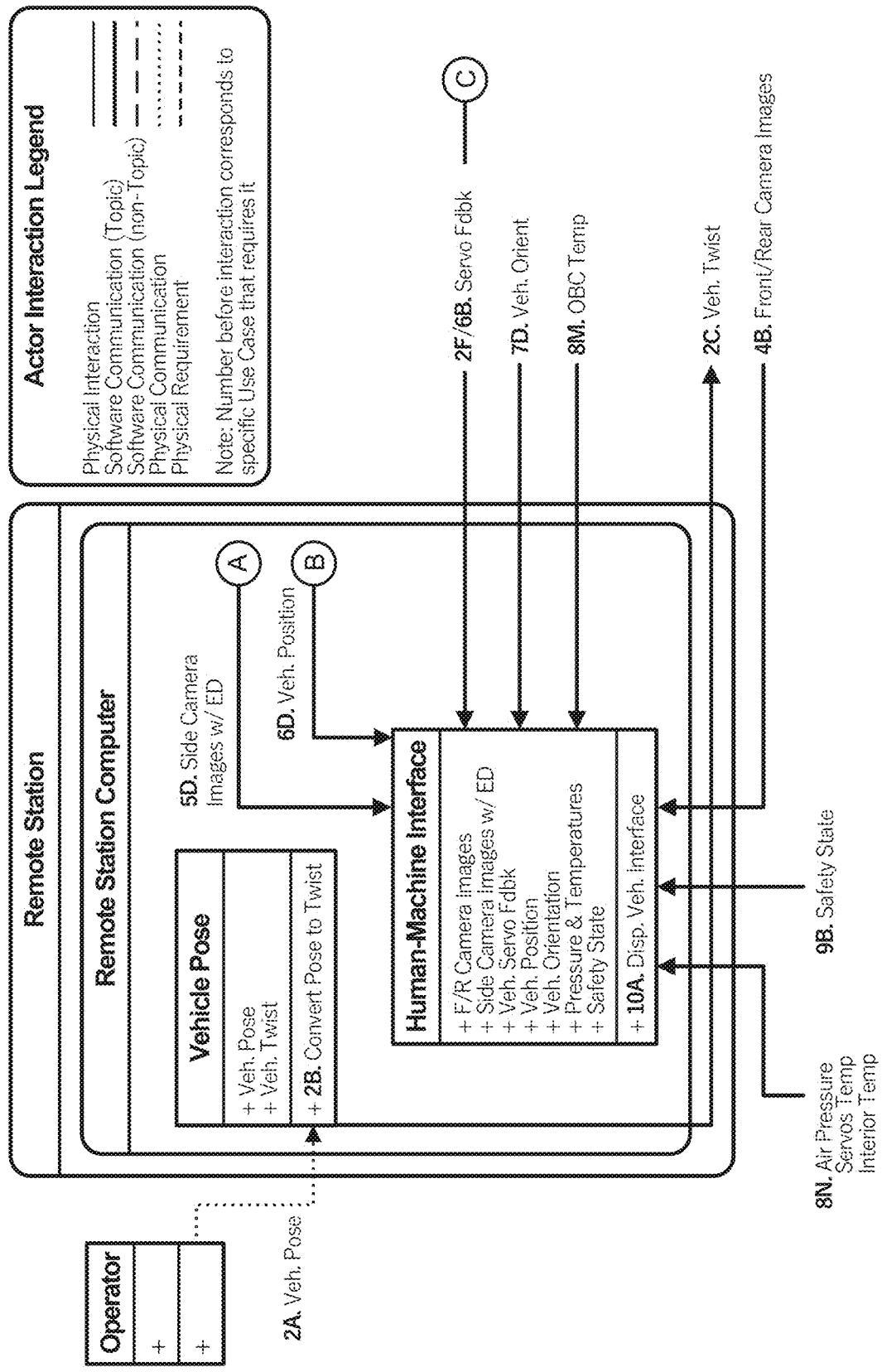
FIGS. 17A and 17B illustrate examples of functional block diagrams illustrating logical interconnections that may be created between various components of the robotic inspection device according to various embodiments of the present technology.
Figure 17A:
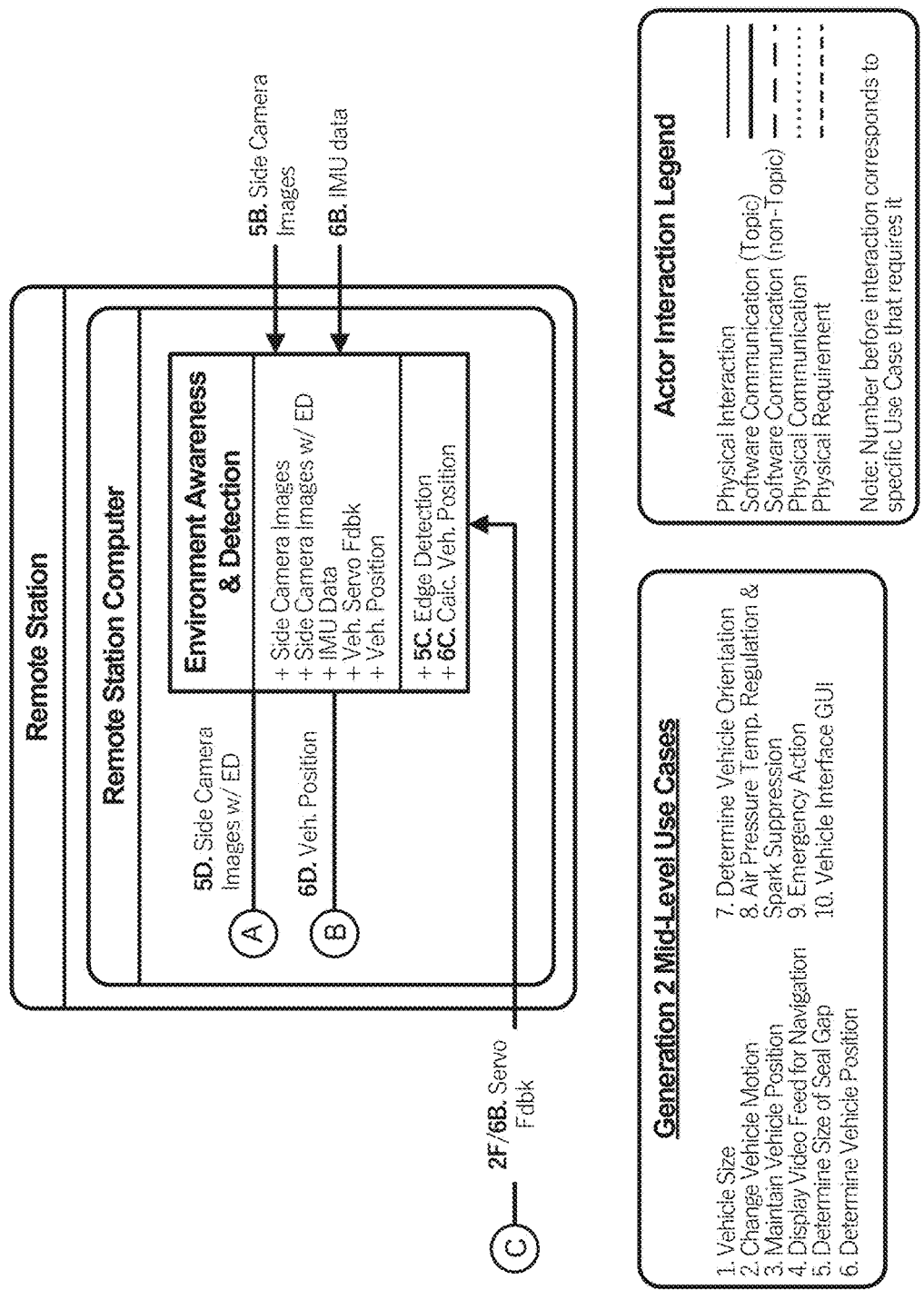
Figure 17B:
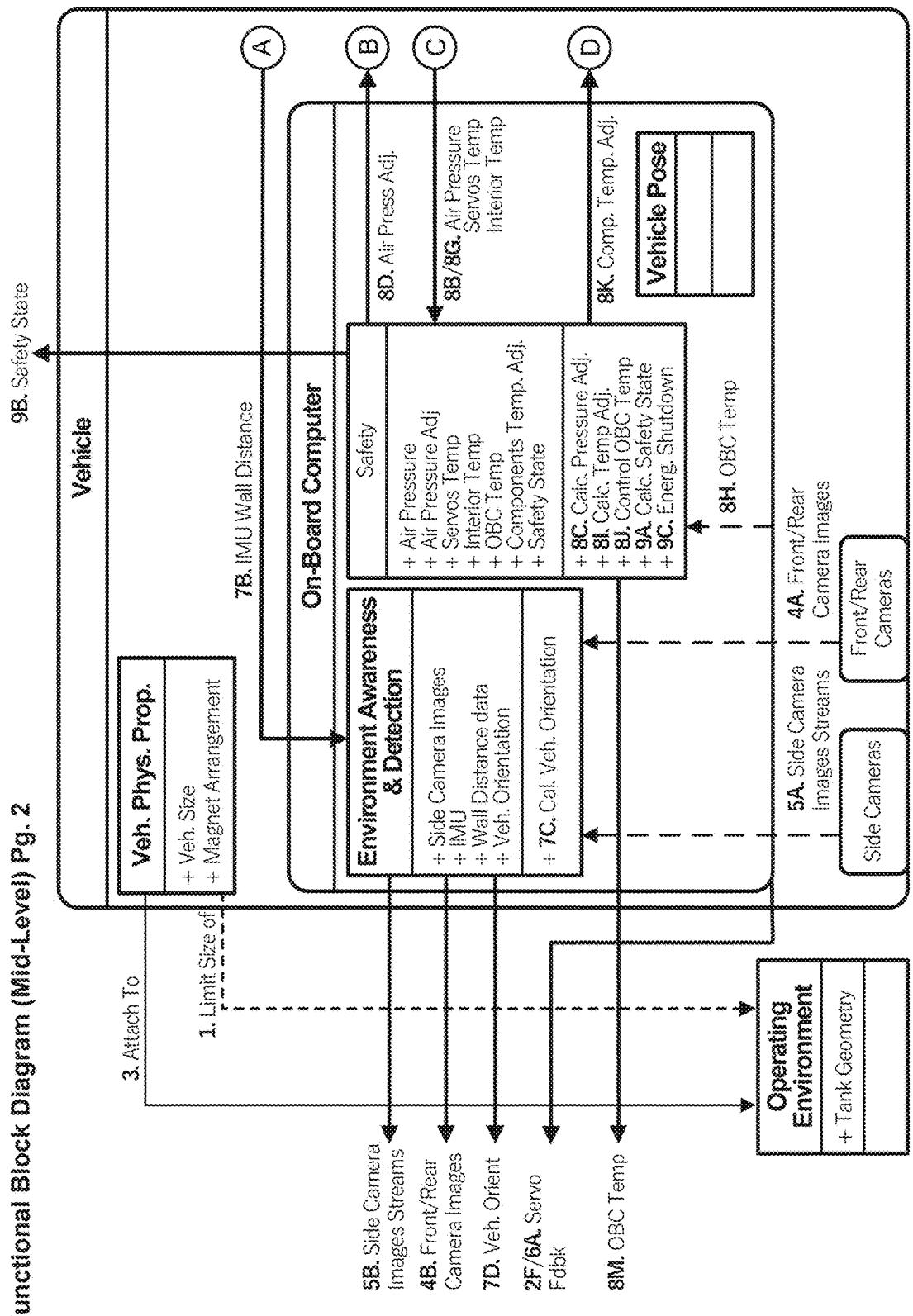
Figure 17B:
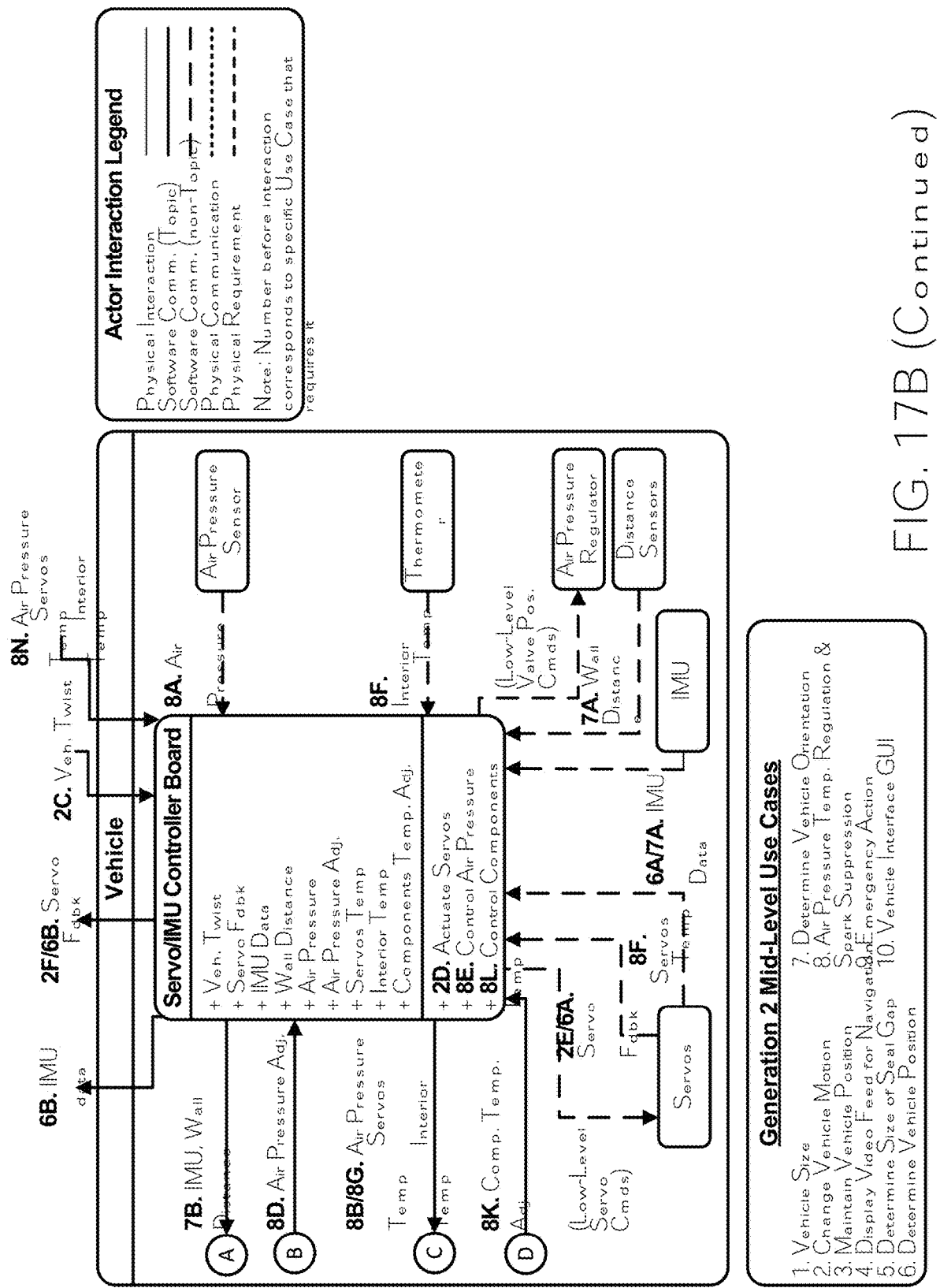

FIGS. 17A-17B illustrate examples of functional block diagrams illustrating logical interconnections that may be created between various components of the robotic inspection device according to various embodiments of the present technology.

Example 1

Figure 18:
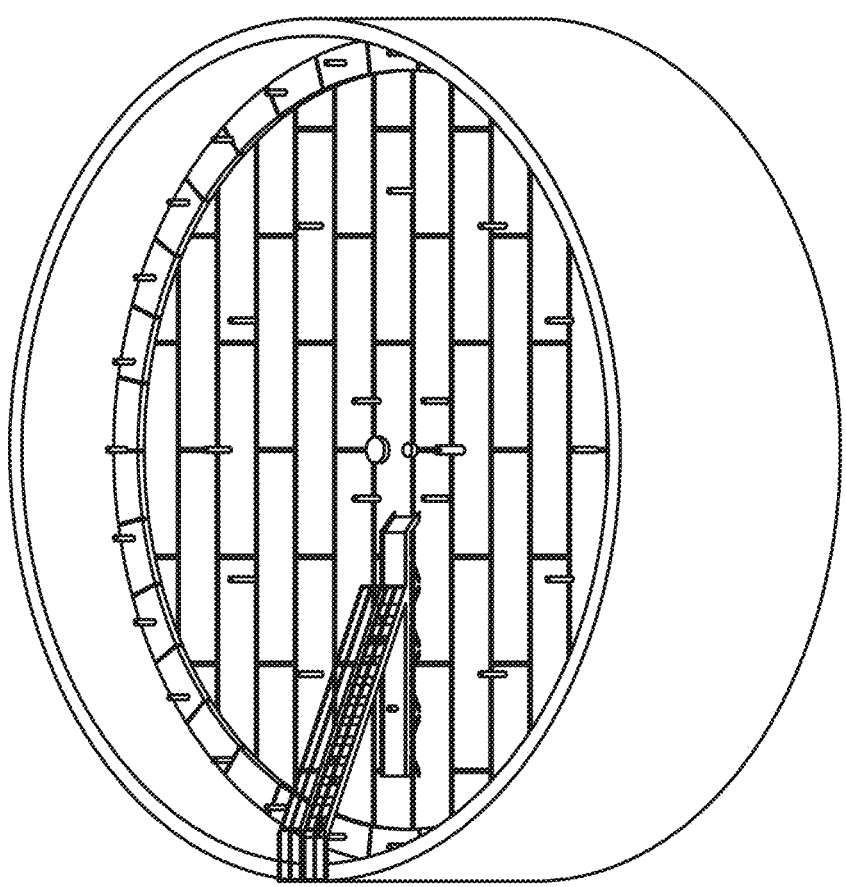
FIG. 18 presents a typical open-roof or external floating roof storage tank (FRT).
Figure 19:
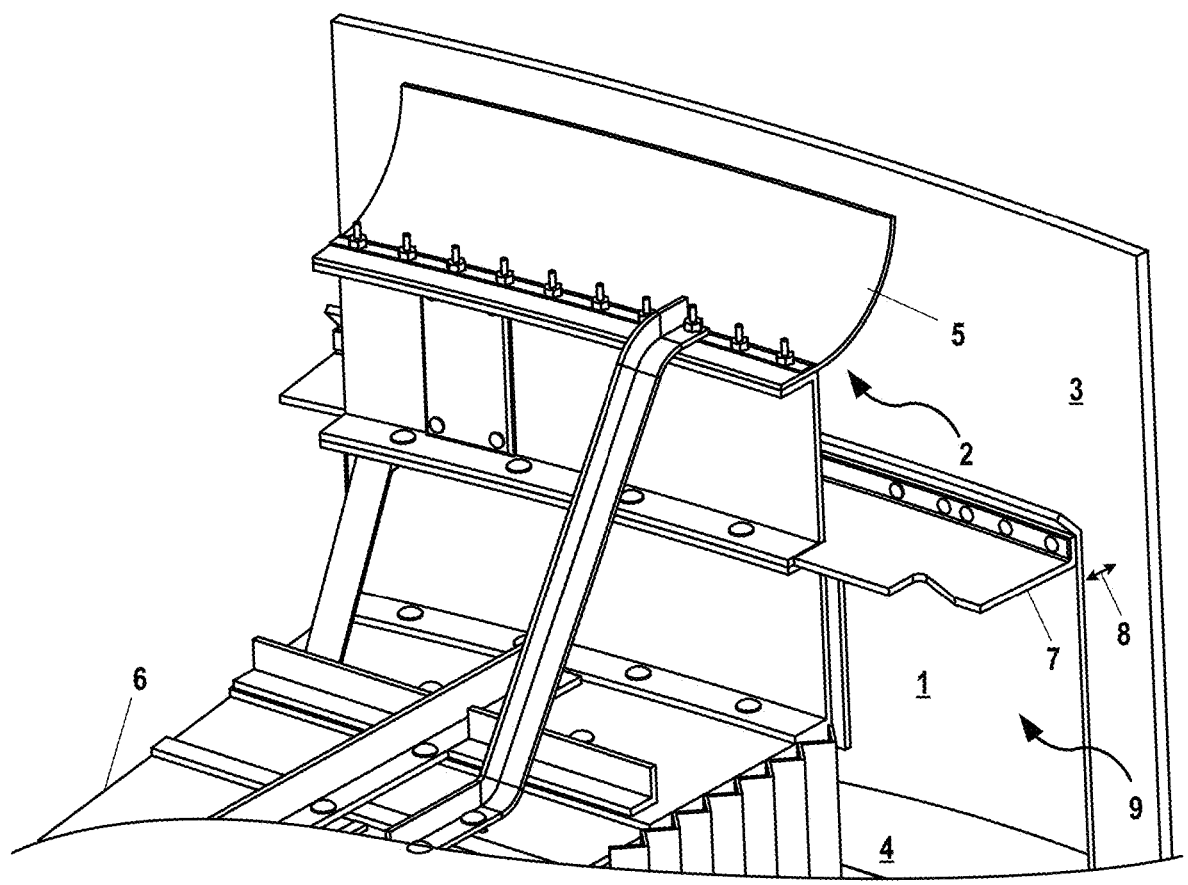
FIG. 19 illustrates a specific part of that storage tank known as the floating roof seal assembly.

Regarding the object of inspection for the present technology, FIG. 18 presents a typical open-roof or external floating roof storage tank (FRT) and FIG. 19 illustrates a specific part of that storage tank known as the floating roof seal assembly. FRTs are commonly used for storing large quantities of crude oil, gasoline, jet fuel, diesel, etc. across both midstream and downstream segments of the global energy industry. FRTs are often large (from 40 to 300 ft in diameter) closed or open-topped cylindrical steel shells with a roof 6 that floats on the top of the liquid 4. The roof falls and rises as the level of liquid 4 product in the tank changes, leaving little to no space between the roof 6 and the liquid 4. A lower liquid seal (LLS) 7 and an upper vapor seal (UVS) 5 are in place on the outer edge of the roof 6 to prevent the evaporation of volatile chemicals. UVS 5 and LLS 7 may together comprise a seal assembly 2. Both seals 5 and 7 maintain a sliding contact with the tank wall 3 and can fail over time due to this up-and-down motion. Escaped vapors are troublesome for four reasons: 1) pollution of the environment, 2) resulting fines for the tank owner from federal and state agencies, 3) financial loss from loss of product, and 4) the potential for fire (due to the high combustibility of vapors in a space 9 between UVS 5 and LLS 7). As a result, maintaining the integrity of floating roofs 6 is a vital risk concern for terminals and refineries. Regular inspection is necessary in order to prevent failure and plan repairs. The current manual inspection process employs a team of five humans (two inspectors, one spotter, and two rescue personnel on standby) equipped with PPE who travel down into the tank to inspect both seals 5 and 7. This inspection employs visual and physical means to assess the integrity or health of the seals 5 and 7. By looking at a few factors (as described in greater detail, below), the inspection crews make a subjective judgement about the seal and decide if it requires repair. This manual inspection is dangerous, costly to perform, and imprecise. The safety paperwork to approve a technician on the floating roof is also very onerous. The inaccuracy and long intervals between inspections also mean that a percentage of defective seals will not be found and thus continue leaking hazardous vapors into the atmosphere.

Figure 20:
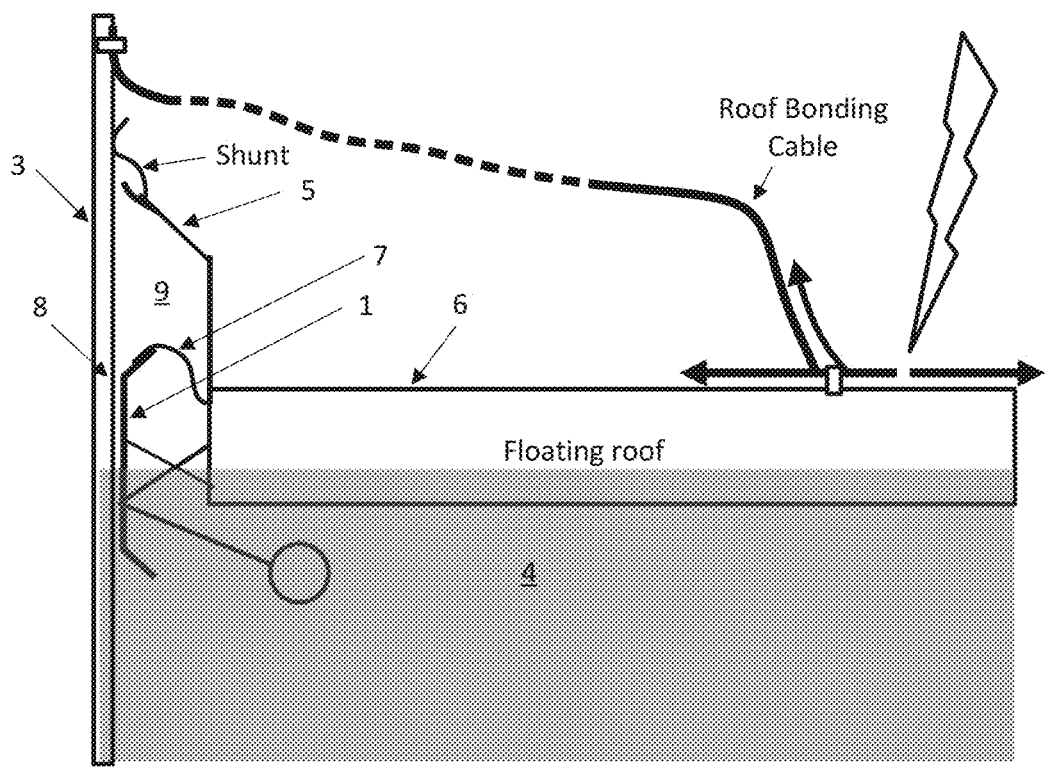
FIG. 20 provides a cross-section view of a typical seal used on open-topped floating roof tanks.

Regarding the condition or state of UVS 5 and LLS 7, FIG. 20 provides a cross-section view of a typical seal assembly 2 used on open-topped floating roof tanks (e.g., as shown in FIG. 18). The defectiveness of UVS 5 and/or LLS 7 depends on two categories of potential seal problems: 1) mechanical integrity and 2) emissions. The mechanical integrity is assessed in two ways: a) through identifying the existence and size of a gap 8 between a metallic shoe 1 and inner tank wall 3 and b) identifying the existence of and size of a tear in the fabric or other material of LLS 7. The size of these features may include measurement of the length, width, and depth of the defect. For the emissions category, a gas monitor can be used to detect concentrations of volatile organic compounds (VOCs) both below (e.g., in space 9) and above the UVS 5. However, in practice, gas monitoring is very rarely done and is sometimes turned off entirely during these inspections. This decision severely impacts the comprehensiveness and quality of the inspection.

To address the issues with the conventional manual methods of floating roof tank seal inspection, automated robotic systems and methods are provided by the present technology. In this regard, the present technology is composed of an inspection robot to navigate around the interior of the storage tank and collect data.

Figure 21:
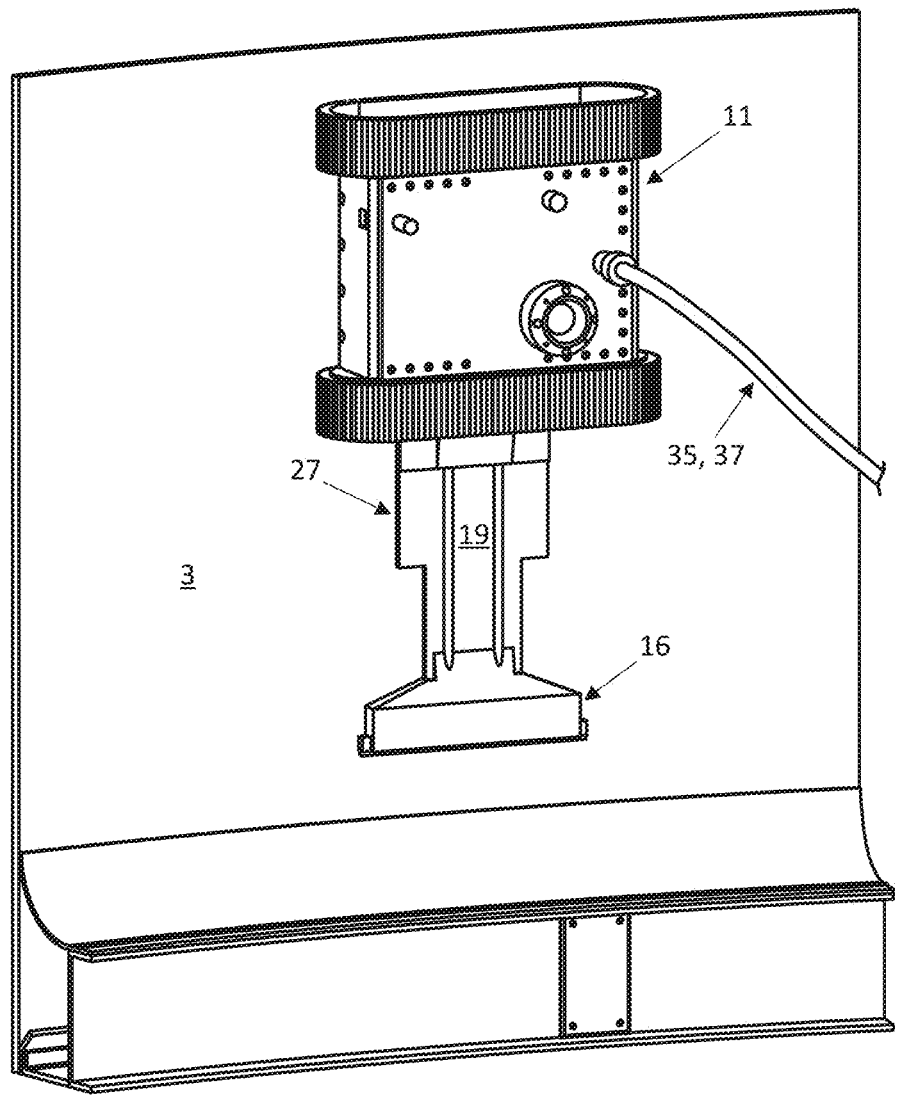
FIG. 21 depicts a tank inspection robot deployed on an interior wall of an FRT in accordance with some embodiments of the present technology.

Referring now to FIG. 21, in some examples of the present technology, the inspection robot 10 is further divided into three subassemblies: 1) an upper drive assembly (UDA) 11 magnetically adhered to the tank shell, for propelling the entire system; 2) a lower sensor package (LSP) 16 offset from the UDA 11; and 3) a connector bridge (CB) 19 that joins the first two sub-assemblies 11 and 16. This design configuration keeps the bulk of the tethered robot 10 above the UVS 5 in a configuration akin to an inverted periscope.

Figure 22:
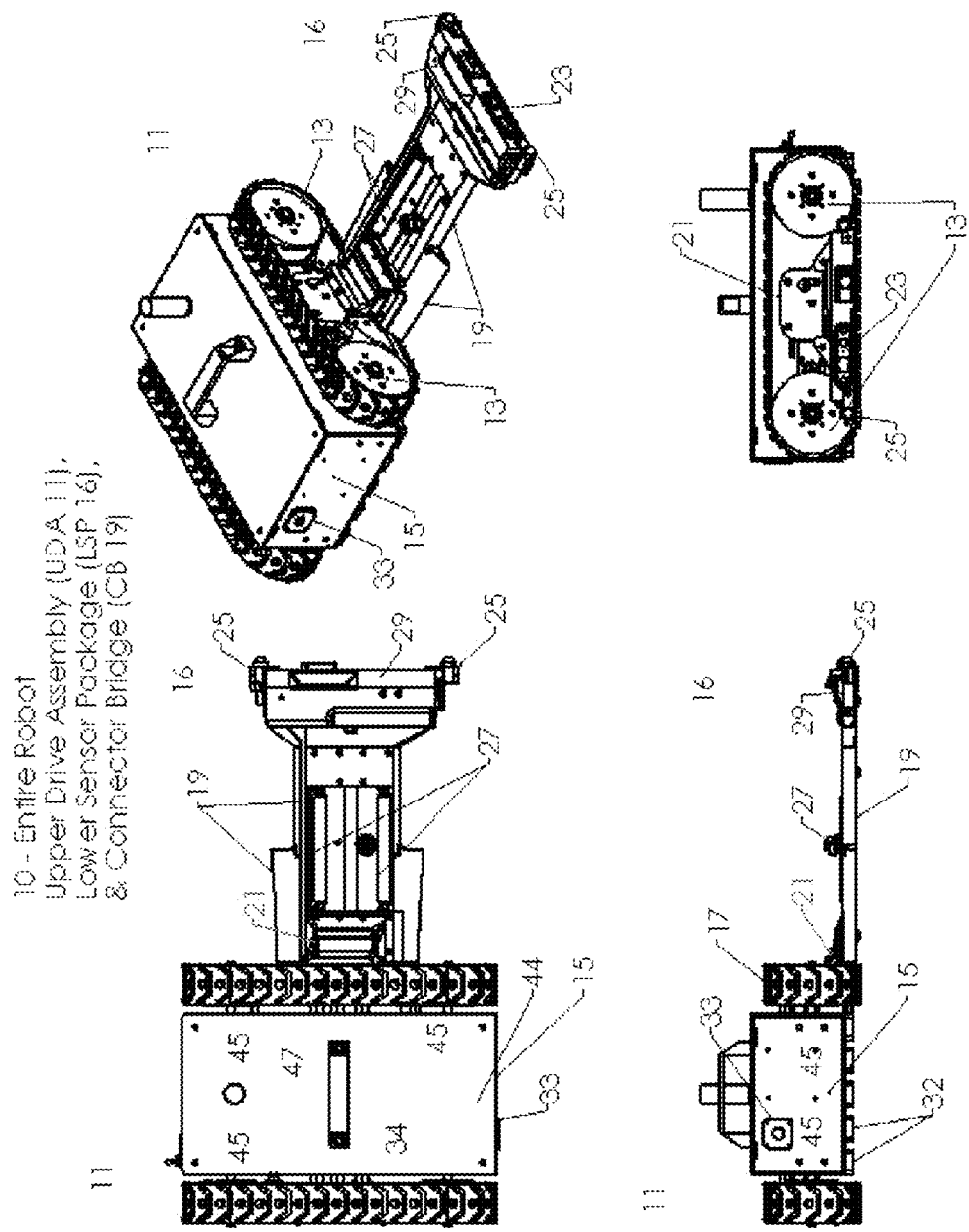
FIG. 22 illustrates top, side, front and perspective views of the robotic inspection device in accordance with some embodiments of the present technology.
Figure 23:
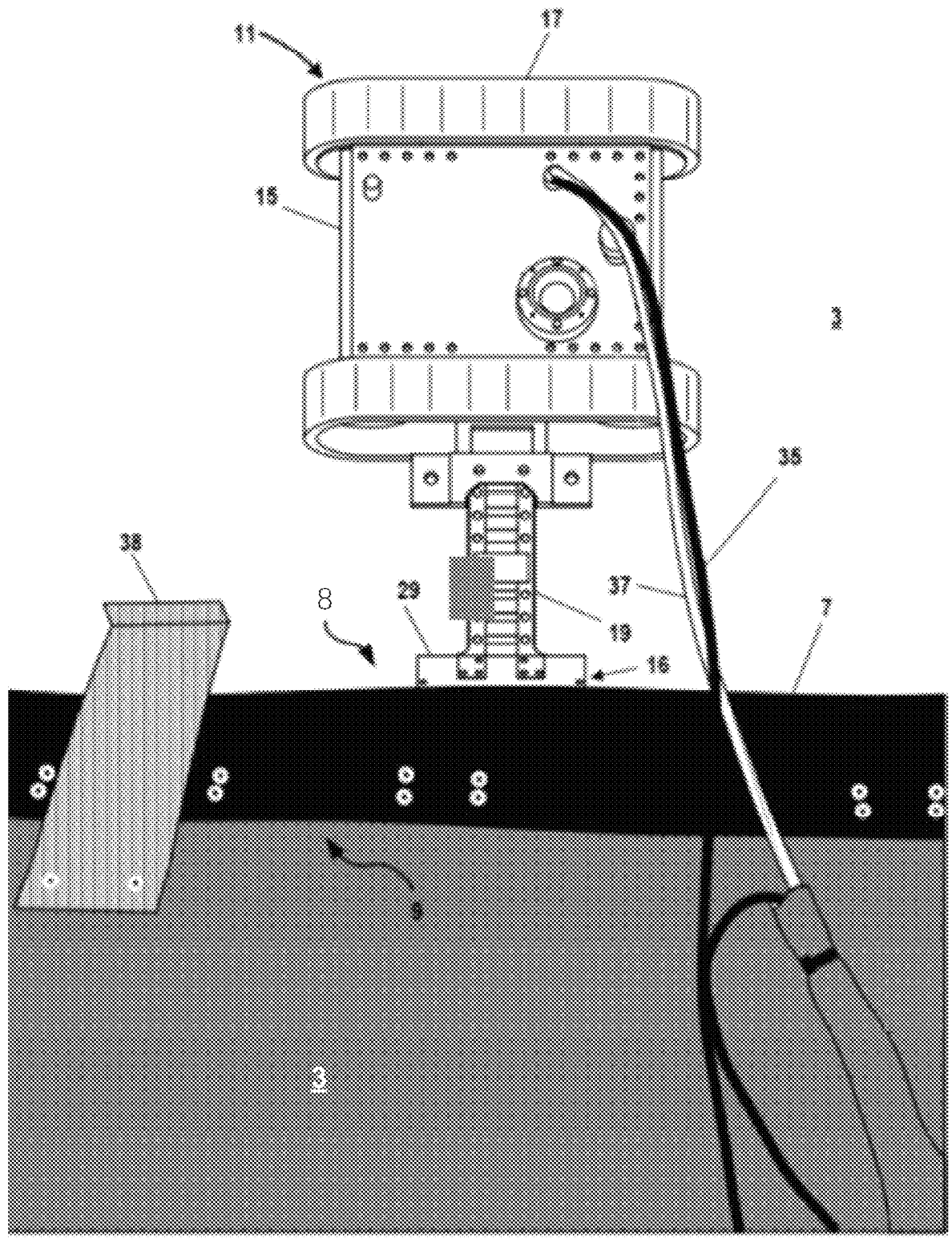
FIG. 23 illustrates an in-situ view of a tank inspection robot in accordance with some embodiments of the present technology.

FIG. 22 illustrates top, side, front and perspective views of the inspection robot 10 in accordance with some embodiments of the present technology. FIG. 23 illustrates an in-situ view of the inspection robot 10 in accordance with some embodiments of the present technology. While inspection robot 10 is described herein as a separate and distinct example embodiment from robotic inspection device 125 as described above with reference to FIGS. 2-17B, inspection robot 10 according to the present technology may include some or all of the features of robotic inspection device 125.

Figure 30:
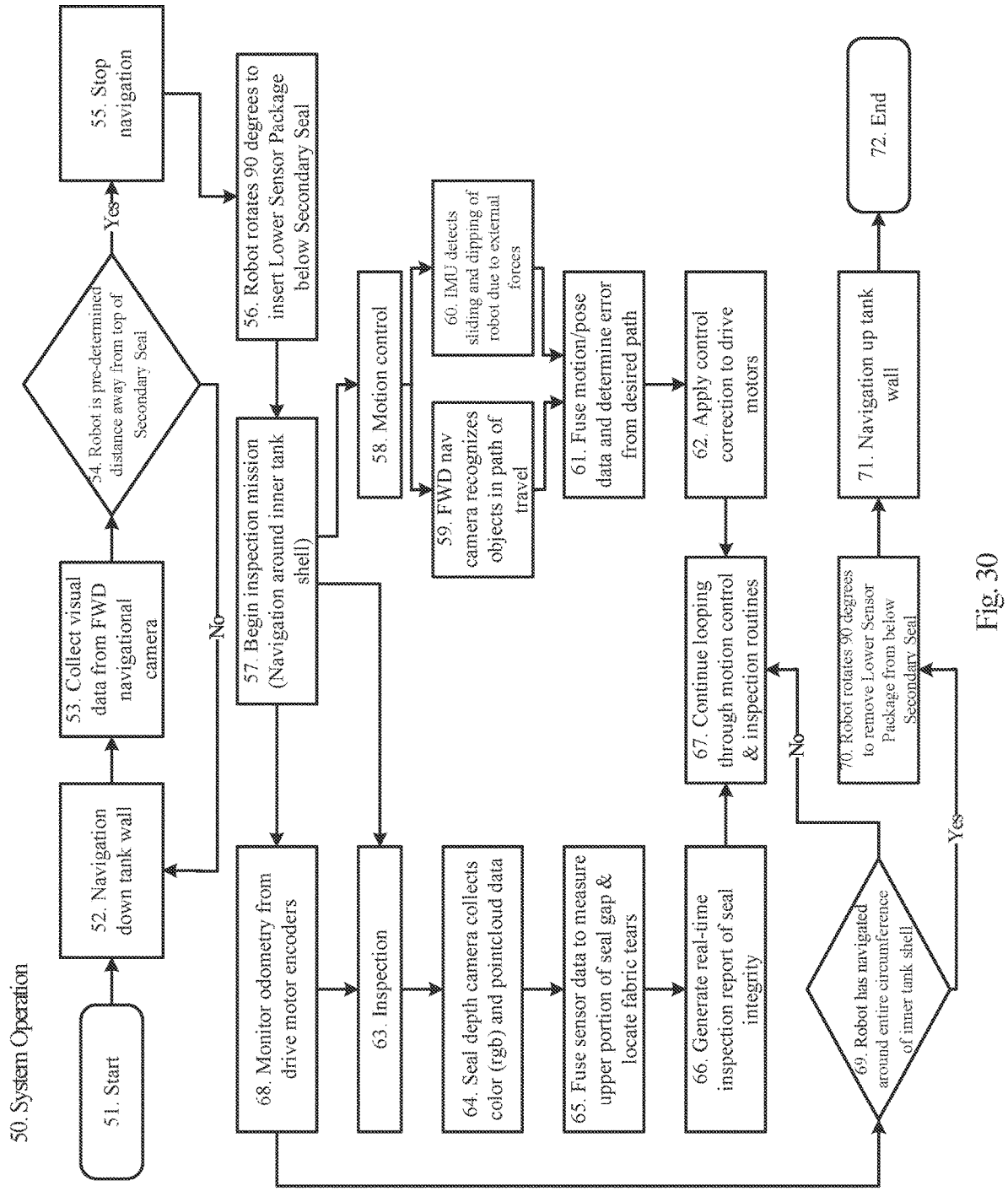
FIG. 30 illustrates a flow chart of a tank inspection method in accordance with some embodiments of the present technology.

The inspection of the floating roof 6 seals 5 and 7 may be carried out through collection and real-time processing of data collected by the LSP 16 as it propelled around the tank wall 3 by the UDA 11. In some examples of the present technology, the LSP 16 houses and employs at least four sensor types to properly evaluate the state or condition of the entire floating roof seal assembly 2. Data collected from the sensors contained in the LSP 16 may include color images or video feeds (RGB), and pointcloud (Depth). The individual processing and fusion of these sensor data are used for determining the mechanical integrity of the seal assembly 2 and the emissions that result. Notably, the process depicted in FIG. 30 is an update to that shown and described above with reference to FIGS. 16A-16C. This data collection is done while the LSP 16 is directly above the LLS 7, as well as when it is directly above the UVS 5. The four different sensors are described in greater detail below.

Referring now to FIGS. 22 and 23, and with further reference to FIGS. 19-20, the UDA 11 of the inspection robot 10 includes at least four motor driven wheels 13 positioned on opposing sides of a housing 15. In the example shown in FIG. 22, inspection robot 11 includes four wheels 13, with two wheels 13 on one side of housing 15, and another two wheels 13 on the opposite side of housing 15. The housing 15 may be equipped, on the bottom side of the housing, with permanent magnets or electro-magnets 32 to enable the entirety of inspection robot 10 to be suspended on a vertical or near vertical wall 3 of the tank, as shown in FIG. 21, while also allowing for actuating the drive system. Wheels 13 may be formed at least in part of a material having magnetic properties sufficient to enable the entirety of inspection robot 10 to be suspended on a vertical or near vertical wall 3 of the tank, as shown in FIG. 21. In an example, UDA 11 of inspection robot 11 with four wheels 13 includes tracks 17, with one track 17 operably coupled to a first pair of wheels 13 on one side of housing 15, and a second track 17 operably coupled to a second pair of wheels 13 on the opposite side of housing 15. In some embodiments, tracks 17 may be formed at least in part of a magnetic material to facilitate enabling the entire weight of inspection robot 10 to be suspended on the wall 3, as shown in FIG. 21. In one example, tracks 17 instead of wheels are formed at least in part of the magnetic material. In another example, both tracks 17 and wheels 13 are formed at least in part of the magnetic material.

Other capabilities that may exist within the inspection robot 10 include 1) a forward and/or rear navigational camera 33, 2) computers/memory storage devices 34, 3) wired and/or wireless communications interface(s) 40, 4) inertial measurement unit(s) (IMU(s)) 41, 5) actuators for sensor deployment 42, each of which being configured in a manner sufficient to facilitate operation of inspection robot 10 according to the present technology.

Regarding the LSP 16 and the sensors housed within, some embodiments may include visual sensors. In the situation where the LSP 16 is inspecting the LLS 7 and also possibly the space 9, this sub-assembly 16 will be located below the UVS 5. In-the case where the UVS 5 is being inspected, it will be located above LLS 7. In either situation, the distance that the LSP 16 will be positioned from the object of inspection may be calibrated for each tank and seal. A low-profile design of a housing 29 of LSP 16 may facilitate its insertion and travel around the small space of the seal assembly 2. These sensors of LSP 16 may be installed or otherwise configured such that they point or are directed down at the object of interest (e.g., UVS 5 or LLS 7).

Regarding visual sensors, the LSP 16 may include a depth camera 23 used to collect color (RGB) and pointcloud data. The LSP 16 may also include one or more light(s) 25 (e.g., light emitting diode (LED)) situated proximal to (e.g., to the side of) the depth camera 23 to illuminate an area or interest and facilitate the collection of color and pointcloud data.

Regarding the connector bridge (CB) 19 that joins the UDA 11 and LSP 16 via a side plate mount 21, this allows for power and communication between the two sub-assemblies 11 and 16, in addition to providing the force necessary to propel the LSP 16 alongside the UDA 11 while it is moving, akin to a sidecart. Some embodiments of the CB 19, as shown in FIGS. 21 and 22, may include active or passive roller elements 27 designed to minimize friction between the CB 19, UVS 5, and tank shell 3 during an inspection of the LLS 7 and/or space 9. This minimization of friction while the UVS 5 is sliding across the CB 19 facilitates a successful navigation around the inner tank wall 3. In some embodiments, these roller elements 27 may exist both above and below the CB 19, as well as proximal to the CB 19. In some embodiments, the roller elements 27 may be actively driven, as by motor(s). In some cases, the same energy imparted by the drive motors of UDA 11 into the wheels 13 to move tracks 17 may be further directed into the roller elements 27 through a gearing mechanism (not depicted). The CB 19 may also include features designed to help pry open the lightning protection grounding straps 38 that exist at regular intervals around the tank, affixed to the UVS 5.

Figure 24:
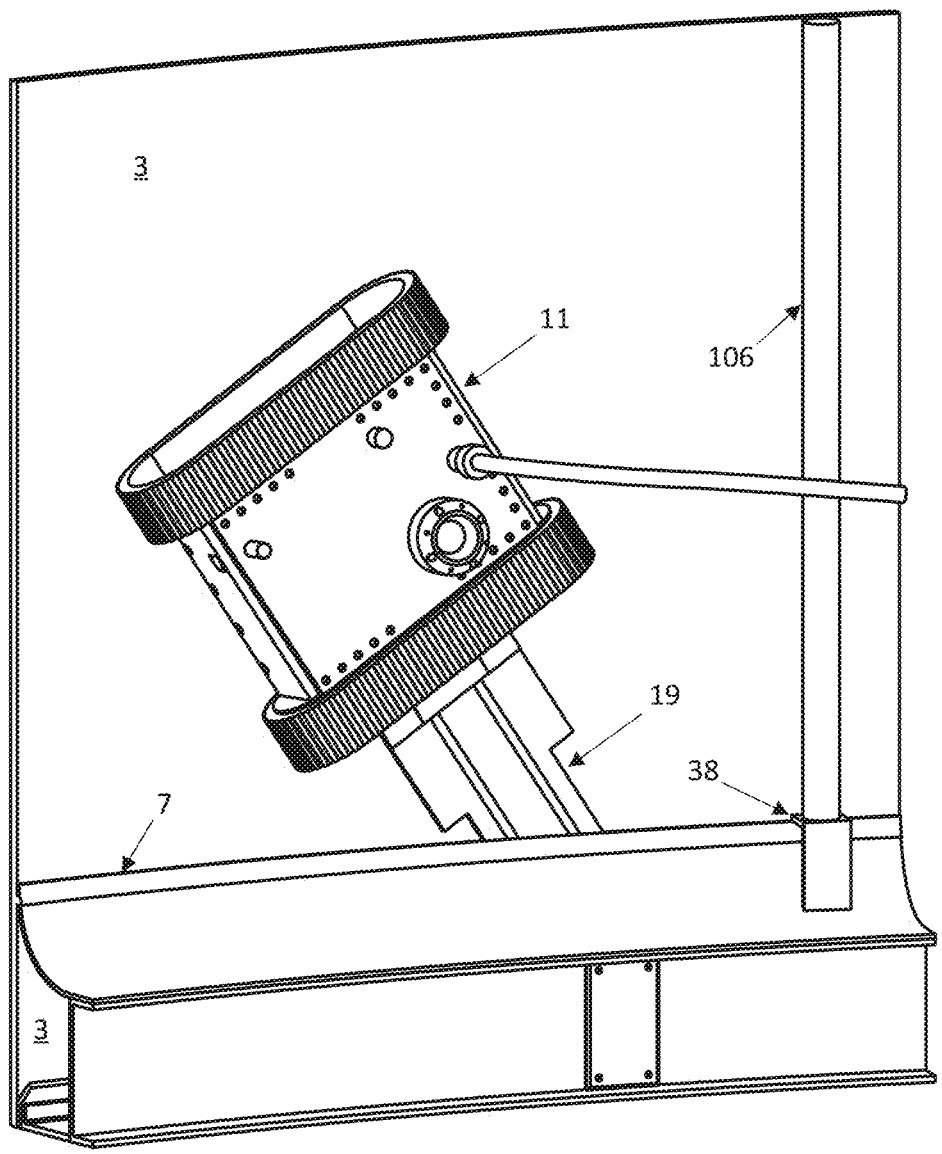
FIG. 24 depicts manipulation of an FRT upper vapor seal by an insertion and extraction tool.
Figure 25:
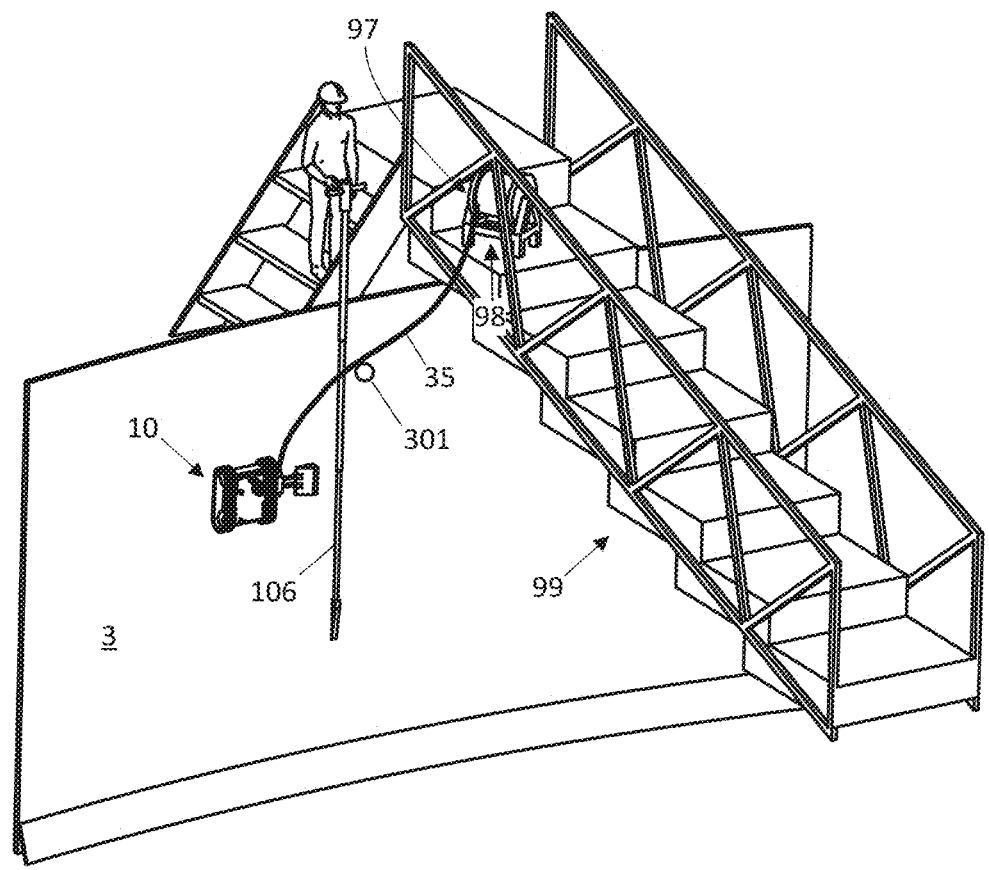
FIG. 25 illustrates deployment of a tank inspection robot with a tether management system according to some embodiments of the present technology.
Figure 26:
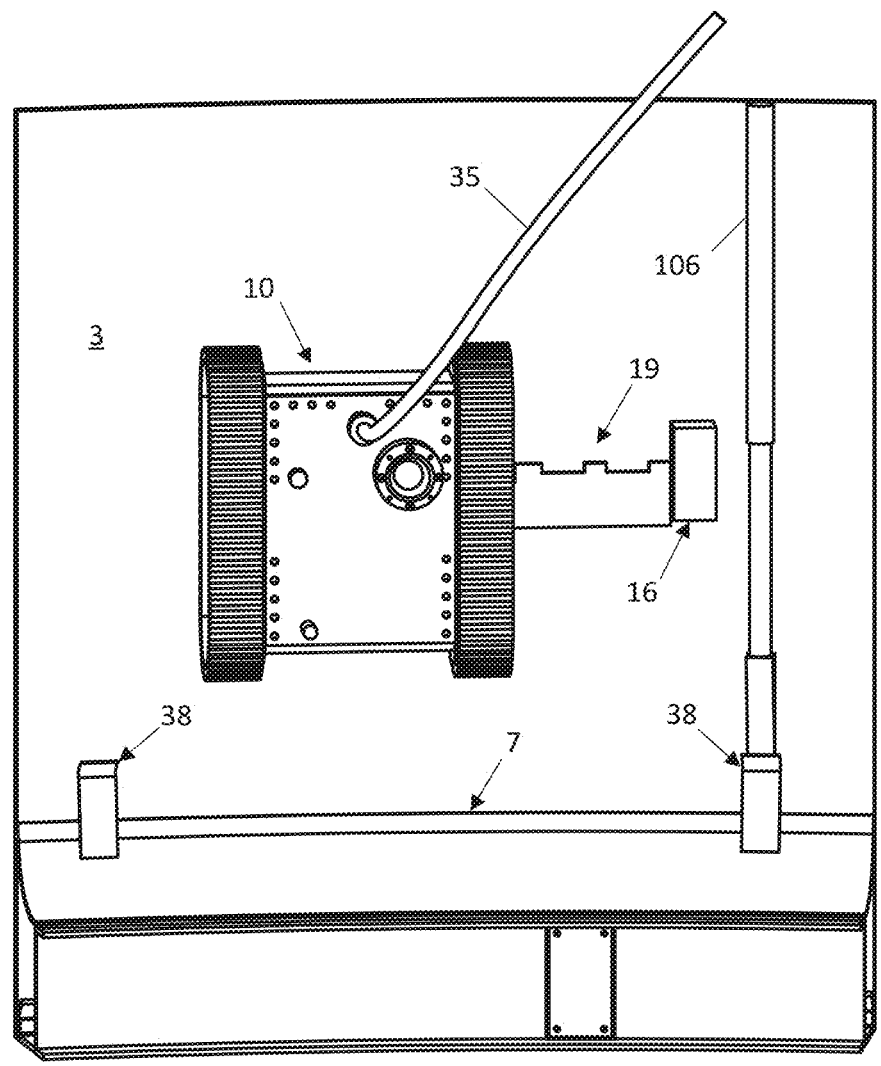
FIG. 26 depicts deployment of a tank inspection robot with an attached tether and an insertion and extraction tool according to some embodiments of the present technology.

An Insertion/Extraction Tool (IET) 106 may be used to manipulate the UVS 5 to allow for insertion of the LSP 16 into the space 9 between the seals, as demonstrated in FIGS. 24-26. The IET 106 may be a carbon fiber pole with a wedge-type feature at the bottom, and it may be deployed from the top of the tank by the operator or through motor-powered actuation. In some instances, it may also be used as part of the TMS 98, previously discussed. The IET 106 in the form presented here is reserved exclusively for servicing external FRTs.

Regarding the sequential mission of the tank inspection robot 10 according to the present technology, in some embodiments, the inspection robot 10 is placed at the top of the tank by a single operator, as seen in FIG. 25. Using its magnetic adhesion ability provided by magnet(s) 32 and drivetrain 45, it travels down the tank wall 3 to a location directly above the UVS 5 and roof 6. The LSP 16 is inserted into the space 9 between the seals 5 and 7. Using the cable-carrying CB 19, which joins the two sub-assemblies 11 and 16 of inspection robot 10, the UDA 11 is commanded to rotate, which positions the LSP 16 directly above the LLS 7 to gain visual access to it. It is now ready to collect useful data about the mechanical integrity of the LLS 7. The connector bridge 19 experiences a large compressive force from the UVS 5. The inclusion of roller elements 27 and thickness of joining parts minimizes this adverse friction and allows for ease of motion around the tank shell.

Figure 27:
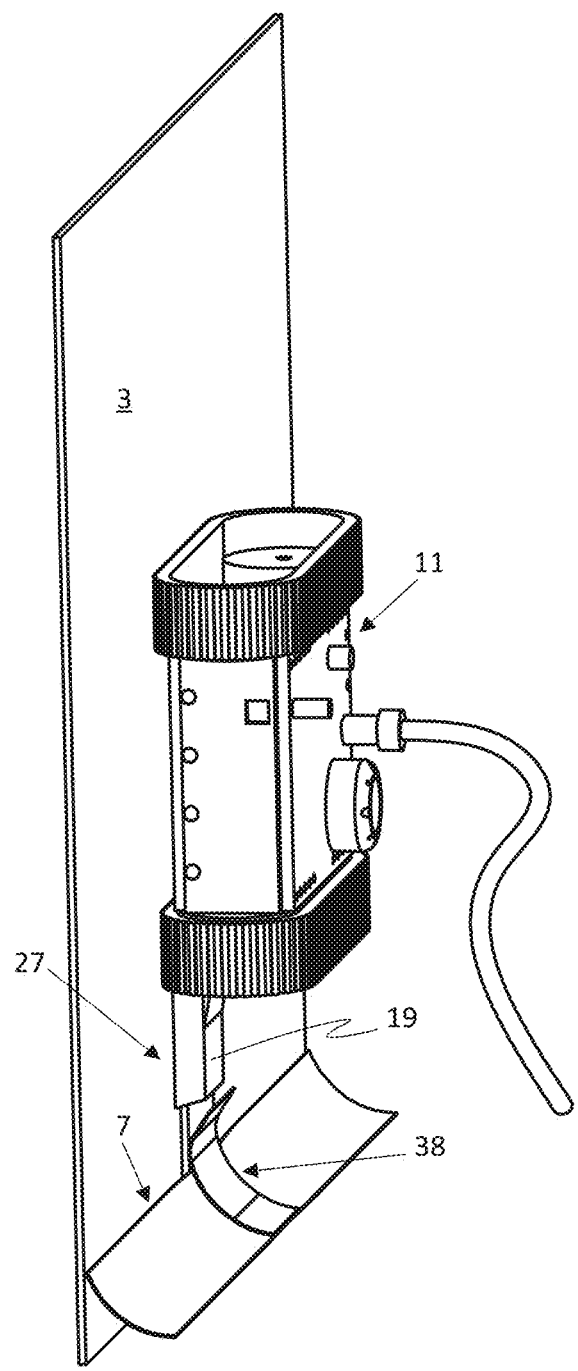
FIG. 27 depicts a tank inspection robot navigating around obstacles present on an interior wall of an FRT in accordance with some embodiments of the present technology.
Figure 31:
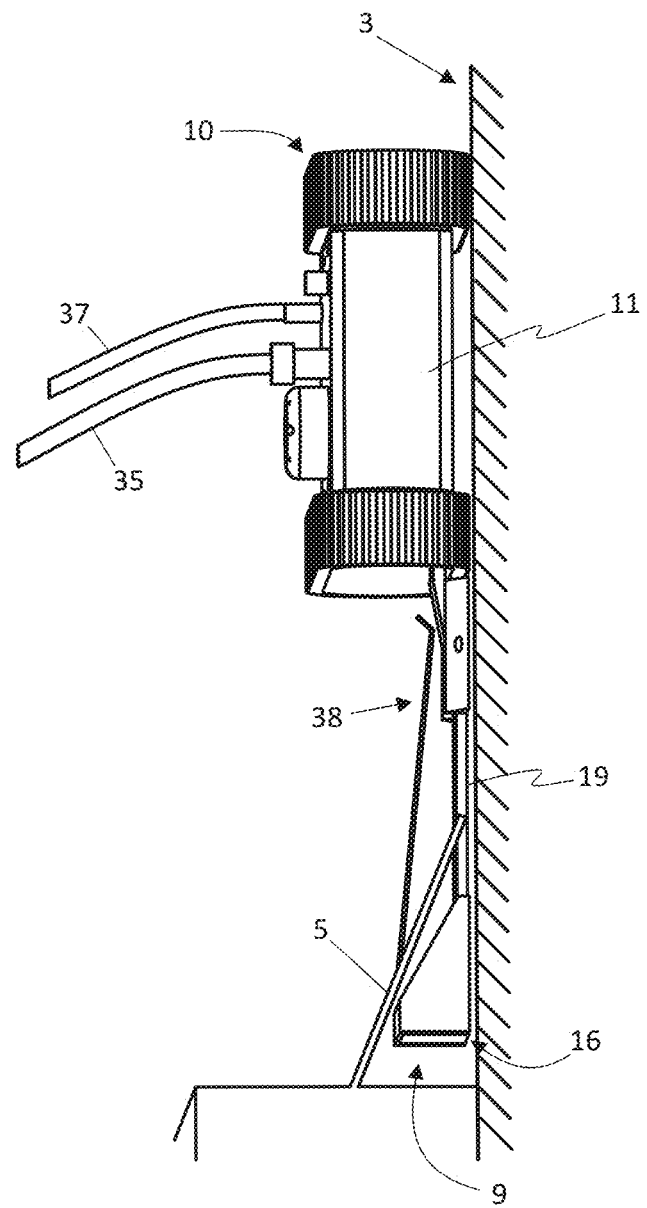
FIG. 31 illustrates a side view of the robotic inspection device with its lower sensor package inserted in a space under an upper vapor seal (UVS) and with its connect bridge in contact with the UVS in accordance with some embodiments of the present technology.

In some embodiments, the inspection robot 10 may include a motor controller 47 operably coupled to the drive assembly for keeping the robot 10 on a straight circumferential line of travel around the tank, compensating for the large frictional or other disturbances whilst the connector bridge 19 is in contact with the UVS 5, as shown in FIGS. 27 and 31. Additionally, raw video feeds from the navigational camera 33 can be used to detect grounding straps 38 or other obstacles in the path of travel. This information can be used to plan a local path plan deviation to avoid such obstacles before resuming on the main global path plan around the wall 3 of the storage tank.

As the robot 10 starts to autonomously travel around the tank, data is collected real-time on the mechanical integrity and health of the seals 5 and/or 7 of the seal assembly 2. The upper portion of the seal gap 8 may be inspected through visual means. All of the collected sensor data (e.g., around the entire circumference of the tank wall 3) may be fused together to generate a seal inspection report real-time (e.g., through the use of the onboard computer 34 as well as the remote station computer). The current identified problem areas or spots may be analyzed against previous inspection results to predict time to seal failure and formulate an actionable repair plan.

After completion of the data collection UDA 11 rotates ninety-degrees to extract the LSP 16. The inspection robot 10 then navigates back up to the top of the tank to be picked up by the operator.

Figure 29:
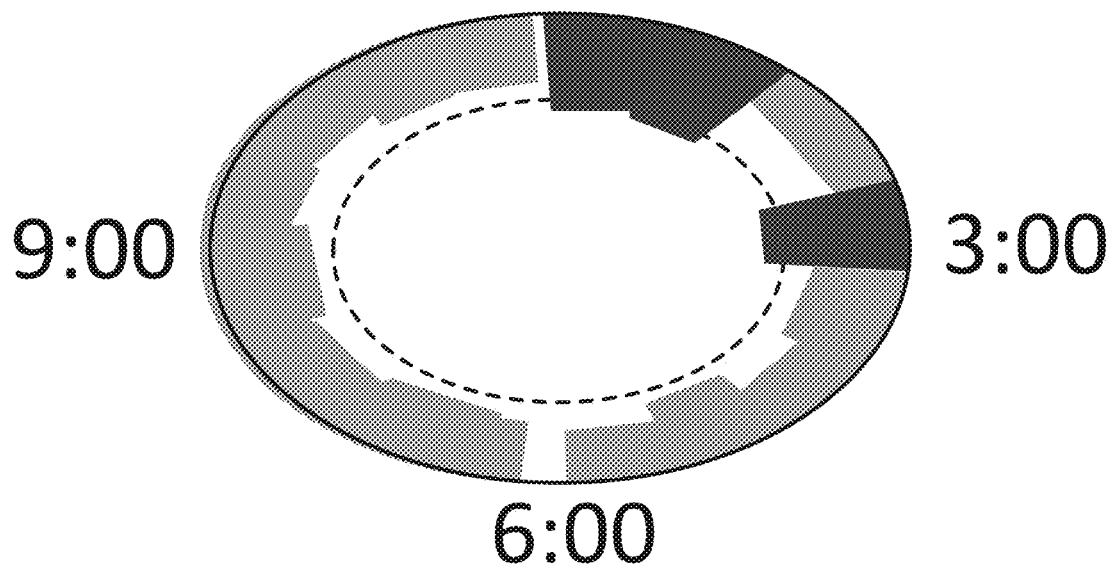
FIG. 29 is a tank inspection report originating with a tank inspection robot in accordance with some embodiments of the present technology.

Through the collection and processing of sensor data, the results of the inspection are packaged into a human readable form (e.g., digital twin CAD model and/or pdf report). The inspection report, an example of which is shown in FIG. 29, allows a facility manager, for instance, to make an informed decision on whether or not a tank needs to be shut down and a repair scheduled.

Software and/or firmware stored as program instructions on non-transitory computer 34 readable storage memory (e.g., memory) onboard the inspection robot 10 and/or in subsystems communicably coupled to robot 10 may implement, mediate or otherwise facilitate performance of one or more of the functions and operations of inspection robot 10 as discussed herein according to the present technology. For example, and without limitation, such program instructions may provide operators of inspection robot 10 access to a number of software and/or firmware packages which accomplish a variety of low-level and high-level tasks, such as handling of navigational control commands, turning power supplies to components off/on, and general sharing of data between the different components of robot 10 to properly manage the functions thereof.

FIG. 30 illustrates a flow chart of a tank inspection method 50 in accordance with some embodiments of the present technology. With reference to FIG. 30, as well as the foregoing figures and accompanying description, method 50 may proceed from a start state 51, which begins with placing the robot at the top of the tank wall. The robot 10 stays on the tank without falling off or sliding through the use of magnetic adhesion by way of magnet(s) 32 affixed to the bottom of the robot 10 chassis. This magnetic adhesion may be accomplished through permanent magnets.

In some embodiments, method 50 may include the step of actuating 52, e.g., by wheels 13 of the UDA 11, to navigate the robot 10 downwards to one or more circumferential seals (e.g., UVS 5) positioned proximal the interior wall 3 of the storage tank. In order to know when to cease downward motion, method 50 may also include the step of collecting 53, via a forward-facing navigational camera 33 (e.g. depth or rgb camera), visual data sufficient to identify an optimal position above the secondary seal (e.g., UVS 5), where the robot 10 could be commanded to stop 55 after a logical branch 54 of method 50 identifies that state of the mission. Such an optimal position may include the robot 10 being positioned a pre-determined distance away from the top of the UVS 5 (also referred to herein as secondary, or weather, seal). Otherwise, method 50 loops through the above described steps 52 53 and 54 until such time that the optimal position is identified in logical branch 54. This identification of a starting position for the rest of the robot 10 inspection mission may be done by recognizing at least one physical characteristic of the seal assembly 2 or floating roof 6.

In some embodiments, the at least one sensor may be positioned on, or in, an offset LSP 16. The LSP 16 may be connected to and offset from one side of the UDA 11. This connection or union is made possible by use of a CB 19 and side plate mount 21 between the two sub-assemblies 11 and 19. In order to put this LSP 16 in an optimal location for data collection, method 50 may include the step of inserting 56 the LSP 16 between the one or more seals 5 and/or 7, and the wall 3 of the storage tank. This insertion may be accomplished via a rotation of the inspection robot 10, as in, for example and without limitation, ninety-degrees clockwise. The inspection robot 10 is now ready to begin 57 its data collection mission.

In some embodiments of method 50, the inspection mission begun at step 57 may include Motion Control 58 and Inspection 63. In some embodiments, Motion Control and Inspection may be concurrently performed processes in method 50, as discussed in greater detail below.

Motion Control 58 of the inspection robot 10 is necessary due to adverse frictional forces imposed on the CB 19 and other obstacles in the path of travel. In some embodiments, Motion Control 58 may be assisted through use of forward-facing navigational depth camera 33, which can recognize 59, locate and determine distance away from obstacles in the path of travel, giving the robot 10 time to plan a local deviation in order to avoid getting stuck or damaging the treads of the drive assembly. In some cases, the CB 19 may be designed long, thin, and smooth enough such that it would not have to navigate around the obstacles, but can instead go under them (e.g., under grounding strap 38, as shown in FIG. 27).

In some embodiments, the IMU(s) 41, affixed to the UDA 11, can be used to detect 60 sliding down or dipping of robot 10 during its mission around the tank. All of these sensors and their data as may be utilized in one or more of method 50 steps 59 and 60 may be fused 61 together and processed by computer 34 and/or computing system(s) remote from robot 10 to determine the error of the robot 10 (and its LSP 16) from their desired, pre-planned paths. Through a motion controller (which, in some embodiments, may include software and/or firmware), this error will be used to apply 62 a control correction to the actuating of the drive motors 45 to compensate for frictional or other disturbances during such times that the LSP 16 is inserted 56 between seals 5 and/or 7, and the wall 3, of the storage tank. In some embodiments, the above described fusing 61 and correcting 62 steps of method 50 may be performed concurrently with the actuating 55 step.

In some embodiments, the inspection method 63 will consist of multiple sub-processes and logical branches. Characterization of the integrity of LLS 7 is accomplished by looking at two things: 1) the upper portion of the seal gap 8; 2) the presence and size of primary seal fabric tears.

Figure 28:
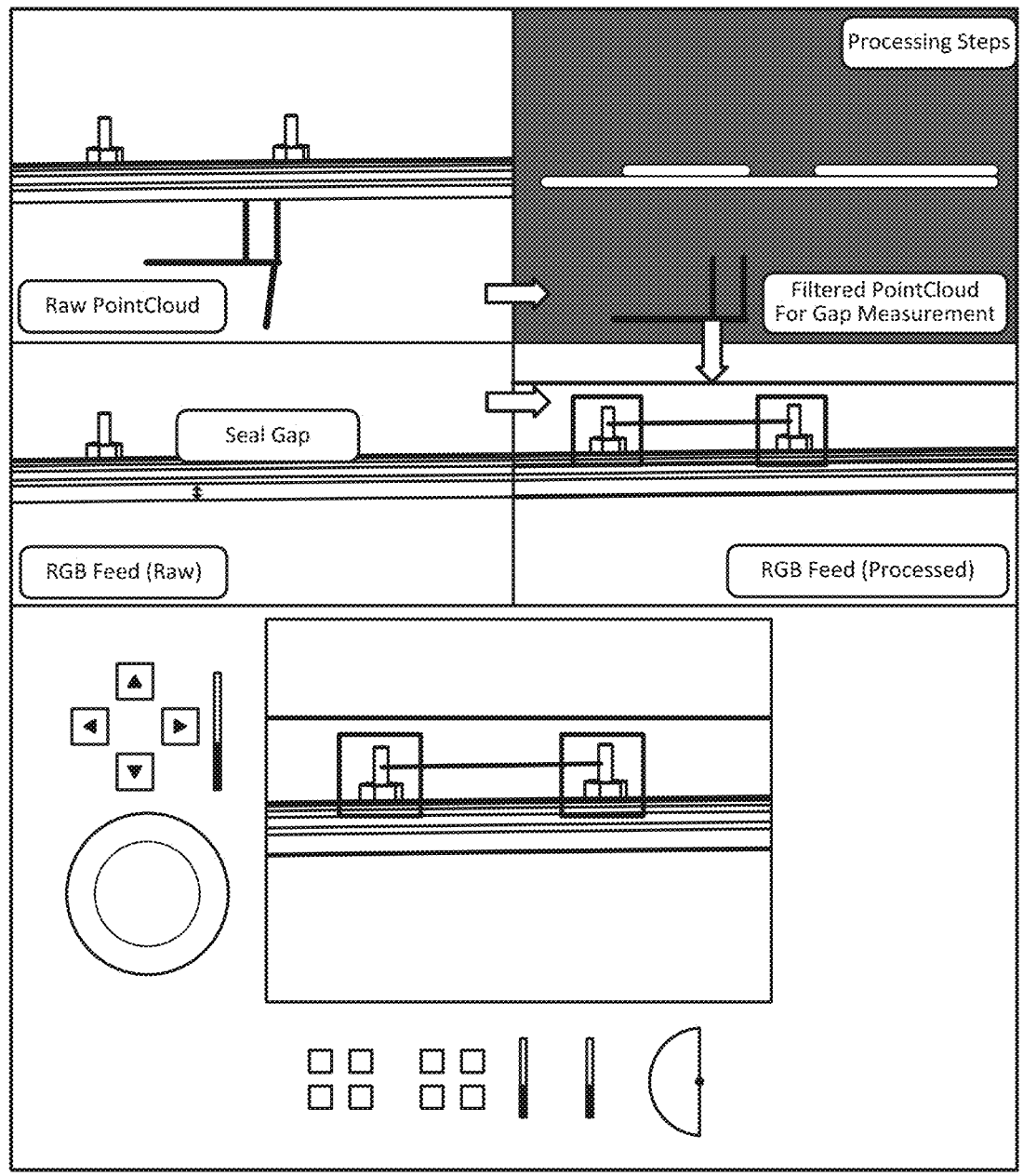
FIG. 28 illustrates aspects of a seal integrity detection process with a computer vision algorithm utilizing data collected by a tank inspection robot in accordance with some embodiments of the present technology.

To address the first of the above-listed sub-processes/capabilities—the upper portion of the seal gap 8—in one example, the depth camera 23 pointed at the LLS 7 collects 64 pointcloud data to facilitate a two or three-dimensional model of the one or more seals 5 and/or 7, and possibly also a portion of the wall 3. The color (RGB) image data collected by the depth camera 64 may be used as a base image upon which to overlay the information gleaned from the processed pointcloud data (e.g., as shown in FIG. 28). Additionally, the RGB data may be also processed in order to help size the upper portion of the seal gap 8. In examples of method 50 that include the aforementioned collecting step 64, the pointcloud and RGB data may then be fused 65 together and processed by computer 34 and/or computing system(s) remote from robot 10 to produce an accurate measurement of the upper portion of the seal gap 8.

To address the third of the above-listed sub-processes/capabilities—location and dimensions of fabric tears—in one example, the collected 64 RGB data may be processed by the computer 34 and/or computing system(s) remote from the robot 10 using image processing, or other, algorithm(s) to recognize various cuts, tears, holes, or other defects located on the LLS 7 material (e.g., fabric).

This information, the upper portion gap 8 sizes and location of fabric tears, will be utilized to generate 66 a real-time inspection report of the seal integrity (e.g., as shown in FIG. 29). If the seal health is in an unsafe or failed condition as determined by the above described inspection method 63 and associated method 50 steps, along with inspection standards approved by Steel Tank Institute and American Petroleum Institute, then corrective maintenance can then be planned.

In some embodiments of method 50, odometry of the UDA 11 drive motor encoders may be monitored 68. Based on the diameter and circumference of the storage tank, if it is determined at logical branch 69 that the robot 10 has navigated around the entire circumference of the inner tank wall 3, then the mission will be complete an extraction procedure will be initiated. If the robot 10 has not yet navigated around the entire circumference of the inner tank shell, then the method 50 including processes controlling the robot 10 will continue looping 67 through the Motion Control 58 and Inspection Method 63 routines.

For the aforementioned extraction procedure, method 50 may include step 70. In some embodiments, this step and the preceding steps or at least resemble, a reversal of the robot 10 insertion-related steps 56 performed earlier in the mission, as described above. Next, the robot 10 will rotate 70 ninety degrees in order to remove the LSP 16 from below the UVS 5. The robot 10 will proceed to navigate 71 up the tank wall 3 to be picked up by the operator and removed from the wall 3. After the conclusion of all these robot 10 extraction-related steps in method 50, an end state 9672 may be reached.

In one embodiment of this example, method 50 may further include the step of transmitting, by the communications interface 40, various signals encoding data representative of the integrity of the seal.

Following completion of some or all of the above described steps, method 50 may proceed to the end state 72. In some embodiments, the end state 72 may represent operations to be completed by inspection robot 10, or the operator and/or subsystem thereof, after performance of an inspection routine for the seal(s) 5 and/or 7 of the storage tank. For example, and without limitation, such operations may include transmission and/or download of results stored in a memory storage device 34 of robot 10, robot 10 using its navigation camera 33 to return to the top of tank wall 3 to facilitate retrieval by the operator, deployment of sensor(s) contained in the LSP 16, and/or powering down of robot 10, among other things.

The present technology related to inspection robot 10 and supporting equipment/tools is believed to be the first and only robotic system and method intended for this particular floating roof seal inspection task and the only one that can actually perform it successfully. The manner in which the present technology including robot 10 and method 50 collects data about the condition of the roof seal(s) and how it communicates those findings to the facility manager provides uniquely suited techniques to operators in the field.

Tank seal inspection using inspection robot 10 according to the present technology requires (on the most basic level) two capabilities. Placing of the above described LSP 16 into the space 9 between the UVS 5 and the LLS 7, and circumferential navigation around the perimeter of the interior of tank wall 3. the bifurcated design of the robot 10 (and its offset sensor package LSP 16) enables successful accomplishment of this objective. Navigation around the tank wall 3 may be difficult due to the constant friction between the CB 19 of robot 10, UVS 5, and tank wall 3. The above described motion controller 47 may compensate for this using inputs from the pointcloud depth camera(s) 23 and/or 33, and the IMU(s) 41 contained in the LSP 16. A design feature on the CB 19, which may make the 2-dimensional control problem 1-dimensional, is another part of this control scheme. Specifically, the above described roller element(s) 27 (as shown in FIG. 22) also keeps the LSP 16 of inspection robot 10 at a specified distance away from the top of the LLS 7, which simplifies the gap 8 evaluation task. The inspection robot 10 having the ability to effectively move past the grounding straps 38 (placed at regular intervals around the tank) is also necessary for ensuring complete, circumferential navigation by inspection robot 10.

The main piece of data that is required for the inspection is information about the size and shape of the gap 8 between the LLS 9 and the tank wall 3 (or if one even exists). The detection methodology disclosed herein employs a visual sensor (e.g., depth camera 23) to evaluate the top portion of the gap 8. It is believed that there does not currently exist any inspection approach that can do those things. The location of a specific gap 8 within the tank may be identified using a localization algorithm that receives data from the drive wheel 13 encoders, a visual odometry fastener classifier, and the IMU(s) 41. The findings about the dimensions of the LLS 7 gap 8 may be postprocessed and inserted into a 3D CAD model of the tank. This capability can allow the inspection results to integrate seamlessly with software packages (e.g., Digital Twin®, Inspection Data Management Systems, or Enterprise Asset Management Systems) that facility managers are readily embracing these days.

Owners of floating roof storage tanks will benefit from the present technology over their current methodology because it is a solution that eliminates confined space entries by people, helps prevent excess product emissions, drastically reduces costs associated with tank down-time, and delivers on-time, accurate inspection results. Now, more than ever companies are concerned with the well-being of their employees and contractors. Maintaining a healthy and happy relationship between company and employee is critical for the success of the business. One way in which companies can do this is by making their operations safer for their employees. With the present technology, employees will no longer have to crawl down onto the tank roofs for these seal inspections, a task which they have never particularly relished due to its safety issues.

Additionally, storage tank operators are under more and more scrutiny by state and/or federal regulators when it comes to reducing their contribution to greenhouse gases. Real-time knowledge about the state of the roof 6 seals 5 and 7 minimizes the possibility of a serious failure that could pollute the surrounding area and result in a large fine. This leads to a higher environmental, social, and governance score, which makes the company look more attractive to investors. During times when margins are under pressure, energy companies look for ways to reduce costs. A robot that could be deployed at their convenience without having to shut down the tank for inspection would be a useful tool for facility managers. It gives them a clear, real-time understanding about the state of one of their asset types.

The inspection robot 10 and associated method 50 may also enable businesses to better plan tank seal repairs, which can be very costly if put off and potentially impossible depending on the financial state of the business. With the present technology, confined-space permits may not be needed and inspection results are more immediate. This allows for the efficient planning of repairs and makes the job of facility managers that much easier. The evaluation and/or measurement accuracy of the seal gap 8 improves with the solution provided by the provided technology as a computer image processing algorithm may be utilized that sizes the gap 8 based on inputs from the depth camera 23, no longer relying on the ability of a human eye to estimate the size of the gap 8. The speed of the tank seal inspection routine may also improve by a factor of 8× with the inspection robot 10 and associated method 50, allowing inspectors to move on more quickly to other tasks around the facility.

Tank seal designs vary and there is no guarantee that one robot design will work for all tank types. This limitation can be overcome by using different offsets for the necessary sensor packages according to the present technology. Some tanks have irregular structural additions on the UVS 5 such as ground straps 38, which may require more complicated offset mounts or navigation strategies, both of which can be planned given visual or CAD data on the tanks and seals to be inspected. The maneuverability of the disclosed inspection robot 10 may also not be the same for every tank due to varying amounts of sludge that can build up on the inner wall 3 of the tank. This can be accounted for by using more aggressive tracks 17 that dig into the sludge, which, along with magnets 32, can help to achieve the required frictional force between the tracks 17 and wall 3. Depending on the level of sludge and thickness of the tank wall 3, the size and/or strength of the magnets 32 (providing adhesion) and their offset from the wall 3 may also need to be adjusted for a particular application. Means for operators to conveniently make such adjustments on the fly may be included on or within housing 15, or elsewhere, on robot 10.

Example 2

In some embodiments, a tank inspection method (e.g., method 50) including the step of actuating, by a drive assembly (e.g., UDA 11) of a robot (e.g., tank inspection robot 10), wheels of the robot to navigate the robot to one or more circumferential seals positioned proximate to an interior wall of a storage tank. The tank inspection method may also include the step of collecting, by at least one sensor of the robot, data sufficient to evaluate a health, integrity, or effectiveness of the one or more circumferential seals between a floating roof, and the interior wall of the storage tank. In an example, the tank inspection method may also include the step of magnetically coupling the robot to the interior wall of the storage tank before, or concurrent with, the performance of the actuating step.

Figure 33:
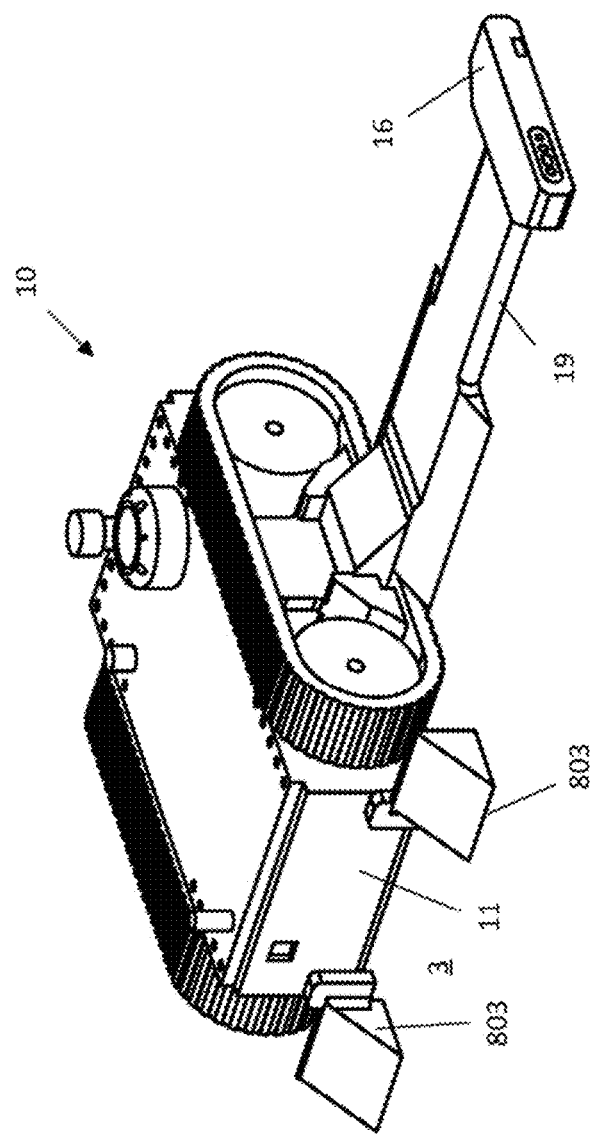
FIG. 33 illustrates a tank inspection robot having a plow mechanism according to some embodiments of the present technology.

In some embodiments, the tank inspection method may further include the step(s) of removing and/or displacing, using a plow mechanism 803 (e.g., as shown in FIG. 33), and/or wiper mechanism, of the robot, sludge or other contaminant(s) from the interior wall of the storage tank. In an example, the sludge or other contaminant(s) may tend to decrease friction and/or decrease magnetic adhesion between the tracks or other portions of the robot (e.g., having magnets 32) and the interior wall of the storage tank during performance of portions of the tank inspection method according to the present technology. As such, performance of the removing and/or displacement step(s) in the method may increase friction and/or magnetic adhesion between the tracks or other portions of the robot and the interior wall of the storage tank during performance of at least the actuating step. In another example, removing and/or displacing the sludge or other contaminant(s) from the interior wall may advantageously prevent, or at least mitigate, slippage of the robot during performance of at least the actuating step in the tank inspection method.

Referring to FIG. 33, the plow mechanism 803 may be wedge-shaped, or triangular shaped pair of pieces positioned on opposing sides of the robot 10 as forward facing means for scraping or plowing undesirable material from the wall during the actuating, or other steps, of the method 50. Such undesirable material may include sludge or other contaminants that could inhibit adhesion and maneuverability of the robot 10 during the inspection mission according to the present technology.

In one embodiment, the step of collecting in the tank inspection method may include collecting, using a forward-facing depth camera of the robot, at least one of: visual, and pointcloud, data sufficient to plan a path or trajectory for performance of the actuating step. In one example, the aforementioned data sufficient to plan the path or trajectory may include data representative of one or more physical characteristics of the one or more circumferential seals, the actuating step may include causing the robot to navigate along the path or trajectory to a starting position for a tank inspection routine based on the data representative of one or more physical characteristics. In another example, the aforementioned data sufficient to plan the path or trajectory may include data representative of at least one obstacle present between the robot and the one or more circumferential seals, and the actuating step may include causing the robot to navigate along a trajectory in such a manner so as to avoid interference with the at least one obstacle.

In some embodiments, the step of collecting in the tank inspection method may include collecting, using at least one depth camera of the robot, pointcloud data. In an example, the tank inspection method may also include the step of generating, based at least in part on the pointcloud data, a two- or three-dimensional model of at least one of: the one or more circumferential seals, and a portion of the interior wall, to facilitate evaluation of the health, integrity or effectiveness of the one or more circumferential seals.

In one embodiment, the at least one sensor may be positioned on, or in, a sensor package (e.g., LSP 16) of the robot. In an example, the tank inspection method may also include the step of inserting at least a portion of the sensor package between the one or more circumferential seals and the interior wall of the storage tank. The inserting step of the method may be performed before, or concurrent with, the collecting step.

Regarding the inserting step of the tank inspection method according to this Example 2, the robot may include a connector bridge (e.g., CB 19) coupled to and between the drive assembly and the sensor package to thereby position the sensor package including the at least one sensor apart and spaced from a portion of the robot having the drive assembly. In some embodiments, the connector bridge may include active or passive roller elements. In one example, the tank inspection method may further include—after, or concurrent with, the inserting, and while the connector bridge is positioned between the one or more circumferential seals and the interior wall—the step of moving the sensor package with the active or passive roller elements in contact with the interior wall to thereby reduce friction during the moving as compared to the moving in the absence of the active or passive roller elements. In another example, the tank inspection method may further include—after, or concurrent with, the inserting, the step of moving the sensor package around the tank while the connector bridge is positioned between the one or more circumferential seals and the interior wall with the active or passive roller elements in contact with the interior wall to thereby reduce friction during the moving as compared to the moving in the absence of the active or passive roller elements.

Further in regard to the inserting step of the tank inspection method according to this Example 2, in one embodiment, the tank inspection method according to the present technology may also include the steps of: (a) determining, by a motion controller (e.g., motion controller 47) of the robot before or concurrent with at least one of: the actuating step, the inserting step, and the moving step, at least one factor for compensating for frictional or other disturbances whilst the at least a portion of the sensor package is inserted between the one or more circumferential seals and the interior wall of the storage tank; and (b) applying the at least one factor for use by the drive assembly for the at least one of: the actuating step, the inserting step, and the moving step, to compensate for the frictional or other disturbances.

In some embodiments, the tank inspection method according to the present technology may include the step of evaluating a physical condition of the one or more circumferential seals based at least in part on the data sufficient to evaluate the health, integrity, or effectiveness of the one or more circumferential seals. In one embodiment, the at least one sensor may include at least one depth camera. In one example, the collecting step of the tank inspection method may include collecting, using the at least one depth camera, pointcloud data to facilitate evaluation of the health, integrity or effectiveness of the one or more circumferential seals. In some embodiments, the collecting step of the tank inspection method may include collecting color data of at least one of: the interior wall, and the one or more circumferential seals, to facilitate characterizing and/or evaluating the health, integrity, or effectiveness of the one or more circumferential seals or a seal assembly including the one or more circumferential seals.

In one embodiment, the tank inspection method may also include the step of transmitting, by a communications interface of the robot, at least one of the aforementioned types of data: (i) the data sufficient to evaluate the health, integrity, or effectiveness of the one or more circumferential seals; (ii) the data representative of a physical condition, or a mechanical integrity of the one or more circumferential seals; (iii) data representative of the determined indication resulting from a deterioration of: the physical condition, or the mechanical integrity; (iv) the at least one of: visual, and pointcloud, data sufficient to plan a path or trajectory for the actuating; (v) the data representative of one or more physical characteristics of the one or more circumferential seals; (vi) the pointcloud data; (vii) the data representative of the direct measurement of the gap; (viii) data representative of the one or more dimensions of the one or more circumferential seals; (ix) the one or more dimensions of a gap; (x) data representative of the one or more dimensions of the one or more circumferential seals or a seal assembly including the one or more circumferential seals; (xi) the at least one of: color, and pointcloud, data; (xii) the color data; (xiii) the data representative of the two- or three-dimensional model to least one of: an operator, a computer, and a subsystem, of, or communicably coupled to, the robot to facilitate evaluation of the health, integrity, or effectiveness of the one or more circumferential seals or the seal assembly. In an example, the tank inspection method also includes the step of evaluating the health, integrity, or effectiveness of the one or more circumferential seals based at least in part on one or more of the above listed data types (i)-(xiii).

Example 3

In some embodiments, a tank inspection robot may include at least one housing, and a drive assembly contained within the housing. In an example, the drive assembly may include, for example and without limitation, an electric motor-based drive train. The tank inspection robot may also include wheels disposed outside of the housing and operably coupled to the drive assembly to actuate the wheels to navigate the robot to one or more circumferential seals positioned proximate to an interior wall of a storage tank. The robot may further include at least one sensor disposed in or on a portion of the robot. The at least one sensor may be configured to collect data sufficient to evaluate a health, integrity, or effectiveness of the one or more circumferential seals between a floating roof, and an interior wall, of the storage tank. The robot may also include a connector bridge coupled to and between the drive assembly and the sensor package of the robot to thereby position the at least one sensor apart and spaced from the drive assembly.

In one embodiment, the robot may include two wheels, and the robot may also include a track operable coupled to the two wheels. In another embodiment, the robot may include four wheels, and the robot may also include two tracks including: a first track operable coupled to a first pair of wheels of the four wheels, and a second track operably coupled to a second pair of wheels of the four wheels. In an example, the robot may further include a plurality of magnets operably coupled to: the track, or the first and second tracks.

In some embodiments, the tank inspection robot may include one or more magnets for magnetically coupling the robot to the interior wall of the storage tank. In an example, the robot may also include a plow mechanism (e.g., as shown in FIG. 33) and/or a wiper mechanism to remove or displace sludge or other contaminant(s) from the interior wall, where the sludge or other contaminant(s) may tend to decrease friction or magnetic adhesion with the interior wall of the storage tank during operation of the robot.

In one embodiment, the tank inspection robot may include at least one light disposed on or in a portion of the robot, and configured to illuminate an area of interest outside of the housing to facilitate one or more operations of the robot including at least one of: (a) collection, by the at least one sensor, of the data sufficient to evaluate the health, integrity, or effectiveness of one or more circumferential seals; and (b) navigation of the robot along the interior wall when light is scarce inside the storage tank.

In some embodiments, the at least one sensor may include a forward-facing depth camera configured to collect at least one of: visual, and pointcloud, data sufficient for use by an operator, or a computer, of or associated with the robot to plan a path or trajectory for actuation of the wheels during operation of the robot in a tank inspection routine. In one example, the data sufficient to plan the path or trajectory may include data representative of one or more physical characteristics of the one or more circumferential seals, and the drive assembly may be configured to cause the robot to navigate along the path or trajectory to a starting position for a tank inspection routine based at least in part on the data representative of one or more physical characteristics. In another example, the data sufficient to plan the path or trajectory may include data representative of at least one obstacle present between the robot and the one or more circumferential seals, and the drive assembly may be configured to navigate the robot along the path or trajectory in such a manner so as to avoid interference with the at least one obstacle.

In one embodiment, the at least one sensor may include a depth camera configured to collect pointcloud data sufficient for use by an operator, or a computer, of or associated with the robot to generate, based at least in part on the pointcloud data, a two- or three-dimensional model of at least one of: the one or more circumferential seals, and a portion of the interior wall, to facilitate evaluation of the health, integrity or effectiveness of the one or more circumferential seals. In some embodiments, the tank inspection may also include a sensor package including the at least one sensor, and the drive assembly may be configured to further actuate the wheels of the robot to insert at least a portion of the sensor package between the one or more circumferential seals and the interior wall of the storage tank to facilitate collection of data by the at least one sensor during operation of the robot in a tank inspection routine. In an example, the connector bridge may include active or passive roller elements, and after, or concurrent with, the at least a portion of the sensor package being so inserted, and while the connector bridge is positioned between the one or more circumferential seals and the interior wall, the drive assembly may be further configured to move the sensor package with the active or passive roller elements in contact with the interior wall to thereby reduce friction during the moving as compared to such movement in the absence of the active or passive roller elements. In another example, the connector bridge includes the one or more active or passive roller wheels, and with the at least a portion of the sensor package inserted between the one or more circumferential seals and the interior wall, the drive assembly may be further configured to actuate the wheels of the robot to move the sensor package around the tank while the connector bridge is positioned between the one or more circumferential seals and the interior wall with the active or passive roller elements in contact with the interior wall to thereby reduce friction during the movement as compared to such movement performed in the absence of the active or passive roller elements.

Regarding the above described insertion of the at least a portion of the sensor package between the one or more circumferential seals and the interior wall according to this Example 3, the tank inspection robot may include a motion controller disposed in or on the housing(s). In some embodiments, the motion controller may be configured to: (a) determine, before or concurrent with said movement, at least one factor for compensating for frictional or other disturbances whilst the at least a portion of the sensor package is inserted between the one or more circumferential seals and the interior wall of the storage tank; and (b) apply the at least one factor for use by the drive assembly for actuation of the wheels during said movement to compensate for the frictional or other disturbances.

In one embodiment, the at least one sensor may include a depth camera configured to collect pointcloud data to facilitate evaluation of the health, integrity or effectiveness of the one or more circumferential seals. In some embodiments, the at least one sensor may be configured to collect color data of at least one of: the interior wall, and the one or more circumferential seals, to facilitate characterization of the health, integrity, or effectiveness of the one or more circumferential seals or a seal assembly including the one or more circumferential seals. In one embodiment, the tank inspection robot may include means for evaluating a physical condition of the one or more circumferential seals based at least in part on the data sufficient to evaluate the health, integrity, or effectiveness of the one or more circumferential seals.

In one embodiment, the tank inspection robot may include a communications interface. In an example, the communications interface may be configured to transmit at least one of: (i) the data sufficient to evaluate the health, integrity, or effectiveness of the one or more circumferential seals; (ii) the data representative of a physical condition, or a mechanical integrity of the one or more circumferential seals; (iii) data representative of the determined indication resulting from a deterioration of: the physical condition, or the mechanical integrity; (iv) the at least one of: visual, and pointcloud, data sufficient to plan a path or trajectory for the actuating; (v) the data representative of one or more physical characteristics of the one or more circumferential seals; (vi) the pointcloud data; (vii) the data representative of the direct measurement of the gap; (viii) data representative of the one or more dimensions of the one or more circumferential seals; (ix) the one or more dimensions of a gap; (x) data representative of the one or more dimensions of the one or more circumferential seals or a seal assembly including the one or more circumferential seals; (xi) the at least one of: color, and pointcloud, data; (xii) the color data; (xiii) the data representative of the two- or three-dimensional model, to at least one of: an operator, a computer, and a subsystem, of, or communicably coupled to, the communications interface to facilitate evaluation of the health, integrity, or effectiveness of the one or more circumferential seals or the seal assembly. In an example, the tank inspection robot method also includes means for evaluating the health, integrity, or effectiveness of the one or more circumferential seals based at least in part on one or more of the data (i)-(xiii).

In some embodiments, the tank inspection robot may also include the aforementioned computer disposed in or on the housing, and operably coupled to the at least one sensor. In an example, the computer is further operably coupled to the communications interface. In some embodiments, the robot may further include at least one memory storage device operably coupled to the computer. In an example, the memory storage device(s) may be configured to receive and store data at least one of: collected by the at least one sensor, and processed by the computer, during operation of the robot in a tank inspection routine.

Example 4

In some embodiment, the robotic tank inspection system may include at least one computing system communicably coupled to the robot and positioned remotely therefrom outside of an interior space of the storage tank. In an example, the at least one computing system may be configured to receive, and process, at least the data sufficient to evaluate a health, integrity, or effectiveness of the one or more circumferential seals to facilitate evaluation of the health, integrity or effectiveness of the one or more circumferential seals.

Example 7

In some embodiments, the present technology provides one or more non-transitory computer readable media. The one or more non-transitory media may have program instructions stored thereon (e.g., as processor-executable software and/or firmware code). When executed by at least one processor of or associated with the machine, the program instructions may cause the machine to: (a) direct a drive assembly of a tank inspection robot (e.g., robot 10) to actuate wheels of the robot to navigate the robot to one or more circumferential seals positioned proximate to an interior wall of a storage tank; and direct at least one sensor (e.g., any one or more of the sensors disclosed herein) of the robot to collect data sufficient to evaluate a health, integrity or effectiveness of the one or more circumferential seals between a floating roof, and the interior wall of the storage tank.

In one embodiment, when executed by the at least one processor, the program instructions further cause the machine to direct to robot and/or one or more of its component parts (e.g., any of the various mechanical, electrical and/or functional features of the robot as disclosed herein, including at least the drive assembly and the at least one sensor) to perform at least one of the steps of the tank inspection method (e.g., method 50) of any applicable embodiment disclosed herein according to the present technology.

Exemplary Computer System Overview

Aspects and implementations of the inspection system of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 32:
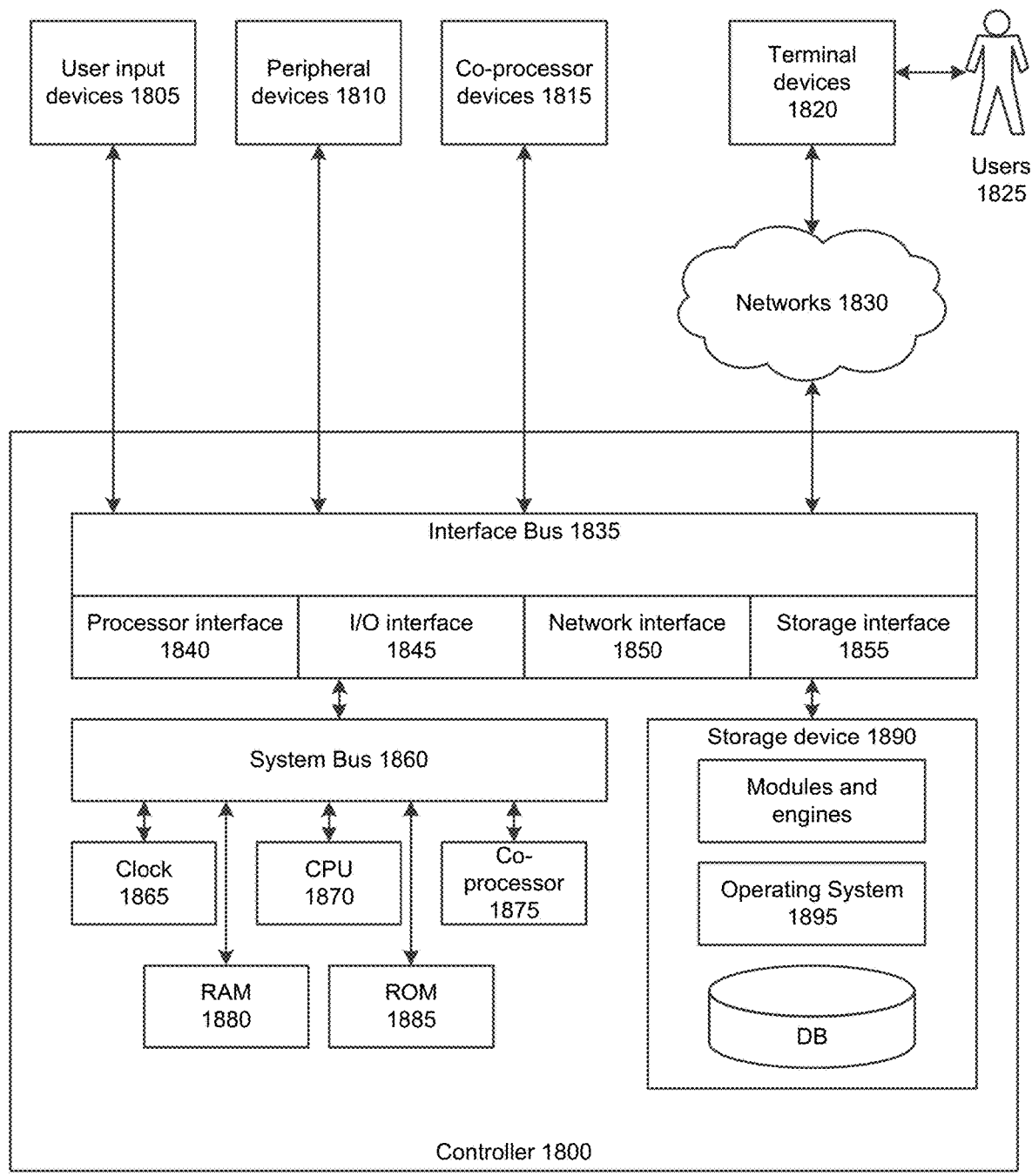
FIG. 32 illustrates an example of a computer architecture that may be used in some embodiments of the present technology.

FIG. 32 is a block diagram illustrating an example machine representing the computer systemization of the inspection platform. The controller 1800 may be in communication with entities including one or more users 1825 client/terminal devices 1820, user input devices 1805, peripheral devices 1810, an optional co-processor device(s) (e.g., cryptographic processor devices) 1815, and networks 1830. Users may engage with the controller 1800 via terminal devices 1820 over networks 1830.

Computers may employ central processing unit (CPU) or processor to process information. Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The controller 1800 may include clock 1865, CPU 1870, memory such as read only memory (ROM) 1885 and random access memory (RAM) 1880 and co-processor 1875 among others. These controller components may be connected to a system bus 1860, and through the system bus 1860 to an interface bus 1835. Further, user input devices 1805, peripheral devices 1810, co-processor devices 1815, and the like, may be connected through the interface bus 1835 to the system bus 1860. The interface bus 1835 may be connected to a number of interface adapters such as processor interface 1840, input output interfaces (I/O) 1845, network interfaces 1850, storage interfaces 1855, and the like.

Processor interface 1840 may facilitate communication between co-processor devices 1815 and co-processor 1875. In one implementation, processor interface 1840 may expedite encryption and decryption of requests or data. Input output interfaces (I/O) 1845 facilitate communication between user input devices 1805, peripheral devices 1810, co-processor devices 1815, and/or the like and components of the controller 1800 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 1850 may be in communication with the network 1830. Through the network 1830, the controller 1800 may be accessible to remote terminal devices 1820. Network interfaces 1850 may use various wired and wireless connection protocols such as, direct connect, Ethernet, wireless connection such as IEEE 802.11a-x, and the like.

Examples of network 1830 include the Internet, Local Area Network (LAN), Metropolitan Area Network (MAN), a Wide Area Network (WAN), wireless network (e.g., using Wireless Application Protocol WAP), a secured custom connection, and the like. The network interfaces 1850 can include a firewall which can, in some aspects, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 1855 may be in communication with a number of storage devices such as, storage devices 1890, removable disc devices, and the like. The storage interfaces 1855 may use various connection protocols such as Serial Advanced Technology Attachment (SATA), IEEE 1394, Ethernet, Universal Serial Bus (USB), and the like.

User input devices 1805 and peripheral devices 1810 may be connected to I/O interface 1845 and potentially other interfaces, buses and/or components. User input devices

1805 may include card readers, fingerprint readers, joysticks, keyboards, microphones, mouse, remote controls, retina readers, touch screens, sensors, and/or the like. Peripheral devices 1810 may include antenna, audio devices (e.g., microphone, speakers, etc.), cameras, external processors, communication devices, radio frequency identifiers (RFIDs), scanners, printers, storage devices, transceivers, and/or the like. Co-processor devices 1815 may be connected to the controller 1800 through interface bus 1835, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 1800 may employ various forms of memory including on-chip CPU memory (e.g., registers), RAM 1880, ROM 1885, and storage devices 1890. Storage devices 1890 may employ any number of tangible, non-transitory storage devices or systems such as fixed or removable magnetic disk drive, an optical drive, solid state memory devices and other processor-readable storage media. Computer-executable instructions stored in the memory may include one or more program modules such as routines, programs, objects, components, data structures, and so on that perform particular tasks or implement particular abstract data types. For example, the memory may contain operating system (OS) component 1895, modules and other components, database tables, and the like. These modules/components may be stored and accessed from the storage devices, including from external storage devices accessible through an interface bus.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

The controller 1800 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the controller 1800 may be distributed electronically over the Internet or over other networks (including wireless networks). Those skilled in the relevant art(s) will recognize that portions of the system may reside on a server computer, while corresponding portions reside on a client computer. Data structures and transmission of data particular to aspects of the controller 1800 are also encompassed within the scope of the disclosure.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A tank inspection method comprising:
   actuating, by a drive assembly of a robot, wheels of the robot to navigate the robot along an interior wall of a storage tank to one or more circumferential seals positioned proximate to the interior wall of the storage tank; and
   collecting, by at least one sensor of the robot, data sufficient to evaluate a health, integrity, or effectiveness of the one or more circumferential seals between a floating roof, and the interior wall of the storage tank;
   wherein the one or more circumferential seals is configured to maintain sliding contact with the interior wall; and
   wherein collecting the data comprises physically manipulating the one or more circumferential seals to create a gap between the one or more circumferential seals and the floating roof and inserting the at least one sensor of the robot in the gap.

2. The tank inspection method of claim 1, wherein the collecting comprises:
   collecting, using the at least one sensor, data representative of a physical condition, or a mechanical integrity, of the one or more circumferential seals; and
   determining, based at least in part on the data representative of a physical condition or mechanical integrity of the one or more circumferential seals, an indication resulting from a deterioration of: the physical condition, or the mechanical integrity.

3. The tank inspection method of claim 1, further comprising magnetically coupling the robot to the interior wall of the storage tank before, or concurrent with, the actuating.

4. The tank inspection method of claim 1, wherein the collecting comprises collecting, using at least one camera of the robot, at least one of: visual, and pointcloud, data sufficient to plan a path or trajectory for the actuating.

5. The tank inspection method of claim 4, wherein:
   the data sufficient to plan the path or trajectory includes data representative of one or more physical characteristics of the one or more circumferential seals; and
   the actuating comprises causing the robot to navigate along the path or trajectory to a starting position for a tank inspection routine based on the data representative of one or more physical characteristics.

6. The tank inspection method of claim 4, wherein:
   the data sufficient to plan the path or trajectory includes data representative of at least one obstacle present between the robot and the one or more circumferential seals; and
   the actuating comprises causing the robot to navigate along the interior wall with a trajectory in such a manner so as to avoid interference with the at least one obstacle.

7. The tank inspection method of claim 1, wherein the at least one sensor includes at least one depth camera, and wherein the collecting comprises:
   collecting, using the at least one depth camera of the robot, pointcloud data; and
   generating, based on the pointcloud data, a two-or three-dimensional model of at least one of: the one or more circumferential seals, and a portion of the interior wall, to facilitate evaluation of the health, integrity or effectiveness of the one or more circumferential seals.

8. The tank inspection method of claim 1, wherein:
   the at least one sensor is positioned on, or in, a sensor package of the robot.

9. The tank inspection method of claim 8, wherein the robot includes a connector bridge coupled to and between the drive assembly and the sensor package to thereby position the sensor package including the at least one sensor apart and spaced from the drive assembly, and wherein the method further comprises:
   after, or concurrent with, the inserting, moving the sensor package around the tank while the connector bridge is positioned between the one or more circumferential seals and the interior wall with the active or passive roller elements in contact with the interior wall to thereby reduce friction during the moving as compared to the moving in the absence of the active or passive roller elements.

10. The tank inspection method of claim 9, further comprising:
    determining, by a motion controller of the robot before or concurrent with at least one of:
    the actuating, the inserting, and the moving, at least one factor for compensating for frictional or other disturbances whilst the at least a portion of the sensor package is inserted between the one or more circumferential seals and the interior wall of the storage tank; and
    applying the at least one factor for use by the drive assembly for the at least one of: the actuating, the inserting, and the moving, to compensate for the frictional or other disturbances.

11. The tank inspection method of claim 1, wherein the collecting comprises:
    measuring one or more dimensions of the gap using the at least one sensor.

12. The tank inspection method of claim 1, further comprising transmitting, using a communications interface of the robot, the data sufficient to evaluate the health, integrity, or effectiveness of the one or more circumferential seals to at least one of: an operator, a computer, and a subsystem, of, or communicably coupled to, the communications interface to facilitate evaluating the health, integrity, or effectiveness of the one or more circumferential seals or the seal assembly including the one or more circumferential seals.

13. A tank inspection robot comprising:
    a drive assembly;
    wheels disposed outside of, and operably coupled to, the drive assembly, the wheels configured to be actuated by the drive assembly to navigate the robot along an interior wall of a storage tank to one or more circumferential seals positioned proximate to the interior wall of the storage tank;
    at least one sensor disposed in or on a portion of the robot, and configured to collect data sufficient to evaluate a health, integrity, or effectiveness of the one or more circumferential seals between a floating roof, and the interior wall, of the storage tank; and
    a connector bridge coupled to and between the drive assembly and the at least one sensor to thereby position the at least one sensor apart and spaced from the drive assembly;
    wherein the one or more circumferential seals is configured to maintain sliding contact with the interior wall; and
    wherein the at least one sensor is configured to collect the data based on physically manipulating the one or more circumferential seals to create a gap between the one or more circumferential seals and the floating roof and inserting the at least one sensor in the gap.

14. The tank inspection robot of claim 13, further comprising one or more magnets for magnetically coupling the robot to the interior wall of the storage tank.

15. The tank inspection robot of claim 13, wherein the wheels include four wheels disposed outside opposing sides of the drive assembly, the robot further comprising two tracks including: a first track operable coupled to a first pair of wheels of the four wheels, and a second track operably coupled to a second pair of wheels of the four wheels.

16. The tank inspection robot of claim 15, further comprising a plurality of magnets operably coupled to each of the first and second tracks.

17. The tank inspection robot of claim 13, further comprising at least one light disposed on or in a portion of the robot, and configured to illuminate an area of interest outside of the robot.

18. The tank inspection robot of claim 13, further comprising a communications interface configured to transmit the data sufficient to evaluate the health, integrity, or effectiveness of the one or more circumferential seals to at least one of: an operator, a computer, and a subsystem, of, or communicably coupled to, the communications interface to facilitate an evaluation of the health, integrity, or effectiveness of the one or more circumferential seals or the seal assembly including the one or more circumferential seals.

19. One or more non-transitory computer readable media having program instructions stored thereon which, when executed by at least one processor, cause a machine to:
   direct a drive assembly of a tank inspection robot to actuate wheels of the robot to navigate the robot along an interior wall of a storage tank to one or more circumferential seals positioned proximate to the interior wall of the storage tank; and
   direct at least one sensor of the tank inspection robot to collect data sufficient to evaluate a health, integrity or effectiveness of the one or more circumferential seals between a floating roof, and the interior wall of the storage tank;
   wherein the one or more circumferential seals is configured to maintain sliding contact with the interior wall; and
   wherein to collect the data, the program instructions cause the machine to direct the tank inspection robot to physically manipulate the one or more circumferential seals to create a gap between the one or more circumferential seals and the floating roof and direct the tank inspection robot to insert the at least one sensor of the tank inspection robot in the gap.

20. The one or more non-transitory computer readable media of claim 19, wherein the program instructions further cause the machine to:
   collect, using the at least one sensor, data representative of a physical condition, or a mechanical integrity, of the one or more circumferential seals; and
   determine, based at least in part on the data representative of a physical condition or mechanical integrity of the one or more circumferential seals, an indication resulting from a deterioration of: the physical condition, or the mechanical integrity.

\* \* \* \* \*